US011280194B2

(12) United States Patent
Sercel

(10) Patent No.: US 11,280,194 B2
(45) Date of Patent: Mar. 22, 2022

(54) OPTICS AND STRUCTURE FOR SPACE APPLICATIONS

(71) Applicant: Trans Astronautica Corporation, Lake View Terrace, CA (US)

(72) Inventor: Joel Sercel, Lake View Terrace, CA (US)

(73) Assignee: Trans Astronautica Corporation, Lake View Terrace, CA (US)

(*) Notice: Subject to any disclaimer, the term of this patent is extended or adjusted under 35 U.S.C. 154(b) by 377 days.

(21) Appl. No.: 15/560,916

(22) PCT Filed: Apr. 22, 2016

(86) PCT No.: PCT/US2016/029072
§ 371 (c)(1),
(2) Date: Sep. 22, 2017

(87) PCT Pub. No.: WO2016/172647
PCT Pub. Date: Oct. 27, 2016

(65) Prior Publication Data
US 2018/0051914 A1    Feb. 22, 2018

Related U.S. Application Data

(60) Provisional application No. 62/151,173, filed on Apr. 22, 2015.

(51) Int. Cl.
*E21C 51/00* (2006.01)
*B64G 1/22* (2006.01)
(Continued)

(52) U.S. Cl.
CPC ............... *E21C 51/00* (2013.01); *B64G 1/22* (2013.01); *B64G 1/1078* (2013.01); *B64G 1/242* (2013.01);
(Continued)

(58) Field of Classification Search
CPC ...................................................... E21C 51/00
See application file for complete search history.

(56) References Cited

U.S. PATENT DOCUMENTS 3,063,521 A    11/1962 Fuller
4,286,581 A     1/1981 Atkinson, Jr.
(Continued)

FOREIGN PATENT DOCUMENTS

AU    2007/200666 A1    8/2007
EP        2177846 A2    4/2010
(Continued)

OTHER PUBLICATIONS

Alternative Scenarios Utilizing Nonterrestrial Resources Charles H. Eldred and Barney B. Roberts, Space Resources Scenarios NASA 1992.*
(Continued)

*Primary Examiner* — Janine M Kreck
(74) *Attorney, Agent, or Firm* — Knobbe, Martens, Olson & Bear, LLP

(57) ABSTRACT

An optical mining apparatus comprising: a light weight solar reflector; optics for controlling the delivery of concentrated sun light onto the surface of a target; and a temperature controlled gas enclosure that contains the target; wherein said solar reflector is oriented to reflect sun light onto said optics.

12 Claims, 47 Drawing Sheets

(51) Int. Cl.

| | |
|---|---|
| *F24S 20/50* | (2018.01) |
| *F24S 23/79* | (2018.01) |
| *F24S 23/71* | (2018.01) |
| *B64G 1/24* | (2006.01) |
| *B64G 99/00* | (2009.01) |
| *B64G 1/40* | (2006.01) |
| *B64G 1/64* | (2006.01) |
| *B64G 1/10* | (2006.01) |
| *F03H 99/00* | (2009.01) |
| *F24S 23/00* | (2018.01) |
| *F24S 23/70* | (2018.01) |
| *B64G 1/44* | (2006.01) |

(52) U.S. Cl.
CPC ............... *B64G 1/40* (2013.01); *B64G 1/402* (2013.01); *B64G 1/446* (2013.01); *B64G 1/646* (2013.01); *B64G 9/00* (2013.01); *B64G 2001/224* (2013.01); *F03H 99/00* (2013.01); *F24S 20/50* (2018.05); *F24S 23/12* (2018.05); *F24S 23/70* (2018.05); *F24S 23/71* (2018.05); *F24S 23/715* (2018.05); *F24S 23/79* (2018.05); *Y02E 10/40* (2013.01)

(56) References Cited

U.S. PATENT DOCUMENTS

| | | | |
|---|---|---|---|
| 5,593,549 | A | 1/1997 | Stirbl et al. |
| 2004/0004184 | A1 | 1/2004 | Schubert |
| 2008/0156315 | A1 | 7/2008 | Yangpichit |
| 2010/0269817 | A1 | 10/2010 | Kelly |
| 2011/0041894 | A1 | 2/2011 | Liao |
| 2014/0262278 | A1 | 9/2014 | Walton |
| 2016/0024921 | A1* | 1/2016 | Ethridge ............... E21C 51/00 408/67 |
| 2018/0194626 | A1 | 7/2018 | Berggren et al. |
| 2020/0240267 | A1 | 7/2020 | Sercel et al. |

FOREIGN PATENT DOCUMENTS

| | | |
|---|---|---|
| RU | 02353775 | 4/2009 |
| WO | WO 2016/172647 A1 | 10/2016 |
| WO | WO 2020/033561 A2 | 2/2020 |

OTHER PUBLICATIONS

Ceruti; Conceptual Design and Preliminarily Structural Analysis of Inflatable Basket for an Asteroid Capturing Satellite; Strojniški vestnik—Journal of Mechanical Engineering 61(2015)5, 341-351; in 11 pages.

Erickson; Optimal Architecture for an Asteroid Mining Mission: Equipment Details and Integration; Space 2006; Sep. 19-21, 2006, San Jose, California; AIAA 2006-7504; in 17 pages.

Grip; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; in 10 pages.

Sercel, et al; Time Dependent Finite Difference Modeling of Outgassing of Asteroids via Bulk Heating; 978-1-5386-2014-4/18/$31.00 ©2018 IEEE; in 14 pages.

Zacny; Asteroid Mining; AIAA Space 2013 Conference and Exposition; Sep. 10-12, 2013; San Diego, CA; AIAA 2013-5304; in 16 pages.

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.

Bowersox, Kenneth and NASA Advisory Council Committee on Human Exploration and Operations, "NASA Advisory Council Finding on NASA Human Exploration Stretegy," from the Council Public Deliberation, Jul. 31, 2014.

Brophy, J., et al., "Spacecraft Conceptual Design for Returning Entire Near-Earth Asteroids," 48th AIAA/ASME/SAE/ASEE Joint Propulsion Conference & Exhibit and 10th International Energy Conversion Engineering Conferencde, Atlanta, George Jul. 29-Aug. 1, 2012.

Bussey, D. B. J., et al., "Permanent shadow in simple craters near the lunar poles," Geophysical Research Letters, 2003, vol. 30, No. 6, 1278, pp. 11-1-11-4.

Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; ©2015 Journal of Mechanical Engineering; DOI:10.5545/sv-jme.2014.2063; in 11 pages.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Crusan, J., "an Evolvable Mars Campaign" NASA Presentation, Jul. 2014, available at https:/www.nasa.gov/sites/default/files/files/20140429-Crusan-Evolvable-Mars-Campaign.pdf.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Granvik et al., Abstract, IAU-Symposium: Complex Planetary Systems, Jul. 7-11, 2014, Namur, Belgium.

Harwood, William, "NASA's proposed asteroid retrieval mission outlined." Posted in Space Flight Now: Apr. 6, 2013. Available at https://spaceflightnow.com/news/n1304/06asteroid/.

Mommert, M., et al., "Constraining the Physical Properties of Near-Earth Object 2009 BD," The Astrophysical Journal, vol. 786, No. 2.

NASA, "Asteroid Redirect Mission Reference Concept," 2013.

Rapp, D., "Use of Extraterrestrial Resources for Human Space Missions to Moon or Mars (Springer Praxis Books / Astronautical Engineering)" published Nov. 20, 2012.

Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.

Shao, M.B., et al., "Finding very Small Near-Earth Asteroids using Synthetic Tracking," Astrophysics .J 782:1,2014, arXiv, 1309.3248.

Squyres, S. and the NASA Advisory Council, Recommendation Regarding Mismatch Between NASA's Aspirations for Human Space Flight and Its Budget, from the Council Public Deliberation, Jul. 31, 2014.

Arnold, J.R., "Ice in the lunar polar regions", J. Geophys. Res 84., 1979, pp. 5659-5668.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions on Control Systems Technology, 2012, vol. 21(3), pp. 666-678.

BottKe, W.F., et al., Debiased orbital and size distributions of the near-Earth objects, Icarus 156, 399-433, 2002.

Boyle, A., "Blue Orgin Space venture slips in a sneak peek at design of Blue Moon lunar lander", Apr. 5, 2017, https://www.geekwire.com/2017/blue-origin-sneak-peek-blue-moon-lunar-lander/.

Boyle, A., "Jeff Bezos lays out his vision for city on the moon, complete with robots", May 20, 2017, https://www.geekwire.com/2017/jeff-bezos-blue-origin-moon/.

Brown, P., et al., The Flux of small near-Earth objects colliding with the Earth, Nature 420, 294-296, 2002.

Cassapakis, C.G., et al., "A Power Antenna for Deep Space Missions," Solar Engineering Editors: J.H. Davidson and J. Chavez. Book No. HO1046, 1996.

(56) References Cited

OTHER PUBLICATIONS

Chen, L.H., et al., Soft spherical tensegrity robot design using rod-centered actuation and control, Journal of Mechanisms and Robotics, 2017, vol. 9(2) p. 025001.
Chen, M., et al., "Energy analysis of growth adaptable artificial gravity space habitat," AIAA Space and Astronautics Forum and Exposition, 2018, in 13 pages.
Colaprete, A., et al., "Detection of water in the Icross ejecta plume," Science, vol. 330, pp. 463-468, Oct. 22, 2010.
Cohen, Marc M., et al., "Asteroid Mining," AIAA 2013-5304, presented at AIAA Space 2013 Conference and Exposition, Sep. 10-12, 2013, San Diego, CA.
Craft, J., et al."Percussive digging systems for planetary research" IEEE Aerospace and Electronic Systems Magazine, 2010, vol. 25 pp. 21-26.
Crawford, I.A., Lunar resources: A review. Progress in Physical Geography, 39(2):137-167, 2015.
Mazanek, Daniel, et al.: Asteroid Retrieval Mission Concept—Trailblazing Our Future in Space and Helping to Protect US from Earth Impactors11, Planetary Defense Conference, Jan. 1, 2013 (Jan. 1, 2013), pp. 1-16, XP055325432.
David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.
Dreyer, C. B., G. Sowers, and H. Williams. "Ice mining in lunar permanently shadowed regions." *9th Joint Meeting of the Space Resources Roundtable and Planetary and Terrestrial Mining Sciences Symposium*, Golden, CO. 2018.
Duke, M., et al., "Mining of lunar polar ice", 36th AIAA Aerospace Sciences Meeting and Exhibit, 1998, pp. 1069.
Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.
Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.
Extended Search Report; dated Oct. 24, 2018; International Application No. EP16784044.6; filed Dec. 10, 2019.
Fabbrocino, F., et al., "Optimal prestress design of composite cable-stayed bridges". Composite Structures, 2017, vol. 169, pp. 167-172.
Feldman, W. C., et al., (1998). "Fluxes of fast and epithermal neutrons from Lunar Prospector", Evidence for water ice at the lunar poles, science 281, 1998, pp. 1496-1500.
Fincannon, J., "Lunar Polar Illumination for Power Analysis", NASA/TM, 2008-215446, https://ntrs.nasa.gov/archive/nasa/casi.ntrs.nasa.gov/20080045536.pdf.
Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volatiles, 2018, LBI Contrib. No. 2087.
Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, p. 74.
Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.
Fuller, R.B., Tensile integrity structures, 1959. U.S. Pat. No. 3,063,521.
Garenne, A.B., et al., "The Abundance and Stability of Water in Type 1 and 2 Carbonacious Chondrites," CI, CM, and CRI Geochimica et Cosmochimica Acta 137, 93-112, 2014.
Gertsch, L.S., et al., Laboratory Demonstration and Test of Solar Thermal Asteroid ISRU, funded NASA Early Stage Innovations Space Tech Research Grants, Proposed 2014, funded Jan. 2015.
Gertsch, R.E., et al., "Near Earth Resources," In Near Earth Objects, Annals of the New York Academy of Science, vol. 822, p. 468-510, 1997.
Gertsch, R.E., et al., "Mining near Earth resources," In Near Earth Objects, Annals of the New York Academy of Sciences, vol. 822, p. 511-537, 1997.
Gläser, P., et al., "Illumination conditions at the lunar poles: Implications for future exploration". Planetary and Space Science, in press, 2017, https://doi.org/10.1016/j.pss. 2017.07.006.
Goyal, R., et al., "Analytical study of tensegrity lattices for mass-efficient mechanical energy absorption", International Journal of Space Structures, 2018.
Goyal, R., et al., "Modeling of tensegrity structures", Journal of Open Source Software, 2019, vol. 4(42), p. 1613.
Goyal, R., et al., "Tensegrity system dynamics with rigid bars and massive strings", Multibody System Dynamics, 2019, vol. 46(3) pp. 203-228.
Granvik, M., et al., "The population of natural Earth satellites," Icarus, 2012.
Grossman, G., et al., "Inflatable Concentrations for Solar Propulsion and Dynamic Space Power." Journal of Solar Energy Engineering, Nov. 1990, vol. 112/229.
Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.
Hayne, P.O., et al., "Diviner Lunar Radiometer Observations of the LCROSS Impact", Science 330, 2010, p. 477.
Heiken, G.H., et al., "Lunar sourcebook—a user's guide to the moon". NASA,. Cambridge, England, Cambridge University Press, 1991, vol. 753, pp No individual items are abstracted in this volume.
Interbartolo III. Michael A, et al., "Prototype Development of an Integrated Mars Atmosphere and Soil-Processing System", Journal of Aerospace Engineering, Jan. 2013, vol. 26(1), pp. 57-66.
International Search Report/Written Opinion; dated Jan. 30, 2020; International Application No. PCT/US2019/045526; Filed Aug. 7, 2019; in 9 pages.
Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.
Lawrence, D. J., et al., "Evidence for water ice near Mercury's north pole from messenger Neutron Spectrometer measurements". Science 339, 2013, pp. 292-296.
Lewis, J.A., "Hard Choices for Manned Spaceflight: America as Icarus", http://csis.org/files/publication/140508_Lewis_HardChoicesMannedSpaceflight_Web.pdf, 2014.
Li, S et al., "Possible detection of surface water ice in the lunar polar regions using data from the Moon Mineralogy Mapper (M3)," presented at LPSC XLVIII, Mar. 2017, Houston, TX.
Lunar Exploration Advisory Group "Commercial Lunar Propellant Architecture A Collaborative Study of Lunar Propellant Production", Final Report. Aug. 2018.
Mazanek et al., "Asteroid Retrieval Mission Concept—Trailblazing Our Future in Space and Helping to Protect US from Earth Impactors." Planetary Defense Conference 2013, pp. 3, 5 [online] <URL: http://ntrs.nasa.gov/archive/nasa/casi.ntrs.nasa.gov/20130013170.pdf>.
Mazarico, E., et al., "Illumination Conditions of the Lunar Polar Regions Using LOLA Topography." Icarus, vol. 211, No. 2, 2011, pp. 1066-1081., doi:10.1016/j.icarus. 2010.10.030.
Nagase, K., et al., "Minimal mass tensegrity structures", The International Association for Shell and Spatial Structures, 2014, vol. 55(1), pp. 37-48.
NASA Report from Office of the Chief Technologist, Emerging Space: The Evolving Landscape of 21st Century American Spaceflight, http://images.spaceref.com/docs/ 2014/Emerging_Space_Report.pdf.
Pike R.J., "Crater dimensions from Apollo data and supplemental sources". The Moon, 1976, vol. 15, pp. 463-477.
Pike, R.J., "Depth/diameter relations of fresh lunar craters: Revision from spacecraft data", Geophysical Research Letters, 1974, vol. 1(7), pp. 291-294.

(56) References Cited

OTHER PUBLICATIONS

Rimoli, J.J., et al., "Mechanical response of 3-dimensional tensegrity lattices", Composites Part B: Engineering, 2017, vol. 115, pp. 30-42.
Rostami, J., et al., "Lunar tunnel boring machines", In Earth and Space 2018: Engineering for Extreme Environments, American Society of Civil Engineers, pp. 240-252, 2018, Reston, VA.
Sabelhaus, A.P., et al. "Model-predictive control of a flexible spine robot", American Control Conference, 2017, IEEE, pp. 5051-5057.
Sanders. G , Nasa Lunar ISRU Strategy. 2019.
Schlaich, M., "The messeturm in Rostock—A tensegrity tower", Journal of the International Association for Shell and Spatial Structures, 2004, vol. 45(2), pp. 93-98.
Sercel, Joel, et al.: "Demonstration of "Optical Mining" For Excavation of Asteroids and Production of Mission Cunsumables", NASA SBIR., Apr. 23, 2015 (Apr. 23, 2015), XP055325434, Retrieved from the Internet: URL:http://sbir.nasa.gov/SBIR/abstracts/15/sbir/phase1/SBIR-15-1-H1.01-9278.html.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel, J.C., et al., "Method and systems for obtaining solar power in permanently shadowed lunar craters," Provisional Patent Jan. 2020.
Sercel, J.C., "Solar Thermal Propulsion for Planetary Spacecraft", presented at the JANNAF Propulsion Conference, San Diego, CA, Apr. 9-12, 1985.
Shapiro, I and the Committee to Review Near-Earth Object Surveys and Hazard Mitigation Strategies. Final Report, National Research Council, National Academies Press, 2010.
Shoji, J. M., et al., "Solar Thermal Propulsion Status and Future", AIAA-92-1719, AIAA Space Programs and Technologies Conference, Mar. 1992.
Skelton, R.E., Tensegrity Systems, 2009, Springer US.
Sowers, George, "Closing the Business Case for Lunar Propellant", Space Resources Roundtable XIX Planetary & Terrestrial Mining Sciences Symposium, http://www.isruinfo.com/index.php?page=srr_19_ptmss.
Spudis, P., et al., "Evidence for water ice on the moon: Results for anomalous polar craters from the LRO Mini-RF imaging radar", Journal of Geophysical Research: Planets, 2013, vol. 118(10), pp. 2016-2029.
Staugaitis, C., et al., "Mechanical and Physical Properties of the Echo II Metal-Polymer Laminate (NASA TND-3409)," NASA Goddard Space Flight Center, 1966.
Stoica, A. et al., "TransFormers of Extreme Environments and Their Integration in a Solar Power Infrastructure". AIAA Space 2016, AIAA Space Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al., "Deployment of tensegrity structures", International Journal of Solids and Structures, 2003, vol. 40(18), pp. 4637-4657.
Sunspiral, V., et al., "Tensegrity based probes for planetary exploration: Entry, descent and landing (edl) and surface mobility analysis", International Journal of Planetary Probes, 2013, vol. 7, p. 13.
Thomas, M et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Written Opinion of the International Searching Authority; dated Aug. 5, 2016; International Application No. PCT/US2016/29072; Filed Apr. 22, 2016; in 4 pages.
Yildiz, K., et al., "Effective beam stiffness properties of n-strut cylindrical tensegrity towers", AIAA Journal,2019, vol. 57(5), pp. 2185-2194.
Yildiz, K., et al., "A novel deployment strategy for tensegrity towers", AIAA Spacecraft Structures Conference, 2018, p. 0693.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.

* cited by examiner

Optical Mining System in Initial Configuration Prior to Excavation

Optical Mining System in Use with Multi-Meter Excavation

Final Configuration With Enclosed Slag

Artist Concept Showing Nodes in the Transportation Network Potentially Enabled by Optical Mining and the Apis Flight System Architecture

Application of Darcy's Law to Gas Diffusion Out of Rock in Space

$$|\dot{V}| = \frac{\kappa A}{\mu} \quad \lambda = \frac{\kappa A}{\mu}\frac{dp}{dx}$$

Ideal Gas Law:
$$\dot{V} = \frac{\dot{m} R_g T_g}{P_i M}$$

Combining:
$$\frac{\dot{m} R_g T_g}{P_i M} = \frac{\kappa A}{\mu}\frac{dp}{dx}$$

Integrating:
$$P(x) = \sqrt{2x\left(\frac{\dot{m} R_g T_g \mu}{M \kappa A}\right)} = \sqrt{2 C_2 X}$$

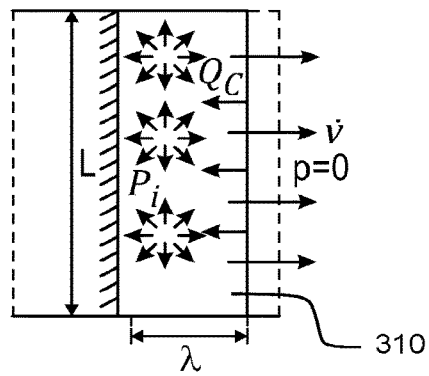
310

$k$ = Gas Permeability of Asteroid, m²
$\mu$ = Dynamic Viscosity of Evolved Gas, Pl
$c_2 = \dot{m} R_g T_g \mu / M \kappa A$

FIG. 10

We have Identified a New Dimensionless Parameter, S, the Space Coefficient which Predicts Purely Gas Dynamic Spalling.

| | |
|---|---|
| Specific Heat (J/(kgK)) | 1000 |
| Density (kg/m³) | 2250 |
| Thermal Conductivity (J/(m³K)) | 2 |
| Volatile Fraction | 0.2 |
| Latent Heat of Volatile Release | 2.8E+06 |
| Ideal Gas Constant (J/(molK)) | 8.31 |
| Average Molar Mass of Evolved Gas (kg/mol) | 0.028 |
| Largest Possible ΔT (Kelvin) | 1000 |
| Maximum Gas Temperature (Kelvin) | 800 |
| Asteroid Gas Permeability (m³) | 4.93E-13 |
| Water Vapor Dynamic Viscosity (PI) | 2.00E-05 |
| Tensile Strength (Pa) | 3.00E+06 |
| Induced Pressure (Pa) | 1.01E+05 |
| S | 0.03 |

$$S \equiv \frac{P_i}{\sigma_{max}} = \sqrt{2\left(\frac{k\Delta T R_g T_g m}{M\kappa(h_v + c\Delta T)}\right)} \Big/ \sigma_{max}$$

- Gas Release from Conductive Heat will Not Create Enough Internal Pressure to Fracture an Intact Boulder or Rock of CM Type
- However, If the Rock is Fractured by Other Means, the Gas Release Pressure is More than Enough to Excavate Fractured Material

FIG. 12

Quantitative Parameters for Thermal Stress Analysis

| Parameter | Unit | Variable Name | Value |
|---|---|---|---|
| Young's Modulus | N/m² | $E$ | 2.00E+10 |
| Coefficient of Thermal Expansion | 1/K | $\alpha$ | 1.20E+05 |
| Spot Diameter | m | $L$ | 0.1 |
| Skin Depth | m | $\lambda$ | 0.0015 |
| Poisson,s Ratio | Ratio | $\alpha$ | 0.2 |
| Delta-T | Kelvin | $\Delta T$ | 500 |
| Compressive Stress | Pa | $\sigma_{ct}$ | 1.20E+08 |
| Shear Stress | Pa | $\tau$ | 1.67E+07 |
| Typical Compressive Strength | Pa | $\sigma_{cs}$ | 3.00E+07 |
| Ratio of Compressive Stress to Strength | Ratio | - | 4.0 |
| Typical Shear Strength | Pa | $\tau_{ST}$ | 1.00E+07 |
| Ratio of Shear Stress to Strength | Ratio | - | 1.67E+03 |

FIG. 14

Cutaway Cartoon of Optical Mining Experiment
Module (OMEM) Showing Key Internal Components External Cartoon View of OMEM After
the Hinged Lid Has Been Opened and the
Cassegrain Inflatable Reflector Has Been Deployed

External Cartoon View of OMEM After it has Been Grappled and Taken from the Dragon Trunk, Before Deployment

External Cartoon View of OMEM after the Hinged Lid has Been Opened and the Cassegrain Inflatable Reflector has Been Deployment

Intermediate Configuration

Optical Mining in Initial Configuration

Stinger-Reflector Stowed Containment Housing and Optical Louver Light-Power Flux Regulator, Winston Cone and Light Path Not Shown

Final, Slag Configuration

Solar Thermal Propulsion

Fabrication of Large Pressure Vessels

Distillation of Asteroid into Feedstocks

Water Vapor Transfer and Solid Storage

Vapor-Phase On-Orbit Fabrication of Large Structures

Apis-Based Extraction and Storage of NEO Water

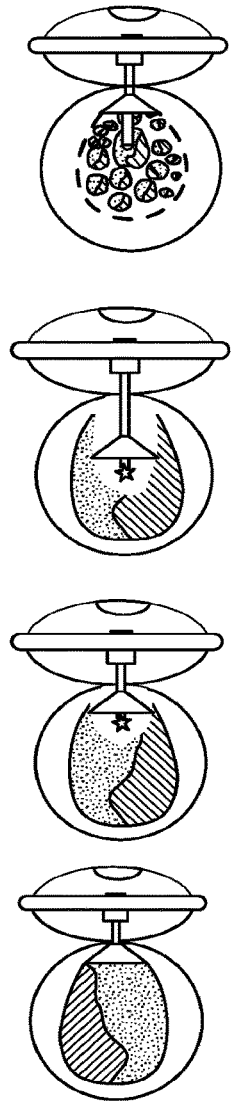

- In-Space Process
  - CI or CM Chodrite NEO Enclosed in Arm-like But High Temperature Bag and Heated to Drive Out Water Which is Captured in a Cold Trap for Return to Earth Using H20 Solar Thermal Propulsion

- Low TRL Technology Development and Demonstration Roadmap
  - Ground and Space-Based Experiments and Demonstrations Starting with Vacuum Oven Tests on CI and CM Chondrite Meteorites

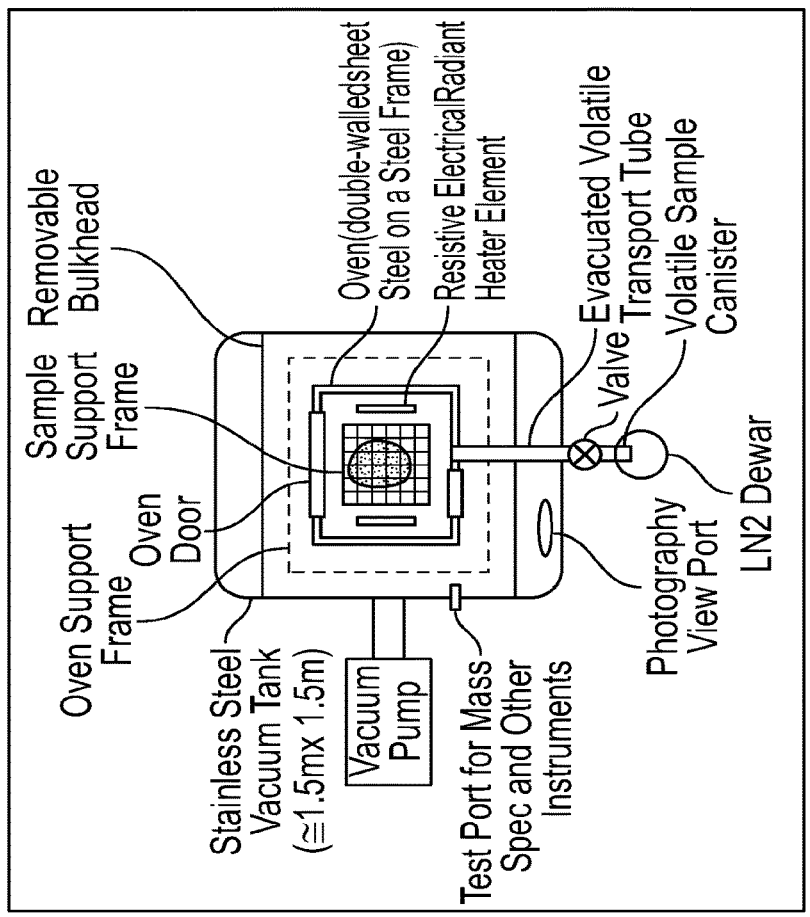

FIG. 38

Simple Example: Apis for Propellent Transfer and Storage

Advansed Example: Apis Fabrication of Large Engineering Structures in Space

Artist's Concept Showing the Key Features of STR with Inflatable Reflector

Simplified Drawing Showing Inflatable Cassegrain Solar Furnace for Optimal Mining

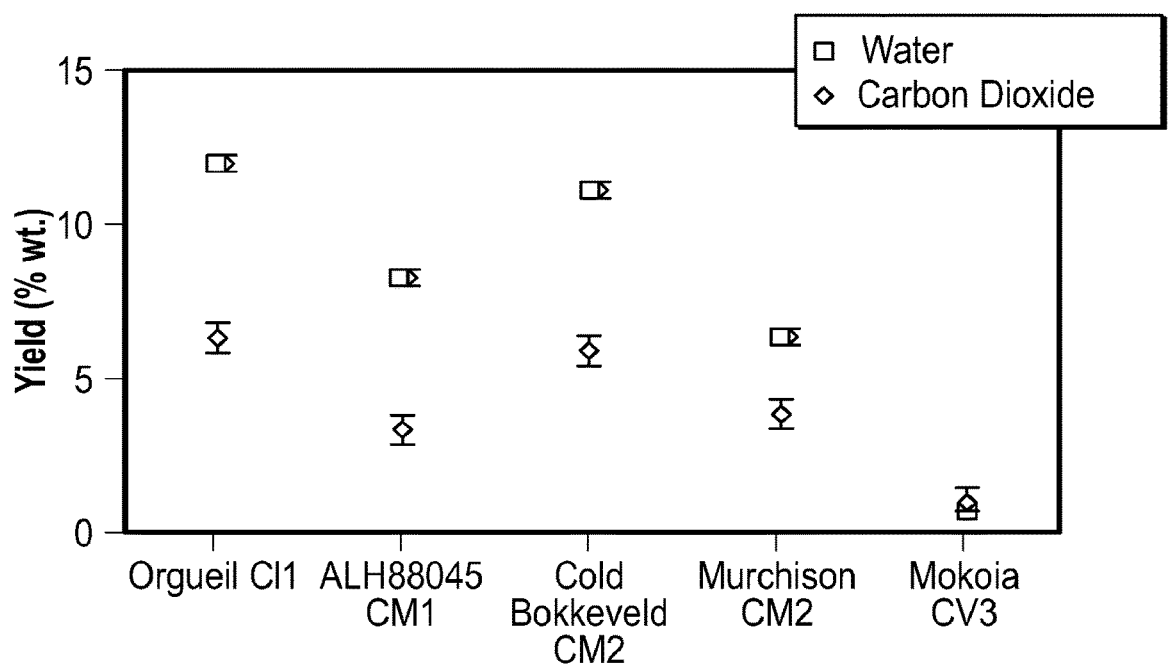
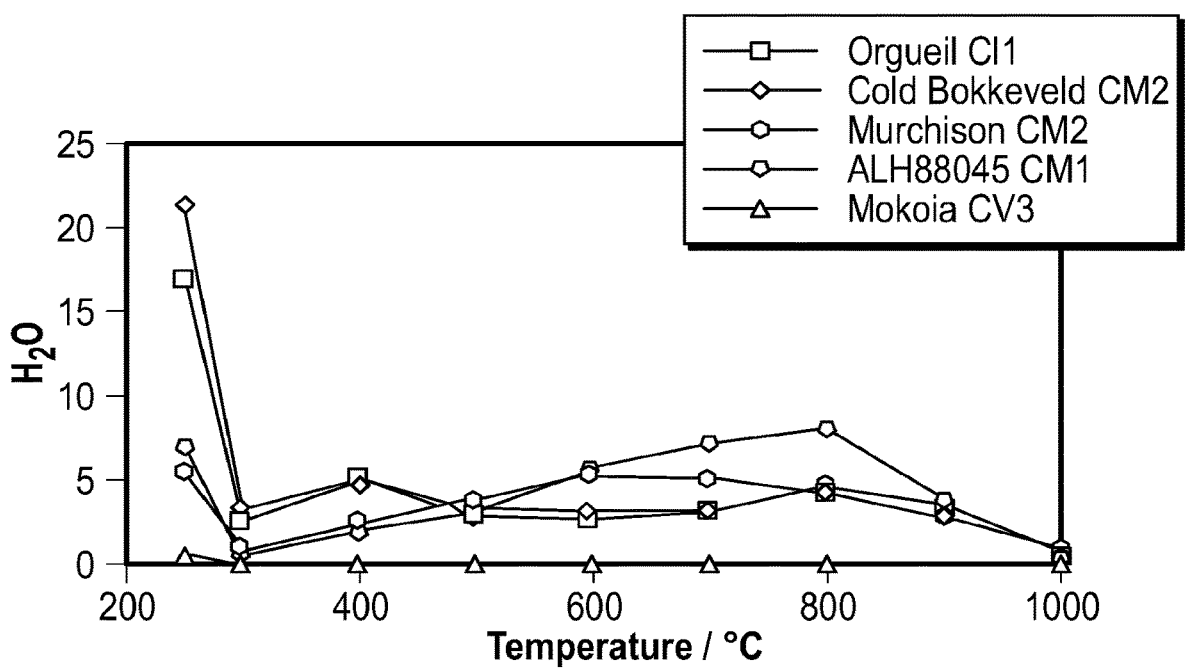
FIG. 51

Schematic of Anidolic, Aplanatic Optical Design

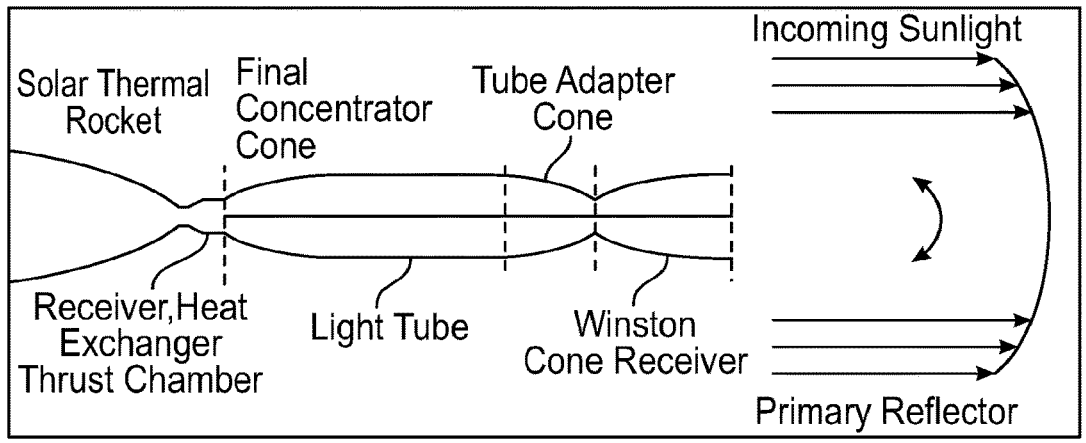

FIG. 57

Table of Typical Optical System Design Variables

| Parameter | Value | Comment |
|---|---|---|
| Rim Angle | 45° | F-Number= 0.6 |
| Surface Roughness | 1 mrad RMS | Based on Experimental Measurements |
| Primary Optic | 2,841 | Primary Parabolic Reflector |
| Total System CR | 7,500 | Derated from 4X to 2X CR Horn |
| Canopy Loss | 0.85 | Assume Anti-Reflective Coating. |
| Primary Reflector Loss | 0.85 | Derating from Measured Values of 0.87 |
| Horn Reflector Loss | 0.9 | Derating from Measured Values of 0.92 |
| Pointing Error Loss | 0.9 | 2-Element Aplanatic Optics 2° Pointing |
| Additional Margin | 0.8 | 20% Design Margin |
| Achievable CR | 3,511 | Geometric CR Times Loss Factors. |

FIG. 58

OPTICS AND STRUCTURE FOR SPACE APPLICATIONS

This application is a 371 of PCT/US16/29072 filed on 22 Apr. 2016 which claims the benefit of provisional application 62/151,173 filed on 22 Apr. 2015.

BACKGROUND

The present invention is generally related to asteroid mining and space propulsion, and more particularly optical mining and solar thermal propulsion.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

FIG. 10 shows equations and parameters associated with a thermal wave model of asteroid heating for an optical mining embodiment.

FIG. 12 shows equations and parameters associated with a thermal wave model of asteroid heating for an optical mining embodiment.

FIG. 14 shows quantitative parameters for thermal stress analysis.

FIG. 38 shows NEO water extraction and storage in accordance with an embodiment.

FIG. 51 shows volatile extraction data in accordance with an embodiment.

FIG. 57 shows a schematic of anidolic aplanatic optical design in accordance with an embodiment.

FIG. 58 shows a table of optical system design variables in accordance with an embodiment.

DESCRIPTION

Figure 1:
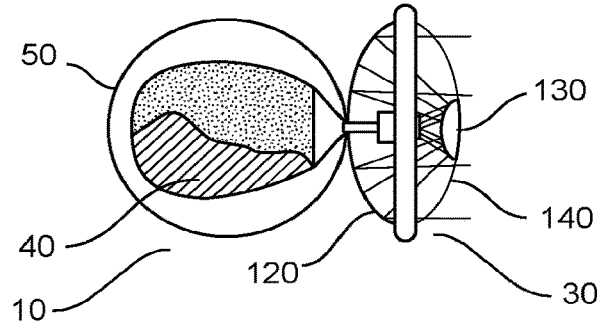
FIG. 1 shows an embodiment wherein the initial configuration after asteroid capture but before optical excavation operations.

Embodiments of the invention are discussed below. The invention's scope is not limited to specific terminology used herein. A person skilled in the relevant art will recognize that equivalent parts and steps can be substituted without departing from the scope of the invention. All references cited herein are incorporated by reference as if each had been individually incorporated.

In optical mining, highly concentrated sunlight 210 is directed onto the surface of a small asteroid that has been enclosed by a thin-film inflatable structure. Our experiments and analytical work have provided new insights into the physics of what this highly concentrated sunlight 210 will do. The concentrated sunlight 210 will cause local heating of the asteroid surface to a temperature of up to 1000 K over an area of several square inches (for an optical mining apparatus 10 working at power levels of tens of kilowatts). This will cause heat to conduct into the structure of the asteroid down to the depth of a few millimeters where it will thermally liberate water and other volatile materials such as $CO_2$ and $SO_2$. The quantity of gas liberated in this process can be expected to be 10 to 40 percent of the total mass of the rock material that is heated above about 400 centigrade over ambient. Based on our experiments thus far this liberated gas can be expected to be about half $H_2O$ and the other half dominated by $CO_2$ and $SO_2$ depending on the exact type of volatile rich asteroid being mined. Likewise, the yield of water will be in the range of 5 to 20 percent of the total mass of rock heated depending on the quality of the ore. If the liberated gas constitutes only 10 percent of the rock mass, once it is released from its de-volatilized state, it will increase in volume by a factor of several hundred times due to the phase change. This increase in volume causes a large movement of gas which entrains fractured rock particles and assists in the excavation process.

Although the target type of asteroids, the source bodies for CI and CM meteorites, can be expected to be permeable, they are also known to be structurally weak with low tensile strength. Hence, the massive increase in gas volume inside the permeable rock structure will cause a pressure gradient driving the diffusion of the gas out of the rock. The experimental evidence shows that this internal gas-pressure driven tensile stress in combination with the larger thermal stress caused by rapid heating of the rock surface will fracture the material locally and cause it to spall and shed small pieces or chips of material. Once these pieces are separated from the surrounding rock, the expanding and escaping gases will drive them away from the surface exposing fresh new, still cold surface 330 below and the excavation process will continue. Shown in FIG. 1, the process of optical mining involves encapsulating the asteroid 40 in a tough, thin film bag 50 and introducing a light tube 80 through a port 90 in the bag 50 to deliver highly concentrated light (thermal energy) to the surface of the asteroid 40 to excavate the exterior, breakup the asteroid (while containing debris 100 within the bag 50, 230), and contain the outgassed volatiles 100 at low pressure. A protective boot 160 can be attached to the light tube 80 to protect against debris 100 and radiation.

An embodiment can comprise a bag 50 modified to provide more complete enclosure 50, higher-temperature bag materials, and a port 90, 490 with sliding sleeve to allow penetration of the telescoping light tube 80, 510.

Embodiments can comprise steps wherein outgassed volatiles 100 are cryopumped through a multi-meter diameter high-capacity filter system 240 embedded in a lightweight inflatable tube 670 into a passively cooled thin film enclosure 50 where the ice freezes out for storage, transport, and use.

Figure 2:
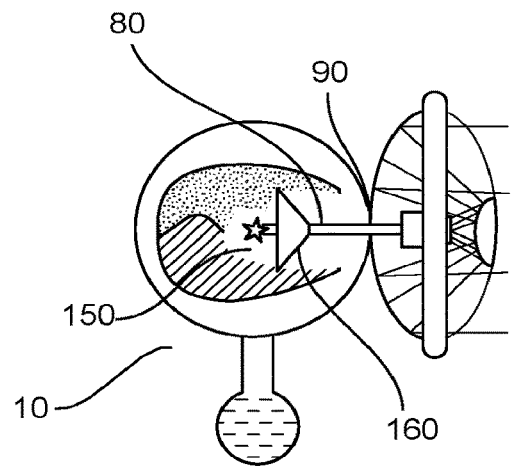
FIG. 2 shows an embodiment wherein an intermediate condition has the telescoping tube penetrating into the system.
Figure 3:
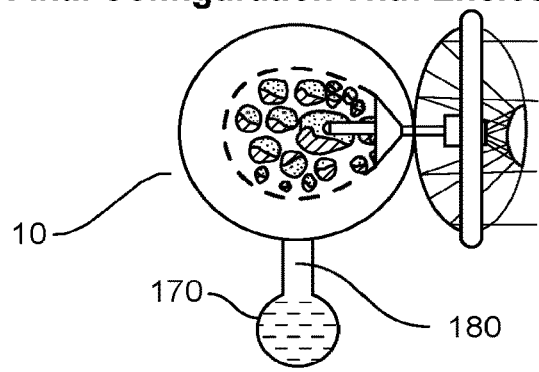
FIG. 3 shows an embodiment wherein accessible volatiles have been completely removed from the asteroid.

FIG. 1 shows an initial configuration after asteroid 40, 500 capture but before optical excavation operations. FIG. 2 shows an intermediate condition with the telescoping tube 80, 510 penetrating into the system. During this phase of the operation the tube 80 will be deployed and retracted as needed with light power levels modulated to the minimum possible level to ensure continued breakup of the asteroid 40. FIG. 3 shows the system when the accessible volatiles 100 have been completely removed from the asteroid 40, 500. Thermal design and analysis shows that the passive storage of ice in a thin film bag 50 as depicted is enabled through the use of a second surface mirror coating which emits IR radiation and reflects sunlight. This is a method used in cryogenic instrument cooling.

An embodiment comprising optical mining spacecraft 10 and system architecture is referred to hereafter as "Apis". Named after the genus of honey bees or the acronym Asteroid Provided In-Situ Supplies, Apis makes extensive use of thin film inflatable structures as solar concentrators 60, asteroid containment devices 50, and propellant reservoirs 170 which are connected to the bag 50 by dust filtration and separation system 180, 240. In one variant, Apis also uses asteroid derived water directly as propellant in a solar thermal rocket 110 in reusable orbit transfer vehicles. We call the optical mining vehicle 580 the Honey Bee and the reusable orbital transfer vehicles 200 Worker Bees. Optical mining together with the Apis architecture may have profound benefit to NASA. Mission studies suggest that an embodiment could enable a single Falcon 9 class rocket to launch a reusable Honey Bee 580 spacecraft to an orbit from which it will be able to return up to 100 tons of water to LDRO, and then repeat the process multiple times. A small fleet of Honey Bees 580 and Worker Bees 200 could create a cis-lunar transportation network that will significantly reduce the cost of human exploration and enable affordable human missions to Mars.

Figure 4:
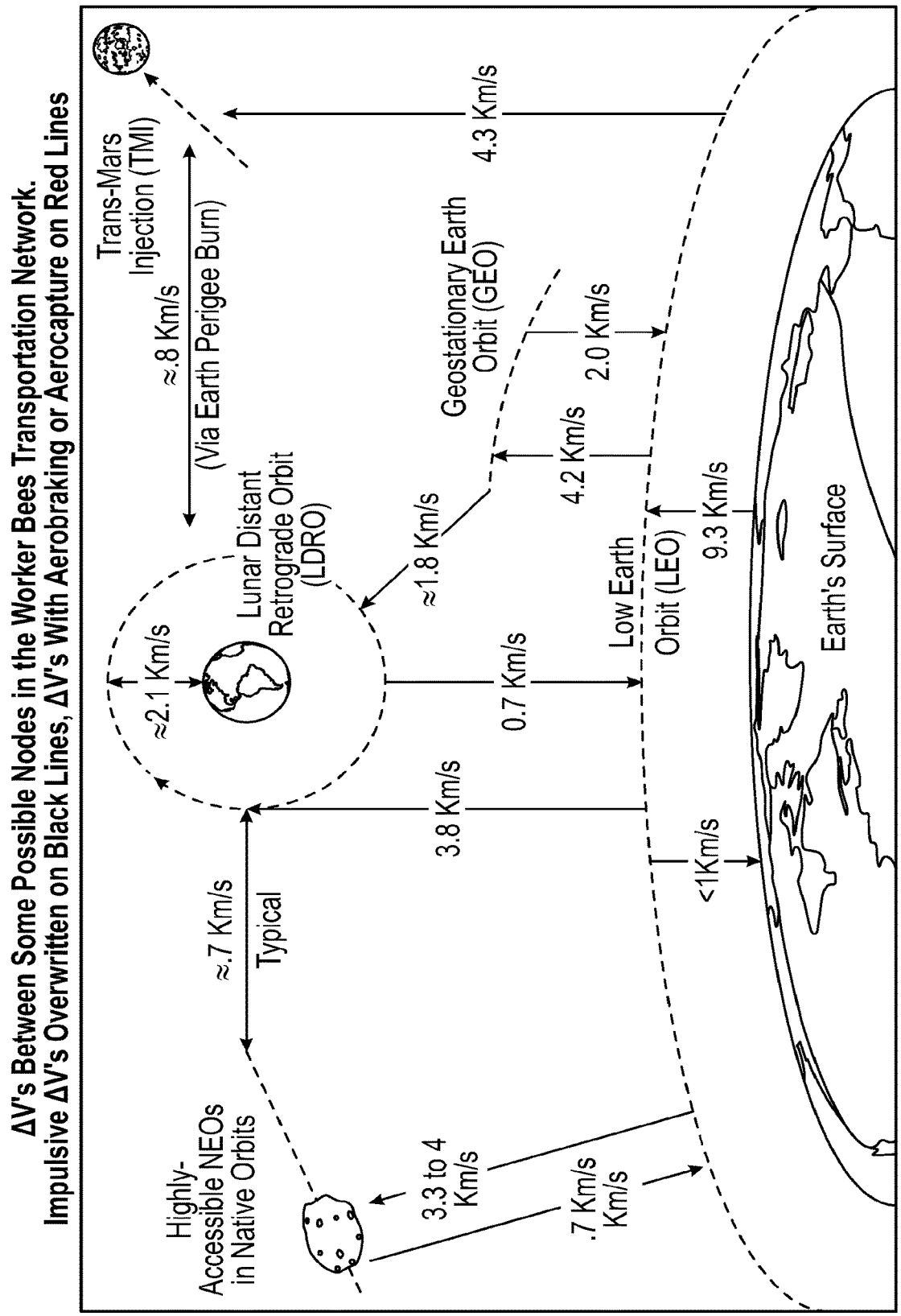
FIG. 4 shows an embodiment showing ΔV's between some possible nodes in the worker bees transportation network.

Embodiments referred to hereafter as "Worker Bees" comprise transportation network architecture that employs reusable OTVs in a distributed system to efficiently utilize available materials and carry payloads from LEO throughout cis-lunar space. The system comprises: transportation to and from Geostationary Earth Orbit (GEO), Near Earth Asteroids (NEOs) in their native orbits, LDRO, the Moon, and trans-Mars injection. Possible nodes in the Worker Bee network are shown in FIG. 4, which provides ΔV for transportation between nodes and shows that LDRO is propulsively close to all the destinations NASA is considering in its new Evolvable Mars Campaign. Worker Bees is a breakthrough architecture for a cis-lunar transportation network using solar thermal technology and ISRU-provided water. By using lightweight inflatable solar concentrators 560 for direct solar thermal power and propulsion, near order-of-magnitude launch cost savings are possible relative to chemical approaches with trip times less than 1/10 that of solar electric propulsion. In this unique architecture, propellant is staged at nodes such as LDRO for use throughout cis-lunar space by reusable, solar thermal OTVs.

Individual Worker Bees are multifunction reusable vehicles that employ a high performance form of Solar Thermal Rocket propulsion using water derived from asteroid ISRU as their propellant.

Figure 5:
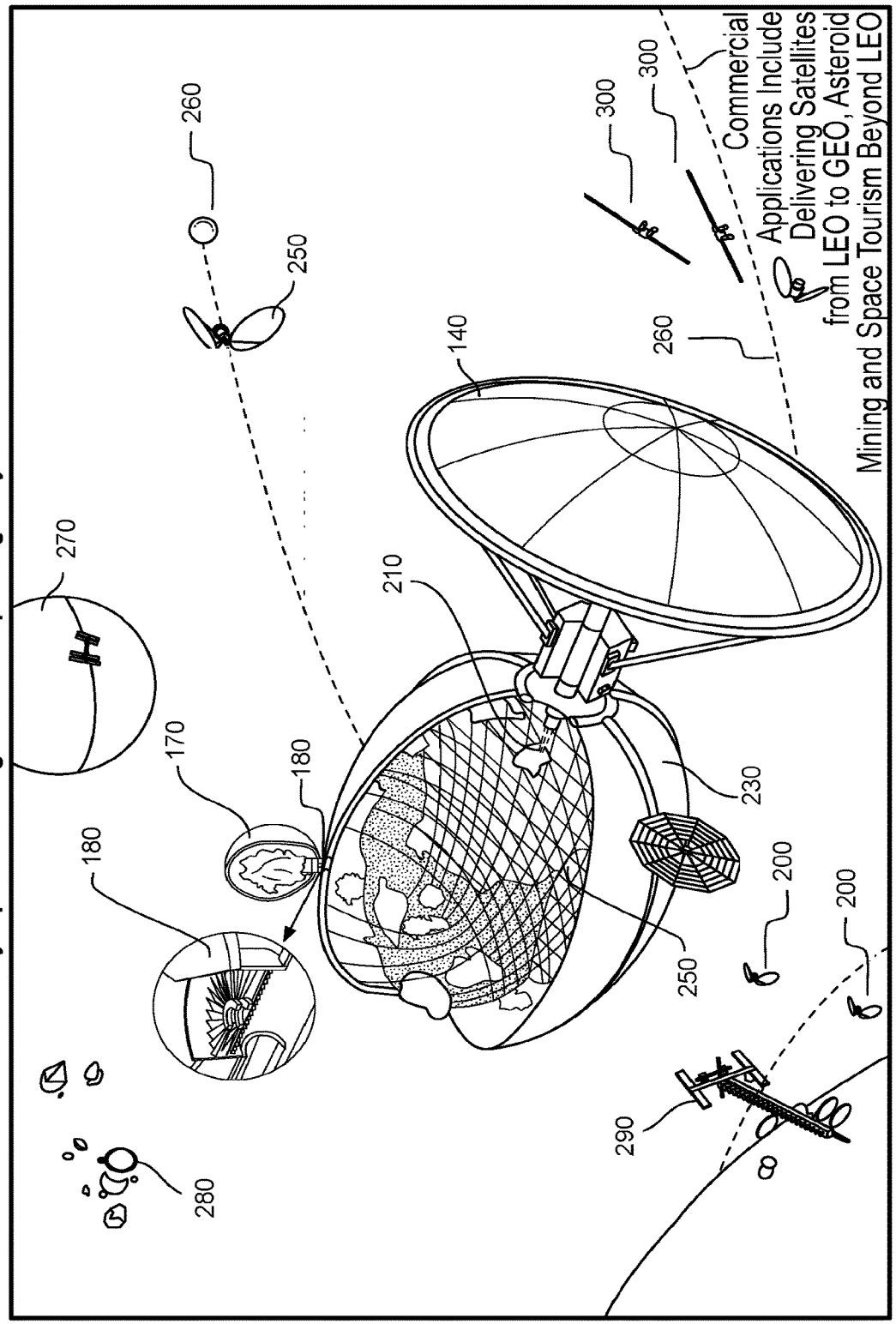
FIG. 5 shows an embodiment's architecture.

FIG. 5 shows an embodiment's architecture that will be enabled for NASA when optical mining comes to fruition. The architecture comprises mechatronic devices, nets, and/or robotic arms 440 assist in positive control of asteroid material 250. Concentrated sunlight passes through the transparent front surface 140, 470 of a lenticular structure and causes spalling of asteroid material 310 and outgassing of volatile gases 210 and dust filtration and separation system 180 connects the low pressure enclosure, deployable asteroid capture and containment bag 230 to a cryopump and storage bag 170. The system can be located around Mars or other exploration or commercial destination or orbit such as LEO or GEO 260. The architecture comprises one or more orbit transfer vehicles 200 powered by solar thermal or other propulsion using asteroid derived propellant and propellant depots 290 supplied from asteroids 500 or other locations can be located in lunar distant retrograde orbits, Earth-Moon libration points, or other locations in orbit around the Earth or other planetary bodies or in heliocentric space. Accordingly, multiple asteroid resource extraction missions 280 can be accomplished simultaneously 280 to ensure adequate resource supply for a given mission application. A commercial or government space station or platform 270 can be used to demonstrate optical mining prior to application missions.

Replacing launch vehicle upper stage functions with high-performance vehicles utilizing propellants derived from space resources will provide large mission benefit. Optical mining could also be used to extract the volatile materials from the target of the Asteroid Redirect Mission (ARM) and convert that material to consumables and propellant in cis-lunar space to support human exploration.

Optical mining embodiments provide propellant and other consumables for commercial processes in space supplied from near Earth asteroids instead of from the surface of the Earth. Such propellant, if mined from highly accessible Near Earth Objects (NEOs) can be used to supply propellant for reusable solar thermal orbit transfer vehicles that fly on recirculating routes between LEO, GEO, and a propellant depot 290 in LDRO. These reusable solar thermal OTVs, Worker Bees, more than double the effective throw capability of launch vehicles by eliminating the need for high energy upper stages and allowing rockets to launch their payloads to LEO instead of to high-energy transfer orbits. Embodiments can creates a commercial market in space for asteroid mining products, and allow the development of commercial OTVs supplied from asteroid ISRU.

Embodiments support NASA's plans for human exploration by providing mission consumables and propellant for all missions of the Evolvable Mars Campaign including: human exploration missions to Lunar Distant Retrograde Orbit (LDRO), human exploration missions to near Earth asteroids in their native orbits, exploration of the Moon, and exploration of Mars.

Requiring only a modest-sized spacecraft launched to a low positive orbit C3 compatible with a single Falcon 9 rocket, Apis is capable of providing NASA with propellant and mission consumables in cis-lunar space. An example process comprises steps wherein "optical mining" is used to excavate asteroid surfaces by spalling, driving water from the spalled materials, and collection of the evolved water as ice.

Optical mining in accordance with embodiments could also be used to extract the volatile materials from the target of the Asteroid Redirect Mission (ARM) and convert that material to consumables and propellant in cis-lunar space to support human exploration.

In accordance with embodiments, propellant mined from highly accessible Near Earth Objects (NEOs) can be used to supply propellant for reusable solar thermal orbit transfer vehicles that fly on recirculating routes between LEO, GEO, and a propellant depot 290 in LDRO.

Example methods comprise steps to trap volatiles on a spacecraft using passive cooling with thin film and inflatable structures and using thin film and inflatable technologies associated with very light weight but high performance multifunctional optics for both solar thermal propulsion and optical mining as well as the mission-systems technologies needed to implement Apis architecture in reusable mining vehicles and orbit transfer vehicles.

Figure 6:
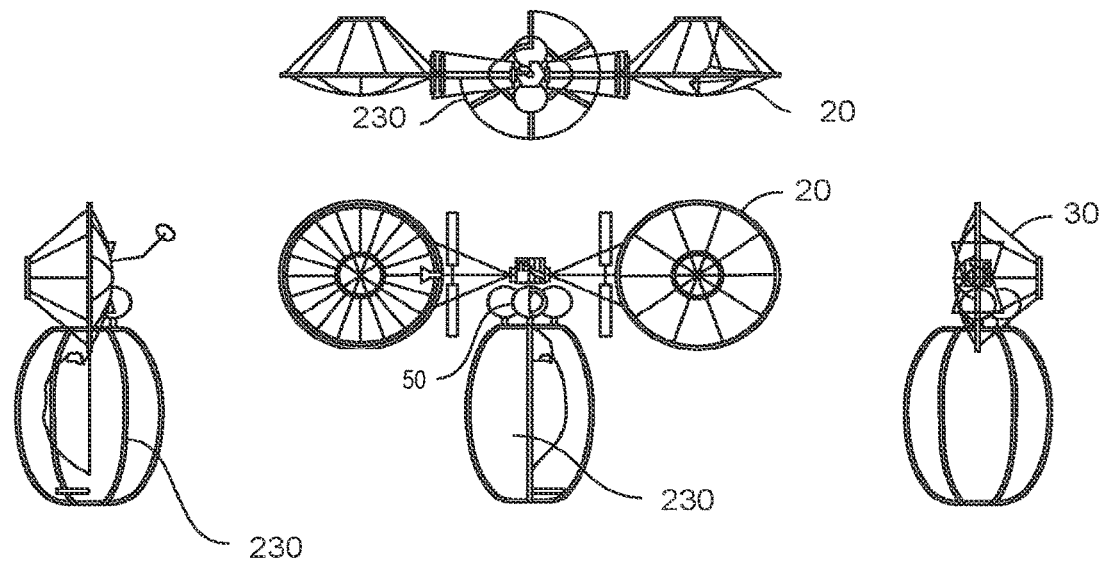
FIG. 6 shows an embodiment of a modular Honey Bee mining vehicle configured to extract water from a 10 meter diameter class asteroid made of CM like material.

FIG. 6 shows an embodiment of a modular Honey Bee mining vehicle configured to extract water from a 10 meter diameter class asteroid 40, 500 made of CM like material.

An integrated mathematical model of the spalling and outgassing processes associated with optical mining based on optics, geophysics, and gas dynamic considerations includes scaling laws and empirical factors to account for variability in material properties. A steady-state one dimensional model of surface spalling can account for radiation heat transfer, conducive heat transfer, endothermic phase change processes, rock structural properties, and gas dynamic occlusion of incoming radiation.

Figure 7:
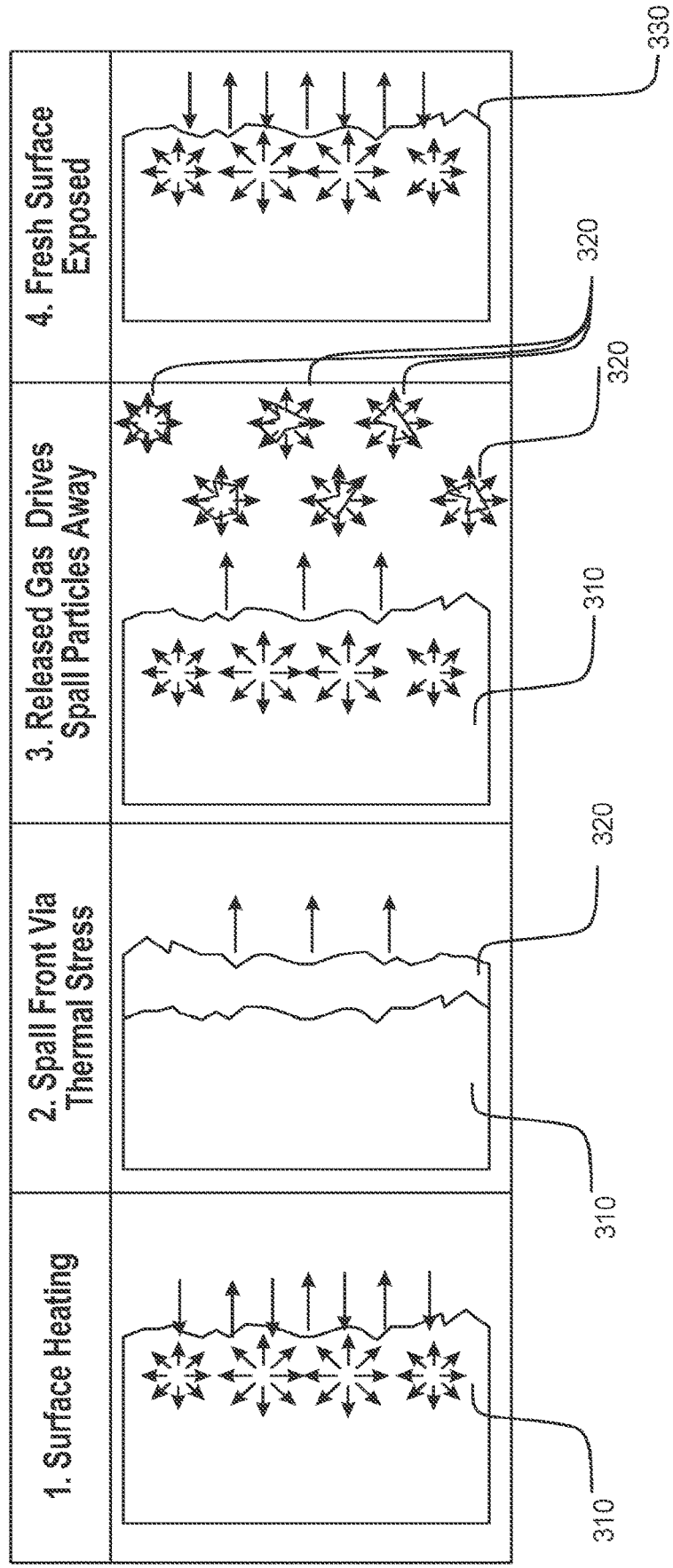
FIG. 7 shows how an embodiment's continuous optical mining process can be visualized.

In accordance with an example method of optical mining, highly concentrated sunlight 210 is directed onto the surface of a small asteroid 500 that has been enclosed by a thin-film inflatable structure 50. The concentrated sunlight 210 will cause local heating of the asteroid surface to a temperature of up to 1000 K over an area of several square inches (for optical mining apparatus 10 working at power levels of tens of kilowatts). This will cause heat to conduct into the structure of the asteroid down to the depth of only a few millimeters where it will thermally liberate water and other volatile materials such as $CO_2$ and $SO_2$. Depending on the asteroid material, the quantity of gas liberated in this process can be expected to be 10 to 40 percent of the total mass of the rock material that is heated above about 400 centigrade over ambient. Based on our experiments thus far, this liberated gas can be expected to be about half $H_2O$ and the other half dominated by $CO_2$ and $SO_2$, so the yield of water will be in the range of 5 to 20 percent of the total mass of rock heated depending on the quality of the ore. If the liberated gas constitutes only 10 percent of the rock mass, once it is released from its molecularly bound state it will increase in volume by a factor of several hundred times. The target type of asteroids 310, the source bodies for CI and CM meteorites, can be expected to be permeable and they are known to be structurally weak with low tensile strength. The increase in gas volume inside the permeable rock structure will cause the formation of an internal pressure gradient driving the diffusion of the gas out of the rock. This internal gas-pressure driven tensile stress in combination with the thermal stress associated with rapid heating will fracture the material 320 locally and cause it to spall and shed small pieces or chips 320. Once these pieces 320 are separated from the surrounding rock 310, the expanding and escaping gases will drive them away from the surface exposing fresh new, still cold surface 330 below and the excavation process will continue. FIG. 7 shows how this continuous optical mining process can be visualized.

Figure 8:
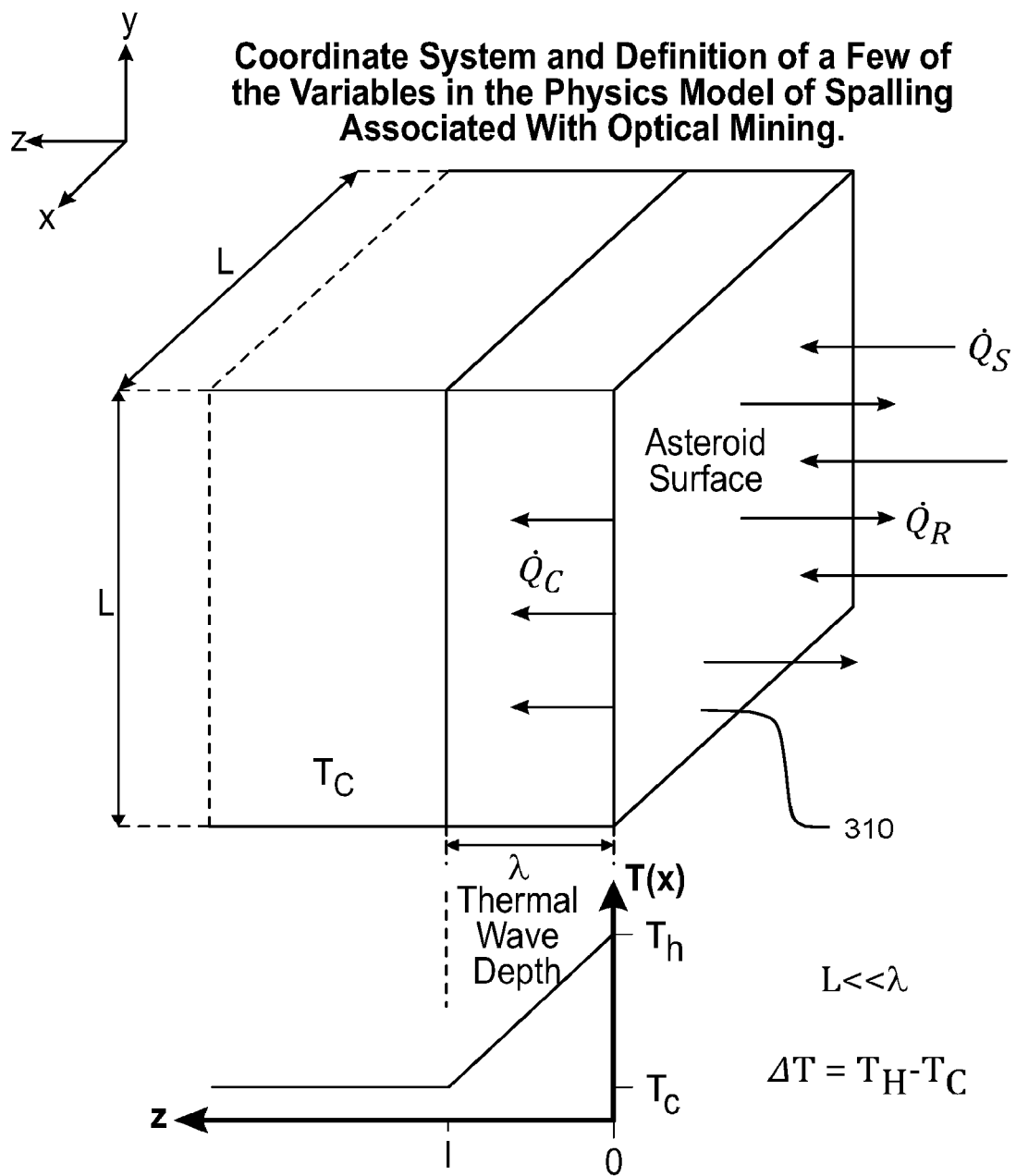
FIG. 8 shows the coordinate system and defines some of the key variables used to model an optical mining embodiment.

FIG. 8 shows the coordinate system and defines some of the key variables used to model an optical mining embodiment. Although in reality the temperature profile into the rock will be more like an exponential decay than linear with distance, we use a common simplifying assumption that as the spall surface moves into the rock a thermal layer moves with it. This allows us to closely approximate the conductive heat flux into the rock using a simple linear one dimensional model.

Mission studies show that for asteroid ISRU to support missions of human exploration or to be economically significant on an industrial scale it will have to produce hundreds to thousands of tons of material per year as a minimum. This implies a requirement over time to grow to process thousands to tens of thousands of tons of asteroid material per year. With this in mind, it is important to understand how the processes we are working on can be used at scale. One of the important dimensions of scale is thermal time constant. The historical literature includes ISRU concepts in which asteroids are captured in bags and heated through surface heating and conductive transfer to the interior.

To evaluate the feasibility of these approaches we developed a simplified spherical lumped mass approximate model for estimating asteroid thermal time response. The equations and parameters of this model along with the simplified physical picture are show in FIG. 9. Although the lumped mass model is in common use as a reasonable approximation in many settings, it does have the possibility of over estimating heating times because it assumes a thermal profile with depth over time. A more accurate model allows for a very steep temperature gradient close to the surface early in the heating process which gives rise to large initial heat flux. To accommodate this possibility we also developed a thermal wave model of asteroid heating. The equations and parameters associated with this model are shown in FIG. 10. We derived a simple equation for thermal wave propagation speed and solved a first order ordinary differential equation to calculate the faster heating that takes place due to the initially high thermal gradient.

Figure 9:
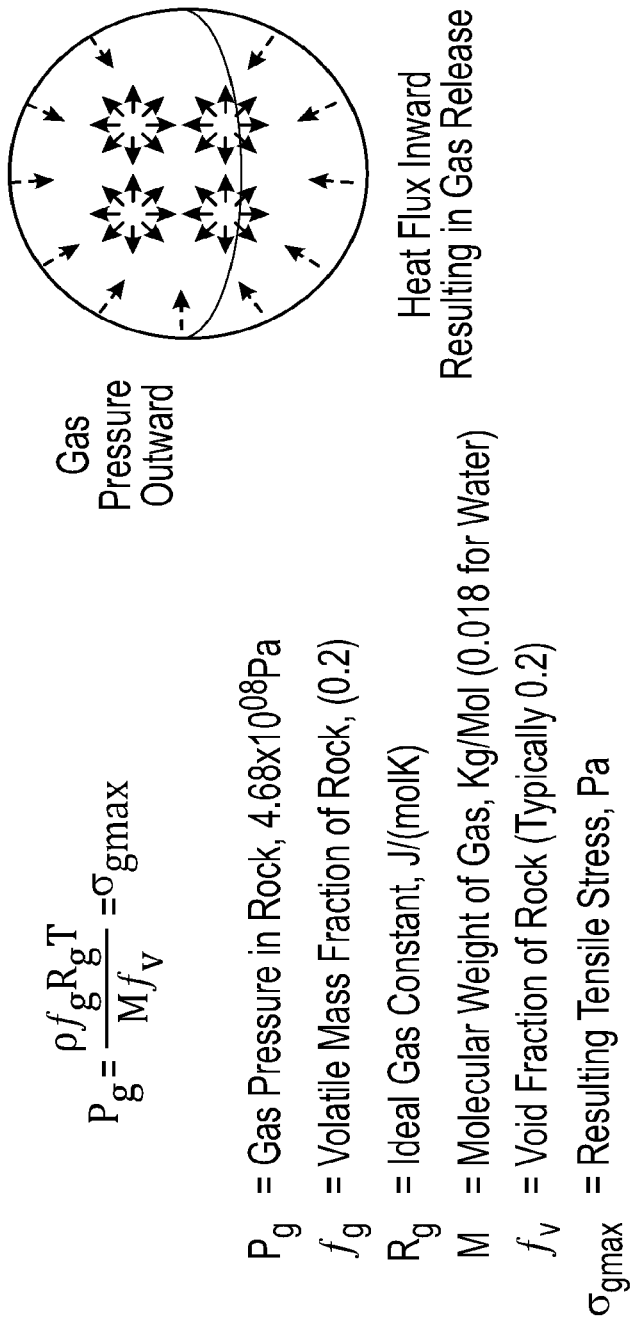
FIG. 9 shows a simplified spherical lumped mass approximate model for estimating asteroid thermal time response for an optical mining embodiment.
Figure 11:
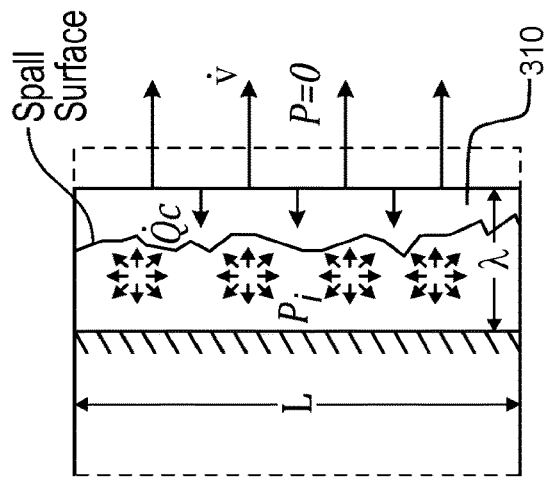
FIG. 11 shows a Thermal Wave Model for Estimating Asteroid Heating for an optical mining embodiment.

Numerical results for the models of FIGS. 9 and 10 are provided in FIG. 11. It is interesting to note that the difference in heating time between the lumped mass approximation and the somewhat more accurate thermal wave model is only about 2×, which is much less than the uncertainty in material properties or the expected variation in material properties. Note that FIG. 11 covers a range of sizes from 1 mm grains of regolith to 10 meter asteroids which would mass approximately 1,200 tons. On the scale of engineering systems for human exploration or industrial activities, these are all very small objects. Supporting a modest human exploration program would require extracting virtually all the volatiles out of a 10 meter diameter asteroid every year but a 10 meter diameter asteroid would take "at least 10 years to bulk heat by conduction and probably more like 1,000 years given the presence of regolith insulation or fractures in the rock that reduce thermal conductivity at large scale. This analysis strongly suggests that bulk heating of asteroids is not the way to extract volatiles to support human exploration programs or large scale industry in space.

Optical mining depends in part on the pressure of gases escaping from the rock being high enough to move spalled debris 100 out of the way to expose new cold surface to the optical beam for excavation. With this in mind it is important to perform scoping calculations to determine the range of possible pressure levels that can be applied by the escaping gas. One theoretical limit to this parameter is to assume an extreme case of zero permeability in the rock. FIG. 12 shows this analysis. A simple calculation shows that the upper limit to the pressure that can be produced inside a typical carbonaceous asteroid assuming a 20 percent volatile mass fraction (which would be about half water) and a 2 percent void fraction is about $5 \times 10^8$ Pa, or 5000 atmospheres. This indicates that if the gas could not diffuse outward through rock as it is released, it would certainly be enough force to cause the rock to explode. However, this is a somewhat academic calculation as the gas will permeate outward through the rock.

Figure 13:
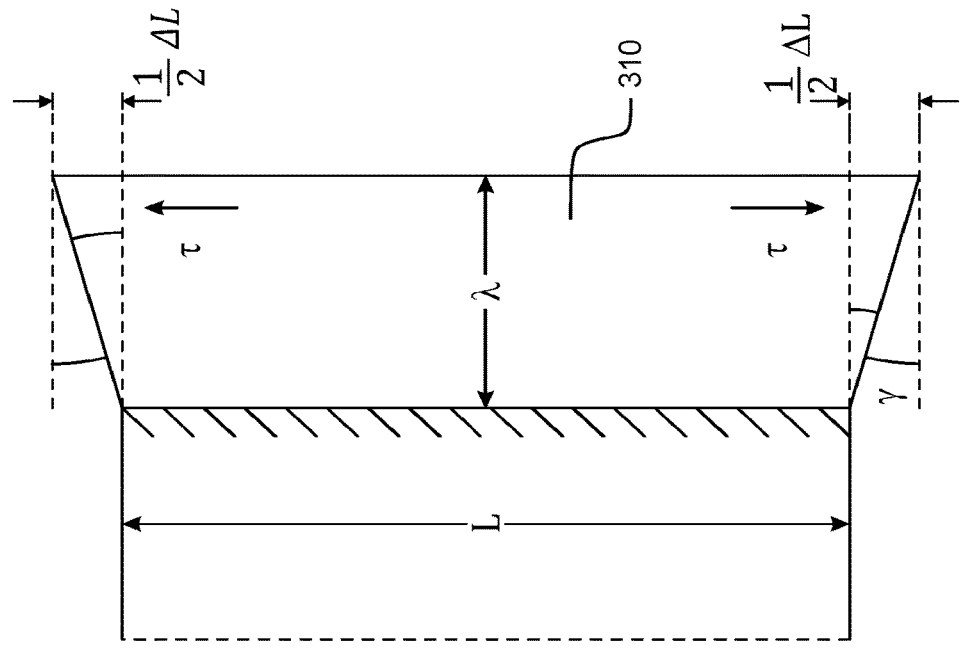
FIG. 13 shows a model for compressive and shear stress induced by thermal expansion in an optical mining embodiment.
Figure 15:
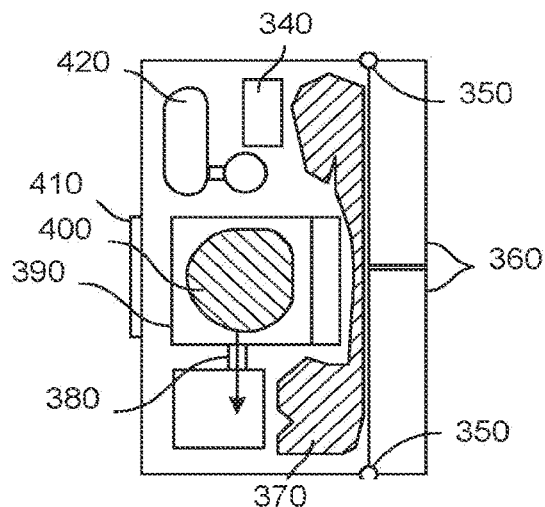
FIG. 15 shows an optical mining experiment's internal components.

FIG. 13 shows calculation of the magnitude of the internal gas pressure drop that creates tensile stress in the rock driven by gas release based on Darcy's law. In FIG. 14 shows calculation of the mass of released gas coupled with the ideal gas law. Mass flow rate is determined by the rate of heat flow into the rock and the enthalpy of dehydration or volatilization of the evolved gases. Permeability of asteroids is a studied parameter in the field of planetary science and viscosity of these gases is well known. $\Delta P$ is the pressure drop. Tensile stress can be calculated based on pressure drop.

Conductive heating into rock can evolve enough gas such that the equilibrium pressure balance driving gas diffusion out of the rock can create enough tensile force to break the rock apart. We find that the ratio of the pressure induced in the rock to the tensile strength of the rock is a dimensionless parameter we call the Spall Coefficient, S. If S is much greater than unity, the rock will span due to gas release. If S is much less than one, gas release due to conductive heating cannot fracture the rock. If S is near one, it is indeterminate.

For the Spall Coefficient for typical water rich CM type meteorites, S has a value of approximately 0.03, so it is highly unlikely that gas release due to convective heating can be the primary cause of spalling in such a body. However, this is due in large part to the high strength of these bodies. The value of the tensile strength in FIG. 12 is taken from data for the Murchison meteorite as documented in the AMR FAST public report. This tensile strength of 3 MPa is actually higher than most concretes. CM type materials can be expected to have higher water content and lower tensile strength so in some cases they may have Spall Coefficients greater than one.

We have observed in the laboratory that when a beam of optical radiation at intensities in the range of hundreds to a few thousand suns strikes the surface of a rock, meteorite or asteroid simulant, nothing interesting appears to happen for a few seconds. It is apparent that it takes a while for the surface to heat to some type of quasi equilibrium condition which is hot enough for observable physical changes to take effect. To understand this transient thermal response at the surface we refer to the diagram of FIG. 14 and formulate a simplified energy balance at the surface neglecting outgassing and spalling effects for the moment because we are interested in the time period before those phenomenon are present.

Another physical phenomenon to consider for spalling in optical mining is thermal fracture. Two sources of thermal load induced fracture are compressive stress and shear stress. Compressive stress is felt where the heated material is elongated laterally but prevented from expanding by the surrounding unheated material.

For optical mining, there is also thermally induced shear stress, which is shown in FIG. 13. This stress is caused by end heating of a bar of material which is physically constrained at the base of the thermal layer where later expansion is not occurring. Both compressive and shear stress for the expected geometries and conditions are enough to fracture the rock during the time that the transient thermal wave is developing, but whenever the geometry will support shear stress it is a much stronger effect than compressive stress. Thermal stress is almost certainly the material failure mode that leads to spalling in the presence of highly concentrated sunlight. Hence, the spalling of rock surfaces in the presence of concentrated sunlight 210 does not require the presence of significant quantities of volatiles in the rock. Thermal stress can cause spalling on its own and can significantly enhance spalling in combination with volatile release driven tensile stress.

As radiation initially hits the cold rock surface a thermal transient is established with temperature well below the black body temperature of the applied radiation. However, over a few seconds as the thermal layer thickens, conductive heat transfer slows and surface temperature increases. Before surface temperature can approach the blackbody temperature the rock is fractured by thermal stress. Outgassing which can yield local pressures up to about one atmosphere pushed the spall fragments out of the way exposing new cold surface thereby continuing the process. The speed of the spall front propagation is limited not by the thermal time constant of the bulk object being heated, but is instead set by the depth of the transient thermal wave—which is on the order of millimeters—corresponding to velocities on the order of meters per hour, rather than the meters per year that would be required for conductive heat transfer without spalling.

Spalling is the fracturing of rock into smaller pieces. Spalling induced by highly concentrated sunlight 210 is a critical aspect of optical mining technology as it is a critical element of the optical mining excavation process. In optical mining, spall fragments are carried away from the asteroid surface by outgassed volatiles thereby exposing new virgin surface to sunlight. This virgin surface is then spalled and excavated in a continuous process. We classify spalling observations into four categories:
1. Explosive spalling occurs when mined material suddenly or explosively fractures into several fragments.
2. Fragmentation spalling occurs when mined material lose material in large fragments expelled from the surface with the outgassed volatiles providing enough force to carry the fragments upward against gravity.
3. Particulate spalling occurs when mined material expels small particles.
4. Fracture spalling, while not technically spalling, occurs when mined material fractures after light exposure.

Factors that play a significant role in spalling include light intensity level, simulant composition, and material strength.

Regolith and weakly bound fragments of material on an asteroid surface can be rapidly or slowly expelled from the surface when illuminated with light of varying intensity. By modulating the intensity and power level of the supplied light, it is possible to control the rate of expulsion of materials. Weakly connected asteroid material 310 close to a surface will move away from the surface and light beam.

Optical Mining can drive $H_2O$ and $CO_2$ from asteroid materials. Excavation of both hard rock and regolith appears to be feasible. Mass spectra reveals dynamics of gas evolution. Hydrated simulants and meteorites produce gas. Water outgases first, followed by $CO_2$ in larger targets, while in smaller targets $CO_2$ outgasses first, suggesting a scale factor effect.

Optically mined volatiles can be cryotrapped 220.

Volatile materials such as water and carbon dioxide can be extracted from a CI or CM chondrite asteroid through optical mining in microgravity. High performance solar concentration from a small (2 class) precision inflatable solar concentrator 560, demonstrating microgravity outgassing of useful volatile materials from authentic asteroid substrate selected from known meteorites, and demonstration of collection of outgassed volatiles in a passive secondary trap. An embodiment comprises an Optical Mining Experiment Module (OMEM) approximately 12×10×18 inches with a mass of approximately 25 pounds.

The structure of an OMEM in accordance with an embodiment comprises a grappling fixture 410 on the back side compatible with the JEMRMS. The OMEM can be launched to ISS as an external payload on a carrier 550 such as the Dragon trunk. While in transit the OMEM will not require power or data services and will be a simple inert payload. Once the carrier vehicle has arrived at ISS the OMEM will be grappled by the JEMRMS using the grapple fixture 410 on the OMEM. After it has been grappled the OMEM 430 can run off the power and data provided through the JEMRMS grapple interface. FIGS. 15, 16, 17, and 18 provide cartoon views of the configuration of the OMEM at various stages in the flight experiment. Power and data needs will be minimal to include commands and power to actuate some simple standard release mechanisms and to power a small video camera as described below.

The lids are attached to the inflatable structure, so ejecting the lids ejects the inflatable. The nominal design size for the inflatable reflector is between 2 and 2.5 meters in diameter, but this is not a firm requirement. The focal distance of the reflector is very short so there should be no concerns about heating or optical danger from the reflector. An important consideration is that we are aware that the JEMRMS can not normally reach inside the Dragon trunk while the Dragon is berthed at ISS. We are assuming that as part of the concept of operations, the Dragon vehicle will need to be positioned such that the JEMRMS can reach the OMEM to remove it from the trunk.

Components of an OMEM in accordance with an embodiment comprise:
An evacuated jar, the storage container 390, with a fused silica window containing the target 400. The volume of the storage container 390 can be less than one liter.
A mined volatiles container 380 (a second evacuated jar)
A passive one-way valve with screens and filters connecting the storage container 390 to the mined volatiles container 380
A back structure with a JEMRMS compatible grapple fixture 410
A small (≈5 cc) high pressure $CO_2$ or other similar inert gas storage bottle with valves and regulators to provide controlled inflation gas for the inflatable solar reflector 20

A thin film, precision inflatable, deployable solar concentrator in a Cassegrain configuration Two deployable (hinged and separatable-ejectable) lids 360

Deployment hinges 350 connecting the lids 360

A separation system 180 for the inflatable concentrator and lids based on CubeSat ejectors A small video camera Electronics 340 for running the lid opening, reflector deployment, camera functions, and reflector/lid ejection sequences A method in accordance with an embodiment comprises one or more of the following steps:

1. The OMEM is launched to ISS as a passive external payload

2. After the carrier vehicle is docked at ISS, the JEMRMS grabs the OMEM and points its front surface toward the sun with an accuracy of less than one degree for at least one full orbit starting during eclipse.

3. OMEM nominal operations take one full orbit and start once the OMEM is sun pointed as ISS enters eclipse.

Figure 16:
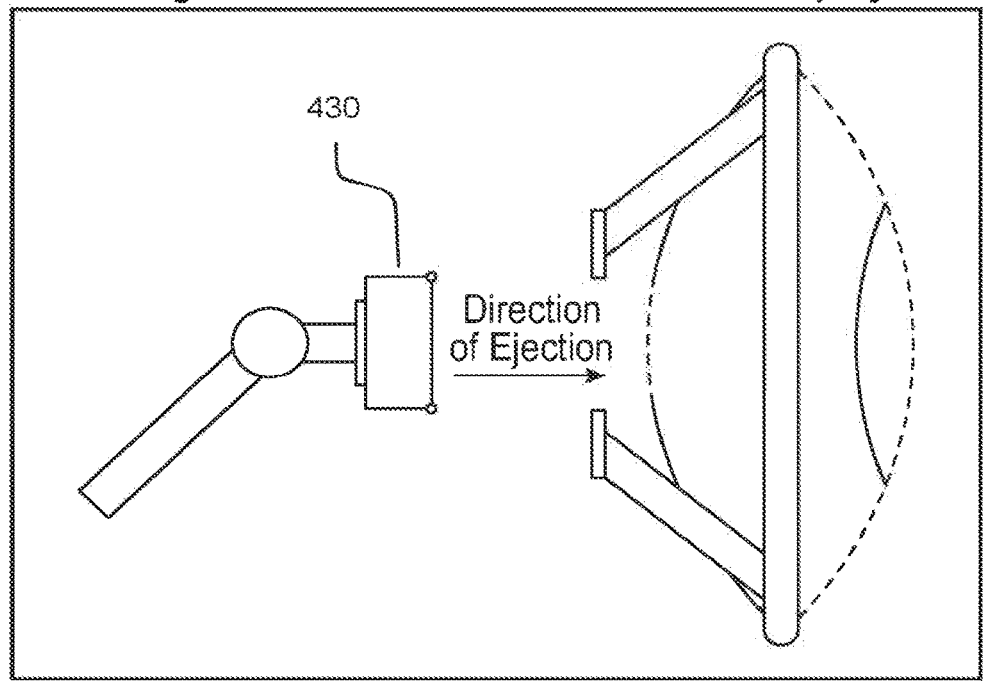
FIG. 16 shows OMEM after the hinged lid has been opened and the inflatable reflector has been deployed in accordance with an embodiment.
Figure 17:
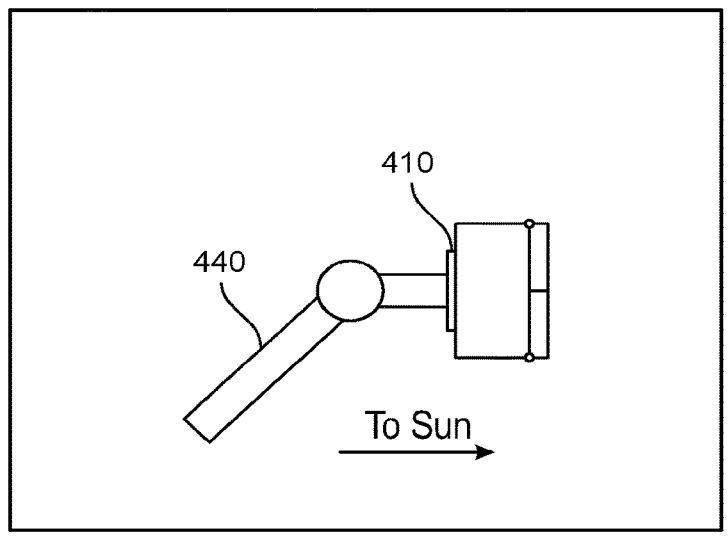
FIG. 17 shows OMEM after it has been grappled in accordance with an embodiment.
Figure 18:
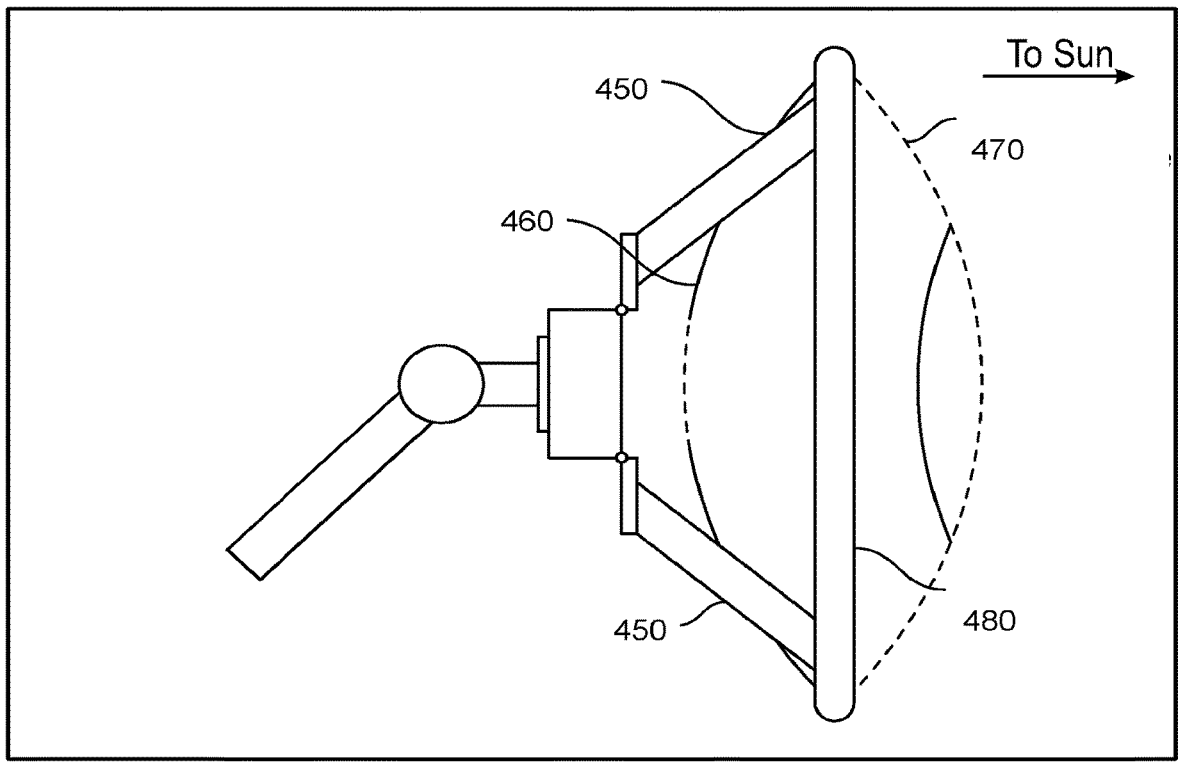
FIG. 18 shows OMEM after the hinged lid has been opened and the inflatable reflector has been deployed in accordance with an embodiment.
Figure 19:
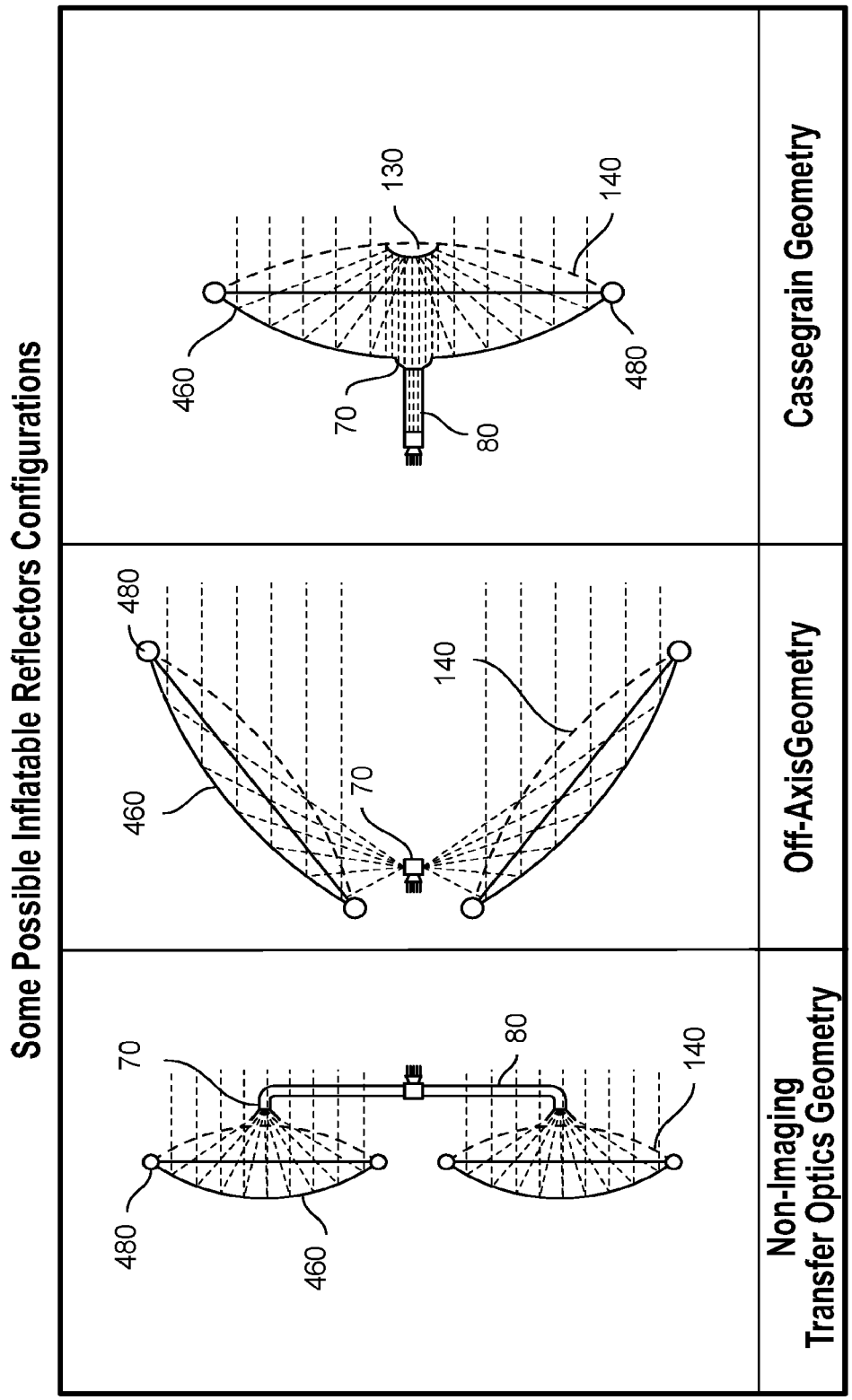
FIG. 19 shows inflatable reflector configurations in accordance with embodiments.
Figure 20:
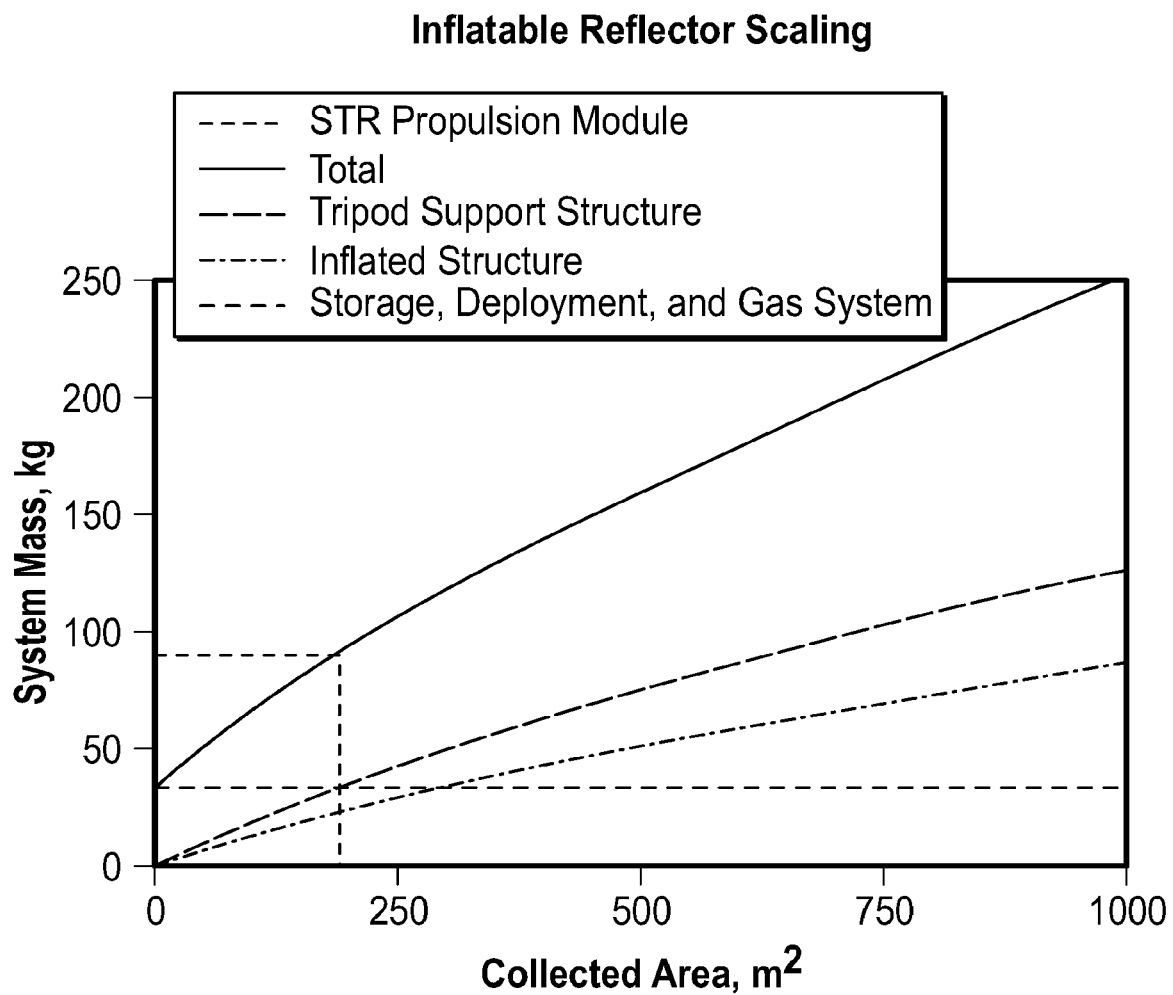
FIG. 20 shows inflatable reflector scaling in accordance with embodiments.
Figure 21:
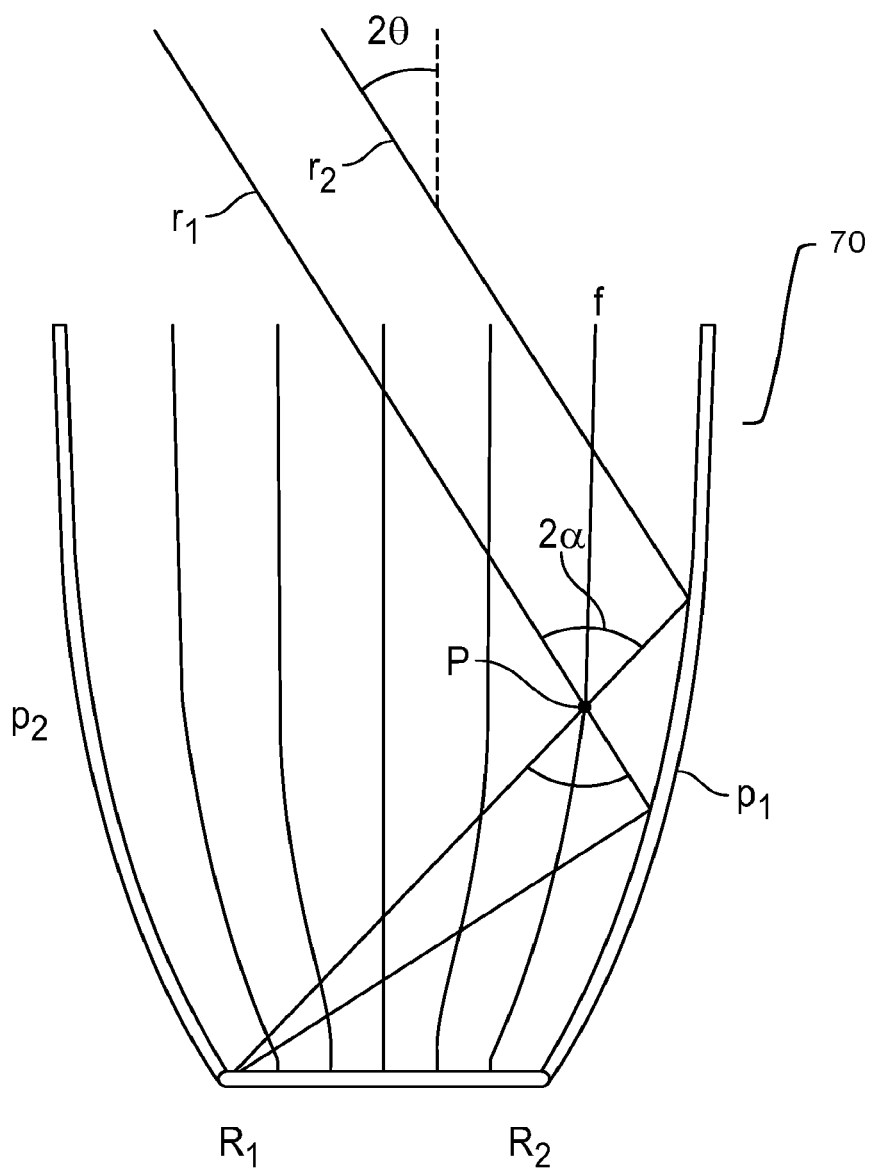
FIG. 21 shows a Winston horn in accordance with an embodiment.

4. As ISS enters eclipse, a command is sent to the OMEM initiating camera function, box opening (which takes a few seconds), and inflatable deployment which takes another 30 seconds or so. FIG. 16 shows the configuration prior to deployment and after lid opening and inflation of the reflector.

5. Nominal Sun pointing is established during eclipse and maintained, via pointing actuators 570, through the in-Sun portion of the orbit (we will need at least 30 minutes of Sun-pointing in-Sun).

6. As the Sun hits the reflector, the asteroid 500 will be heated within its enclosure 50. Spalling and outgassing of the asteroid are observed through the fused silica window by the camera. All spalling and outgas products are contained within the OMEM jars. While this is happening, a fraction of the outgassed products move through the one-way valve by normal gas expansion into the mined volatiles container (the second jar).

7. As ISS moves again into eclipse, the reflector is turned away from the Sun and the command to eject the reflector is sent.

Figure 36:
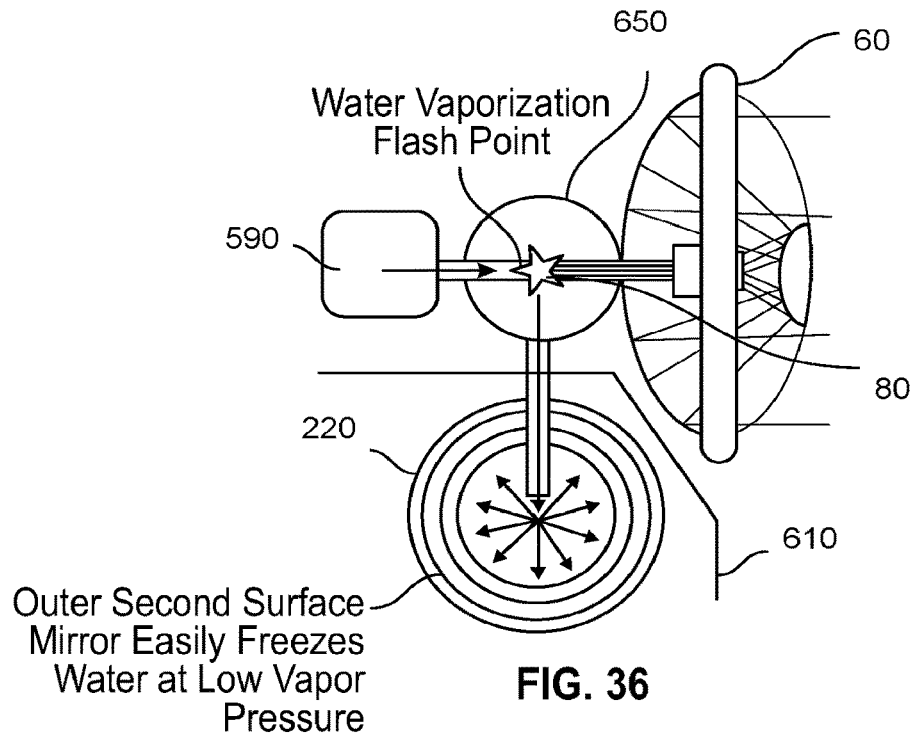
FIG. 36 shows water vapor transfer and solid storage in accordance with an embodiment.
Figure 37:
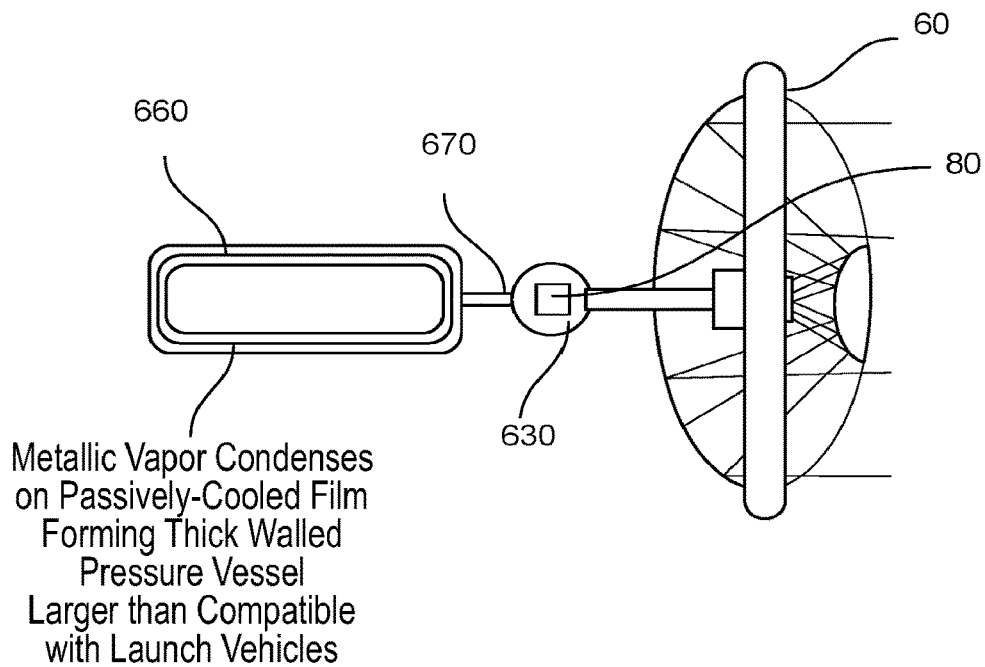
FIG. 37 shows orbital vapor phase large structure fabrication in accordance with an embodiment.
Figure 39:
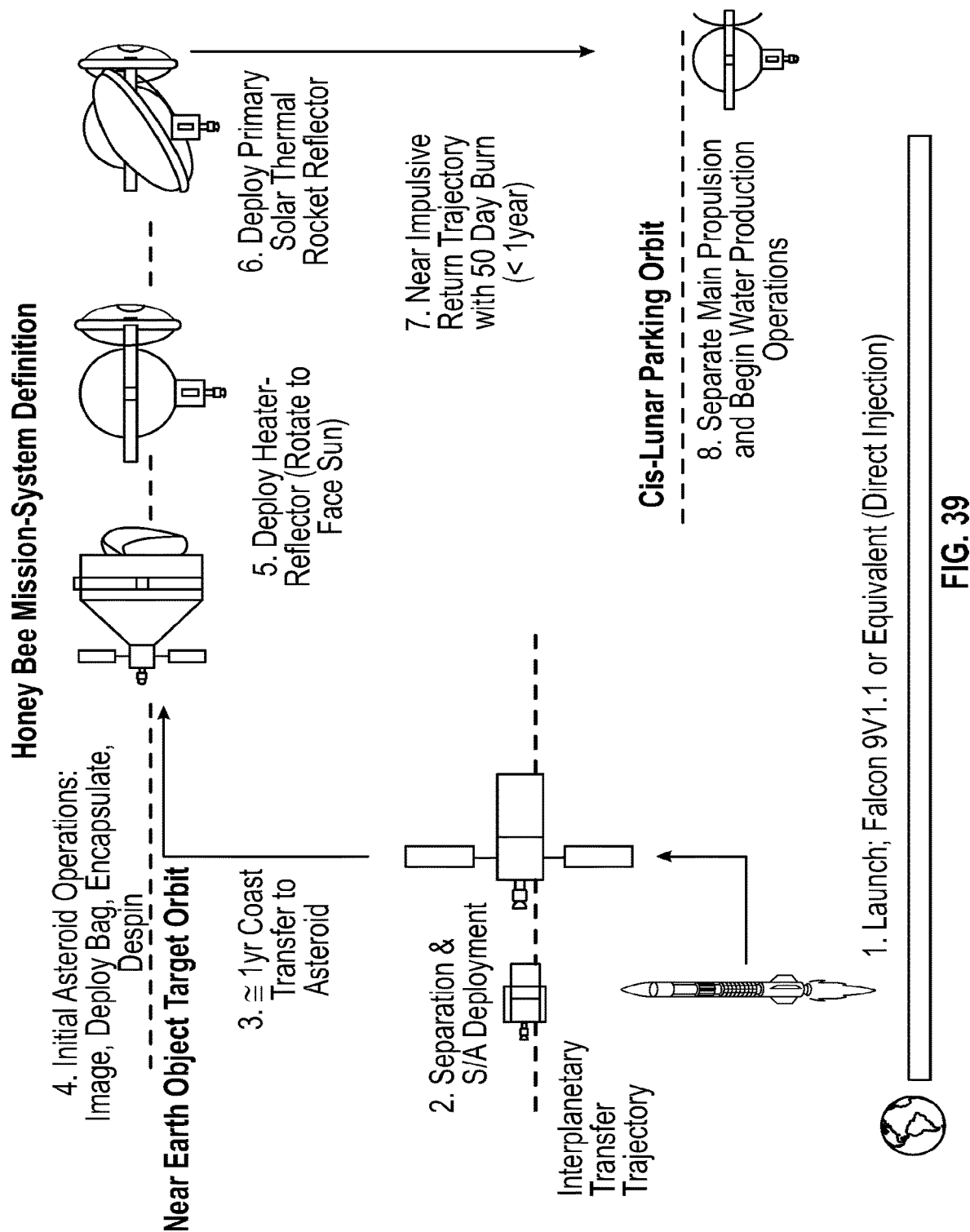
FIG. 39 shows a honey bee mission in accordance with an embodiment.
Figure 40:
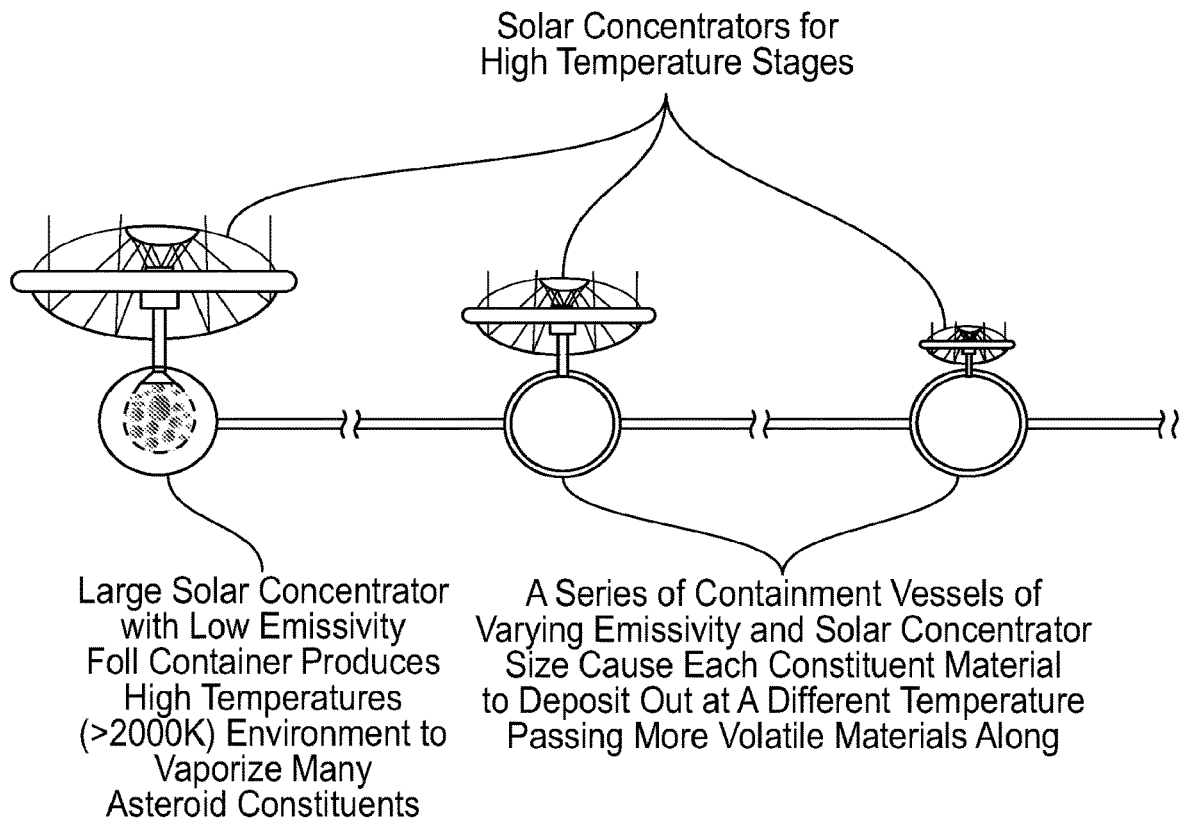
FIG. 40 shows asteroid material distillation in accordance with an embodiment.
Figure 41:
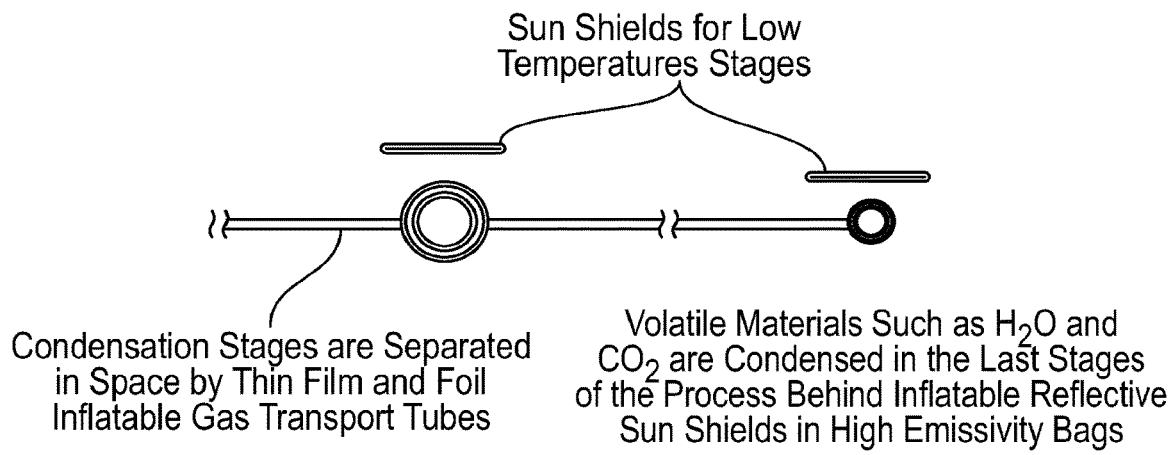
FIG. 41 shows asteroid material distillation in accordance with an embodiment.

8. The reflector along with the OMEM doors/lid are ejected safely away from ISS as shown in the upper right hand quadrant of FIG. 36.

9. The JEMRMS moves the OMEM 430 to the airlock.

10. A waiting period of is provided to allow the sample jars to cool down.

11. The OMEM is brought inside the station and stowed for return to Earth

12. The OMEM is returned to Earth.

Optical mining in accordance with an embodiment can comprise hardware technology or mining process technology. Process technology can be part of larger architecture, Apis (Asteroid Provided In-Situ). Hardware components of Apis architecture in accordance with an embodiment comprise an inflatable bag 50 to capture the asteroid 500 or boulder, a precision inflatable solar concentrator 560, non-imaging optics 30, a gas handling system, thin film ice storage system, and solar thermal rocket technology that can work with $H_2O$ and $CO_2$ propellants.

One issue associated with induction of spalling is that the optimal power limit for spalling can be inadvertently exceeded, causing sintering and often melting instead, which bind (strengthen) the surface material instead of fracturing it. Alternatively, using a power level that is too low does not provide sufficient thermal shock and gas release pressure to fracture the material and can dehydrate the material too slowly causing it to lose its volatile content without fracturing. There may also be certain types of asteroid surfaces that simply don't spall at any intensity level.

The cryopumping approach that has the most promise for optical mining ISRU systems is counter flow gas. The requisite gas can be supplied by a small fraction of the extracted volatile material (eg. warm $H_2O$ and/or $CO_2$).

An Apis embodiments can support NASA's plans for human exploration by providing mission consumables and propellant for all missions of the Evolvable Mars Campaign including: human exploration missions to Lunar Distant Retrograde Orbit (LDRO), human exploration missions to near Earth asteroids in their native orbits, exploration of the Moon, and exploration of Mars. Requiring only a modest-sized spacecraft launched to a low positive C3 compatible with a single Falcon 9 rocket, Apis embodiments are capable of providing NASA with propellant and mission consumables in cis-lunar space. Optical mining in accordance with an embodiment could also be used to extract the volatile materials from the target of the Asteroid Redirect Mission (ARM) and convert that material to consumables and propellant in cis-lunar space to support human exploration.

Optical mining is a way to create an industrial revolution in space in which propellant and other consumables for commercial processes in space are supplied from near Earth asteroids instead of from the surface of the Earth. Such propellant, if mined from highly-accessible Near Earth Objects (NEOs) can be used to supply propellant for embodiments comprising reusable solar thermal orbit transfer vehicles that fly on recirculating routes between LEO, GEO, and a propellant depot 290 in LDRO. Embodiments comprising these reusable solar thermal OTVs 200, called herein Worker Bees, more than double the effective throw capability of launch vehicles by eliminating the need for high energy upper stages and allowing rockets to launch their payloads to LEO instead of to high-energy transfer orbits.

Embodiments enable human exploration of cis-lunar and space industrialization by allowing pressure vessels, storage containers, radiation shields 610, structural elements, and habitats construction from asteroids via vapor deposition. Embodiments comprising HelioFab feedstocks are also usable for 3D printing small precision parts, leaving only humans, electronics, optics, and other special components to Earth-launch.

Because launch to space is violent and expensive with limited stowage volume, space-based structures are over-designed for orbital stress and extremely expensive. Asteroids are a virtually unlimited resource, but terrestrial material processing and fabrication processes don't work in space.

Embodiments comprising a HelioFab apparatus 10 use thin films and foils as solar reflectors 20, sun shades, radiators, and low-pressure containment for distillation of asteroids into feedstocks and vapor-phase deposition onto thin foils for fabrication.

APIS combines the technologies of thin-film inflatable structures and water solar thermal propulsion with an innovative new solar thermal oven technology to extract water from a volatile-rich asteroid.

Embodiments comprise inflatable optical elements, light-tubes, optical diffusers, and Winston cones 70 that provide a combination of highly concentrated and diffuse solar thermal power to heat the asteroid material 310 in a controlled way to force the water to outgas into the enclosing bag 50, 230 at low pressure (10" to 10−5 atm). The highly concentrated sunlight 210 is directed through anidolic optical elements 30 to ablate and excavate within the enclosure bag 50 without the need for impractical mechanical excavation equipment.

An embodiment comprises a step wherein outgassed water is cryopumped at moderate temperatures into a passively cooled thin-film storage enclosure 50. Because the water is stored as solid ice, there is no need for hard-shell hermetic storage. After a few months of resource collection, the Apis vehicle leaves the hardware and goes out to another asteroid to return more water.

Apis system architecture comprises technical elements which overlap in function and structure and work together in unique ways to provide breakthrough performance:
  i) thin-film precision inflatable structures,
  ii) water based solar thermal rocket propulsion,
  iii) anidolic optics, and
  iv) optical mining with passive thermal processing and resource storage.

Reflectors in accordance with an embodiment comprise the storage and release mechanism that holds the structure prior to deployment; the inflatant gas storage and handling system 420; makeup gas to account for leakage; the lenticular structure; a torus 480 to support the lenticular structure; and struts 450. Of these, the torus 480, struts 450, and lenticular structure are made of thin films and inflated. The lenticular structure includes a transparent front surface 140, 470 and a reflective back surface 460. The torus 480 and struts 450 are fabricated from polyamide films bonded to a metallic foils. These are inflated into position, and then the inflating pressure is increased to a level that provides yield stress but not rupture stress to the metallic foil. This causes the foil to undergo plastic deformation and rigidify in place eliminating the need for makeup gas. The lenticular structure, by contrast, is not rigidified, but is made of extremely lightweight (typically 0.25 mil) films and requires an inflation pressure of only 10–5 Pa to provide the ~500 psi film stress needed to pull out wrinkles and provide optimal shape and curvature. At this low pressure, only 100 s of grams of gas are present in the lenticular structure at any one time. Even after worst case micrometeoroid punctures as calculated with standard models, leakage is less than 5 kg/yr after several years for a 20 m diameter reflector optical properties of these devices have been measured on the ground many times.

Surface accuracy and precision have been measured and validated in multiple programs from the 1960s through the 1990s. Note that a 1000 square meter reflector with an optical efficiency of 50% provides over 600 kWt of solar power for a performance figure of merit of more than 2 kWt/kg: more than 15 times better than the best realistic projection of any solar array technology. ARM missions studies typically assume an optimistic 900 kg for an electric power system that produces less than 50 kWe. Another important metric for solar concentrator technology is surface accuracy. A series of analysis and ground based tests with full-scale and sub-scale engineering units starting in the 1950s has consistently confirmed that deviations from ideal parabolic, or other specified doubly-curved surface shape, can be approximately 1 mrad angular error resulting in the ability to provide solar concentration ratios of several thousand to one.

Figure 25:
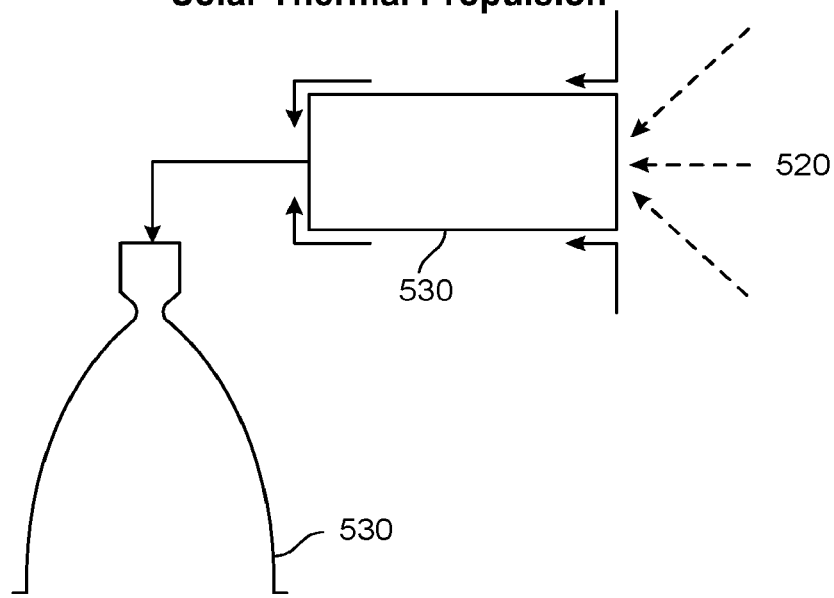
FIG. 25 shows a solar thermal propulsion apparatus in accordance with an embodiment.
Figure 26:
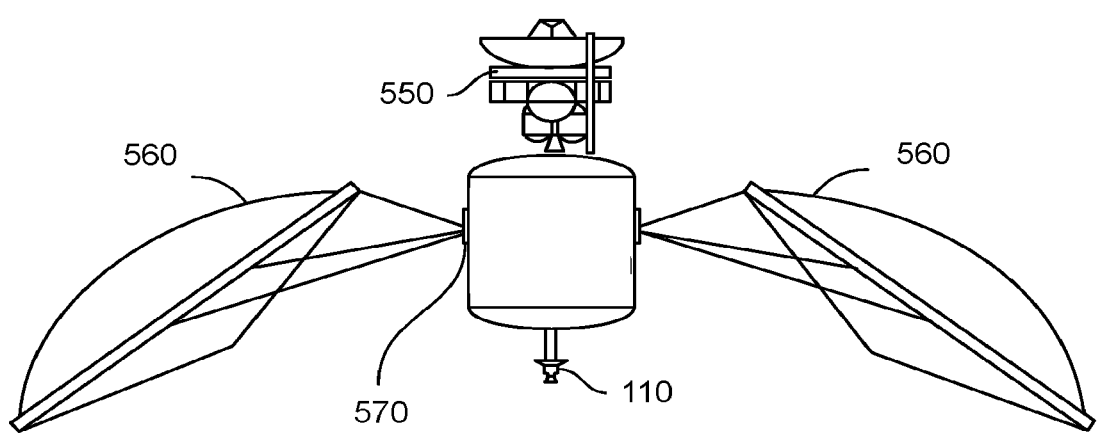
FIG. 26 shows a solar thermal rocket apparatus in accordance with an embodiment.
Figure 27:
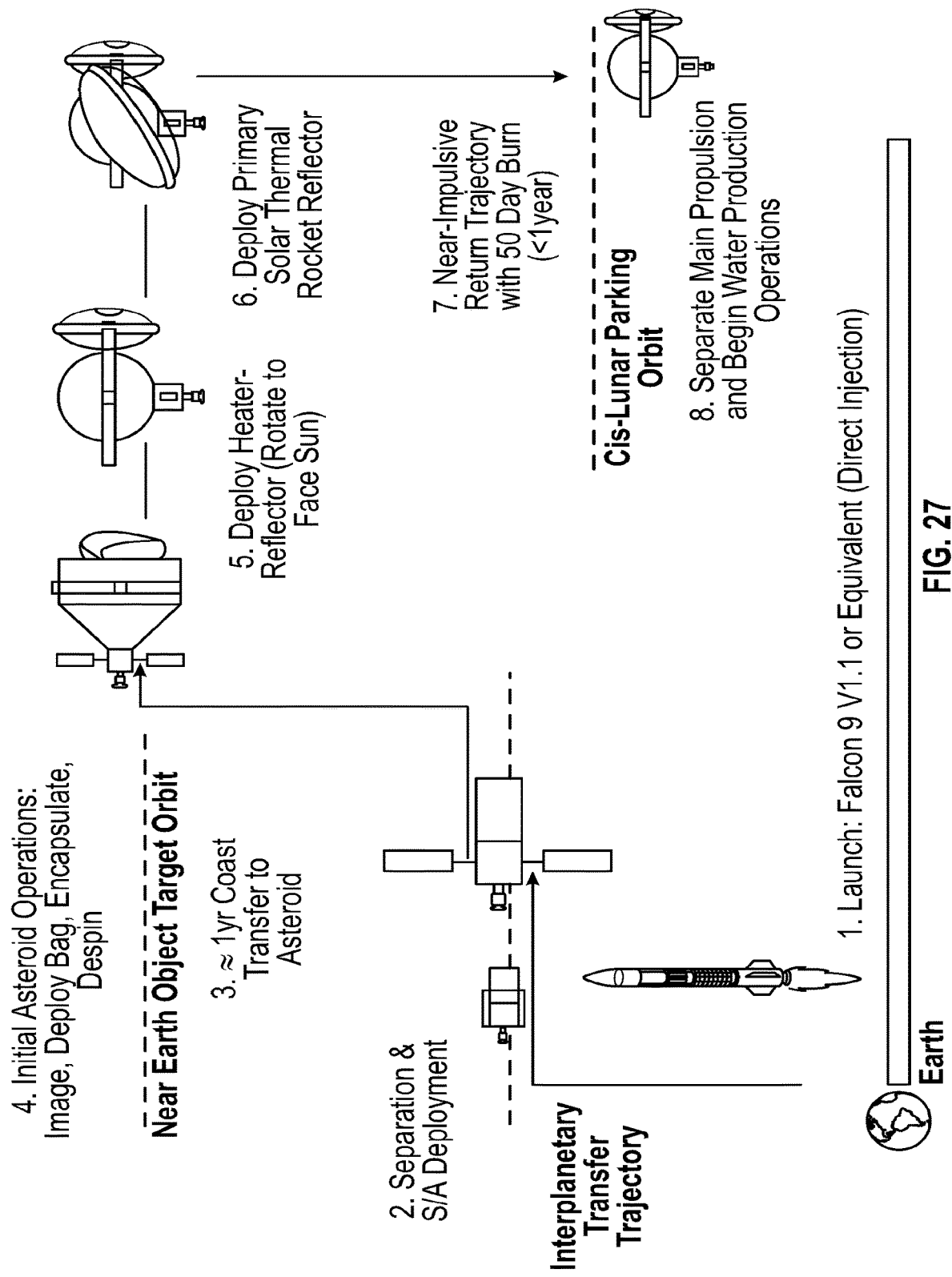
FIG. 27 shows an Apis mission in accordance with an embodiment.
Figure 28:
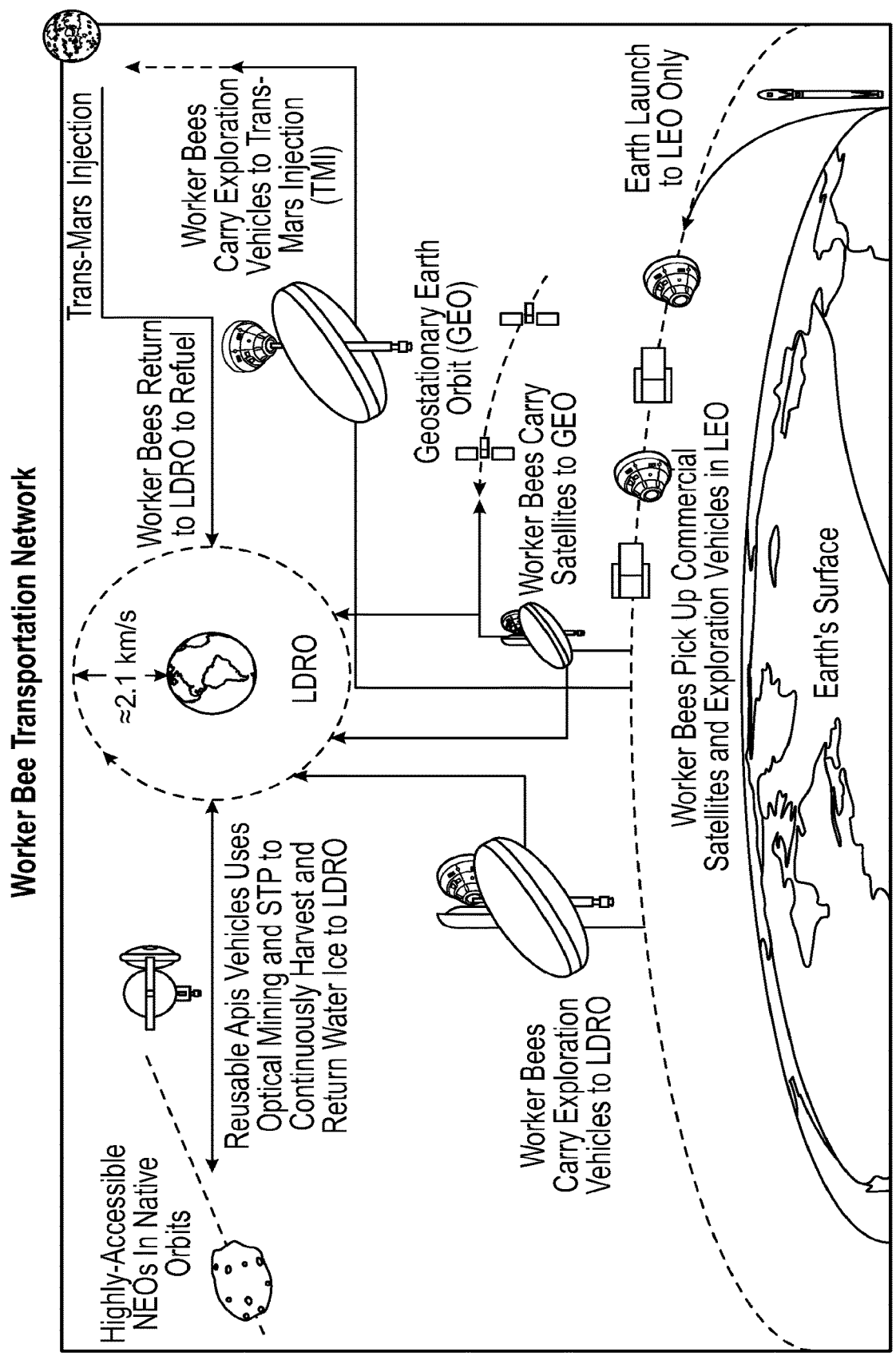
FIG. 28 shows a worker bee transportation network in accordance with an embodiment.
Figure 29:
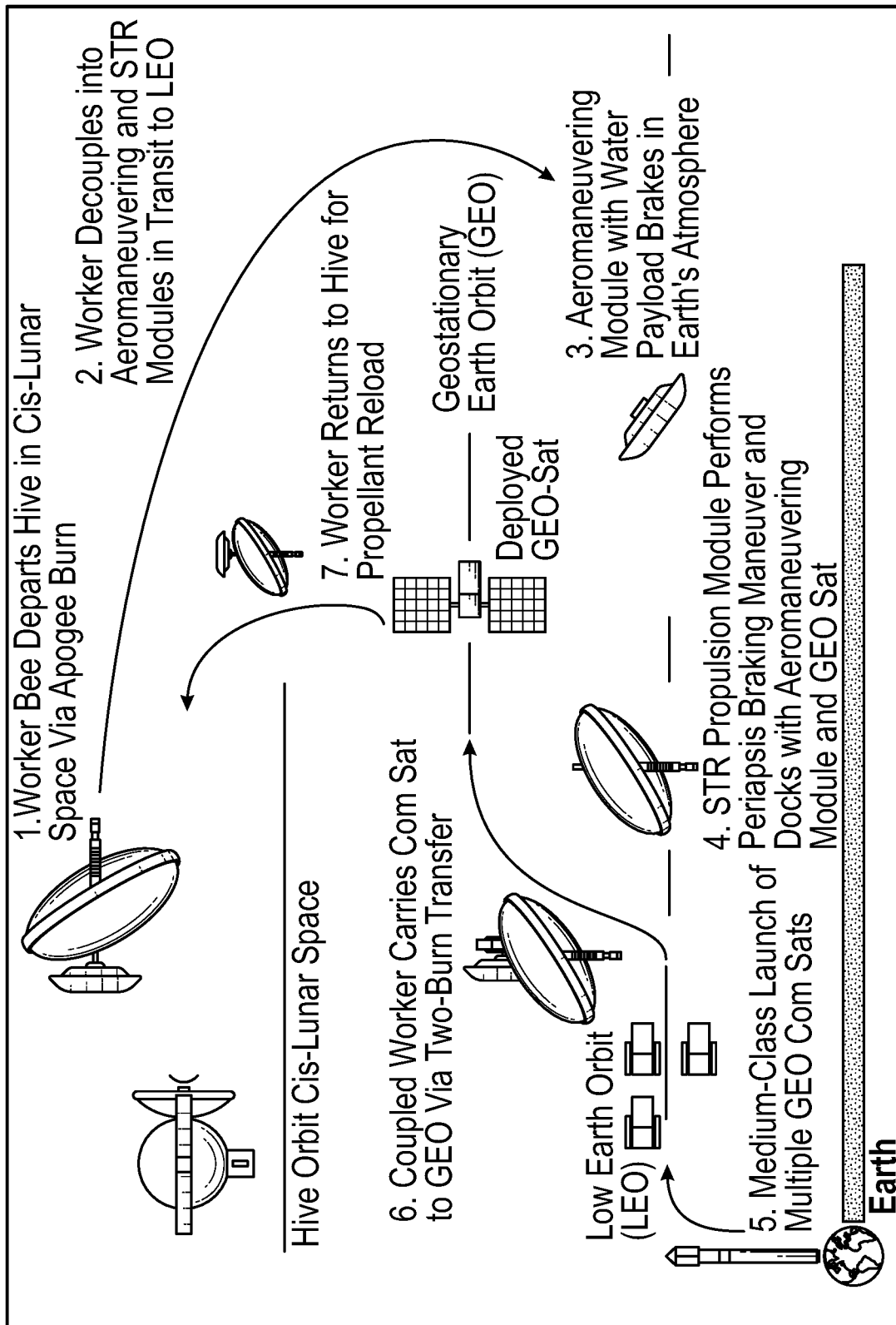
FIG. 29 shows worker bee LEO GEO transportation in accordance with an embodiment.
Figure 30:
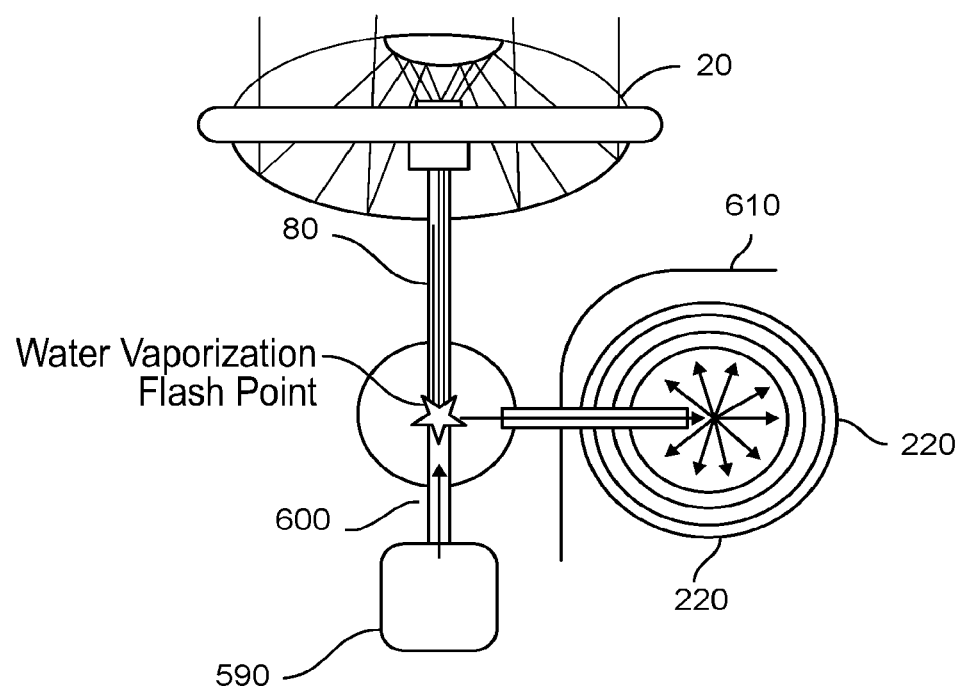
FIG. 30 shows ultralight water storage in accordance with an embodiment.

An embodiment can comprise a Solar Thermal Rocket (STR). FIG. 25 shows one design concept for a solar thermal rocket (STR). For the Apis application, the propellant is water extracted from the asteroid 500. In operation, concentrated sunlight 210 is focused into a hollow cavity 540 and propellant is flowed through a heat exchanger. At a chamber temperature of 2750K an STR in accordance with an embodiment can achieve a specific impulse of 350 seconds.

Anidolic Optics, also called non-imaging optics, is the branch of optics concerned with the optimal transfer of light radiation between a source and a target. Unlike traditional imaging optics, the techniques involved do not attempt to form an image of the source. Instead, an optimized system for optical radiative transfer from a source to a target is desired. For a given concentration ratio, non-imaging optics 30 provide the widest possible acceptance angles and are the most appropriate for use in solar concentration applications in accordance with an embodiment such as an ISRU or STR. When compared to "traditional" imaging optics such as 3D parabolic reflectors, the main advantages of non-imaging optics 30 in concentrated solar thermal applications include: wider acceptance angles resulting in higher efficiencies, less precise tracking requirements, higher performance with imperfectly manufactured optics, high tolerance to structural deformation, higher achievable temperatures, lower re-radiation losses, more uniform illumination of the receiver, improved heat transfer, and design flexibility allowing different kinds of optics with different geometries to be tailored for different applications. Concentration Ratio (CR) will be approximately two times lower due to optical losses. An embodiment could achieve 1 mrad RMS surface accuracy which with losses provides a CR of approximately 2800:1 at pointing error levels of 2°. Nonimaging optical systems in accordance with an embodiment require additional optical surfaces, which can slightly decrease efficiency. However, this loss is more than compensated by the benefits. Two anidolic optical elements used in Apis embodiments are Winston cones 70 and light tubes 80. A Winston cone 70 is a non-imaging light collector in the shape of an off-axis parabola of revolution with a reflective inner surface. It concentrates the light passing into a relatively large entrance aperture through a smaller exit aperture. Winston cones are used in ground-based concentrated solar power applications and for scientific measurements in the far infrared. Light tubes 80 or light pipes are physical structures used for transporting or distributing light.

Figure 49:
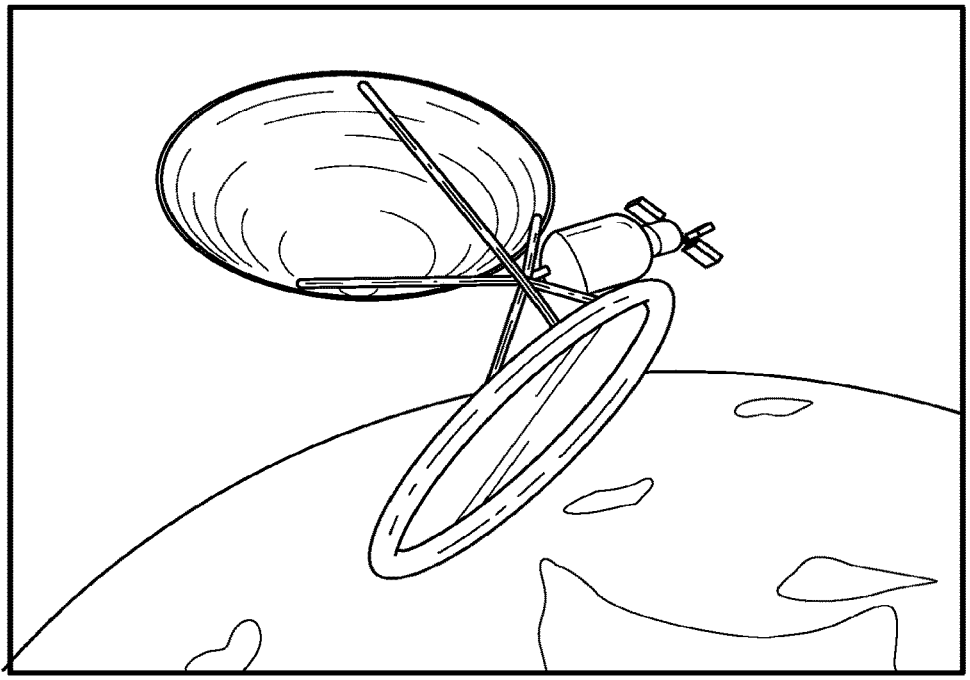
FIG. 49 shows a solar thermal rocket with an inflatable reflector in accordance with an embodiment.
Figure 50:
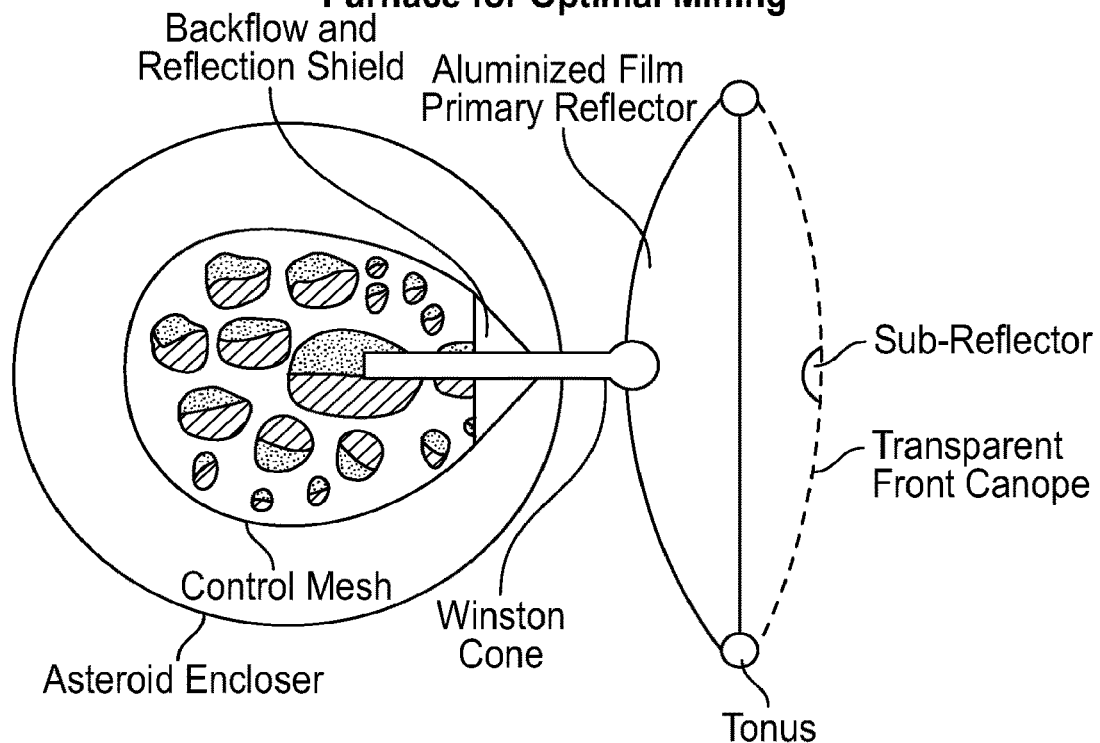
FIG. 50 shows a solar furnace for optical mining in accordance with an embodiment.
Figure 52:
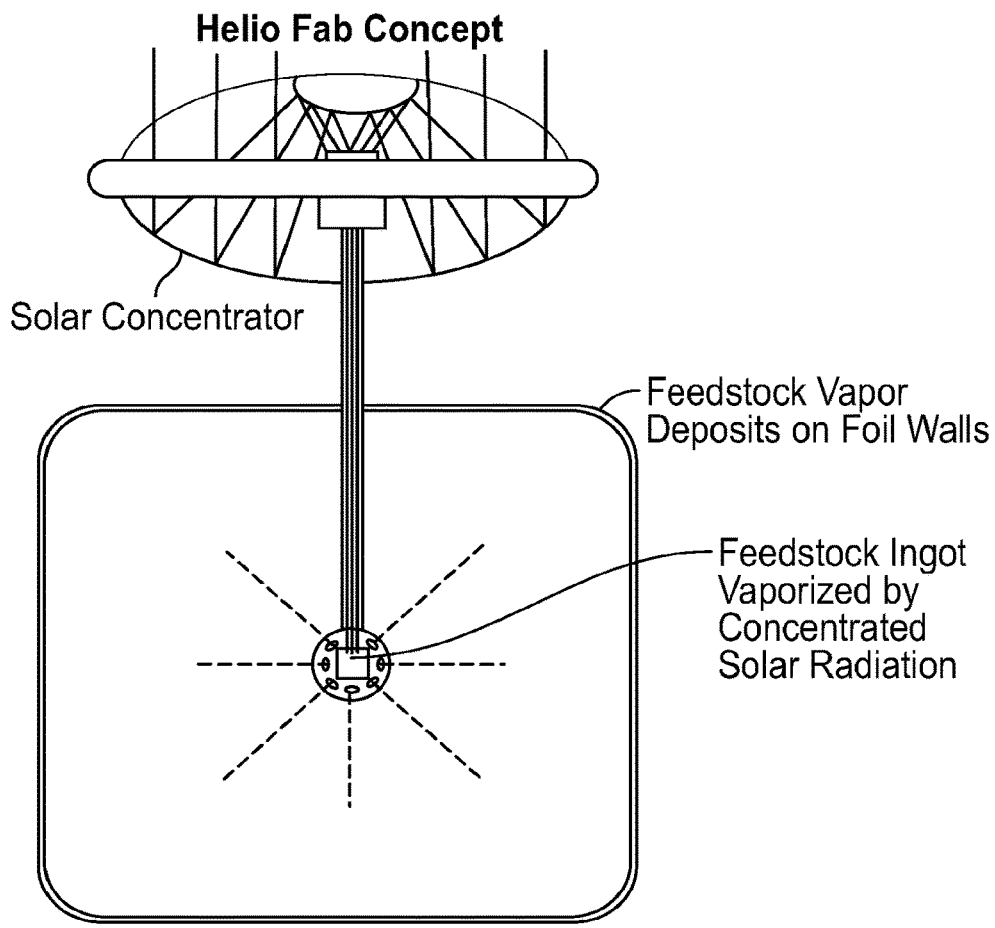
FIG. 52 shows a heliofab in accordance with an embodiment.

Apis embodiments use Winston cones 70 to increase the effective concentration ratio and reduce pointing and surface precision requirements on the primary solar reflector 20 for both the solar thermal rocket and the optical mining system. An embodiment comprising a solar thermal rocket and an inflatable reflector is shown in FIG. 49. For the optical mining application, Winston cones 70 are used to introduce the concentrated solar radiation 520 into light pipes at grazing reflection angles to reduce power loss in light-pipes and to re-focus the light at the end of the pipe as shown in FIG. 50.

CI and CM type meteorites are known to comprise as much as 20%, and typically 10% water by weight. At least one sample of the Ivuna CI meteorite was measured to be 43.5% water by weight. The bulk density of that sample was about 2 gm/cc, so the density of water in that sample was 80% of the volumetric density of liquid water. Meteoriticists have known since the 1960s that gradual or sudden heating to increase temperature causes release of water from meteorites with sudden heating causing not only release, but also disintegration. Water of space origin begins to be driven out at temperatures as low as 250° C., about half is driven out by 400° C., and all is extracted by 900° C.

Figure 23:
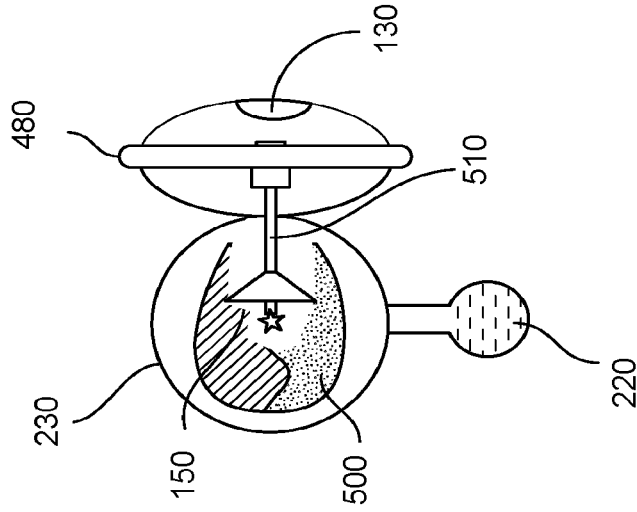
FIG. 23 shows an optical mining apparatus in an intermediate configuration in accordance with an embodiment.
Figure 22:
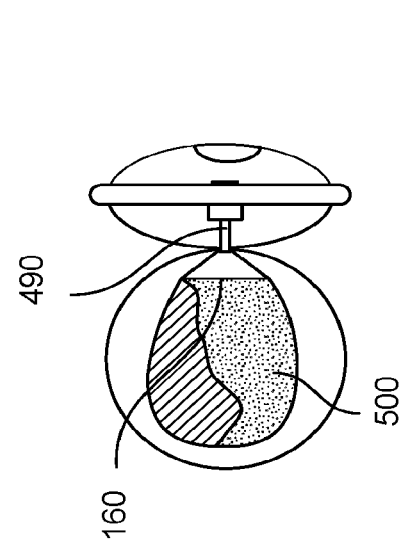
FIG. 22 shows an optical mining apparatus in an initial configuration in accordance with an embodiment.
Figure 24:
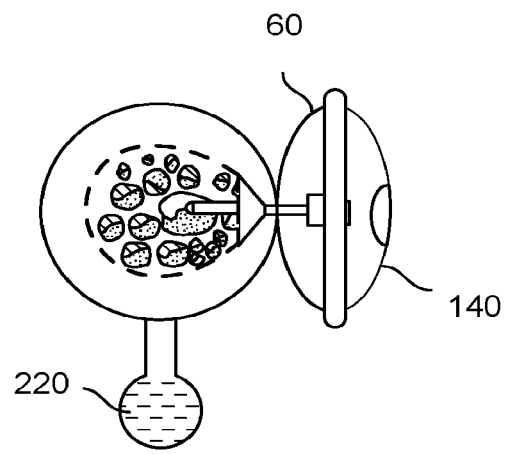
FIG. 24 shows an optical mining apparatus in a final configuration in accordance with an embodiment.

Optical asteroid mining in accordance with an embodiment comprises ablation that is driven by violent outgassing of water vapor which separates chips of rock from the surface and drives them away. In the $10^{-4}$ atmosphere pressure of the Apis containment bag 50, gas expansion will be 10,000 times greater, so excavation produced by gas movement will be even more effective. Highly concentrated sunlight will dig holes 150 in asteroids. Robotic scoops, augers and arms are useless for digging in that environment. A method of optical mining in accordance with an embodiment comprises steps of encapsulating the asteroid 40, 500 in a tough thin-film bag 50 and introducing a light tube 80 through a port 90 in the bag 50 to deliver highly concentrated light (thermal energy) to the surface of the asteroid 40, 500 to excavate the exterior, breakup the asteroid 40, 500 (while containing debris 100 within the bag 50), and outgas the volatiles. Outgassed volatiles can be cryopumped through a filter and an inflatable tube 600, 670 into a passively cooled thin film enclosure 650 where the ice freezes out for storage, transport, and use. This process is depicted in FIGS. 22, 23, and 24. FIG. 22 shows the initial configuration. FIG. 23 shows an intermediate condition, and FIG. 24 shows the final stage of the system when the accessible volatiles have been completely removed from the asteroid 40, 500. Our thermal design and analysis shows that the passive storage of ice in a thin film bag 50 as depicted is enabled through the use of a second surface mirror coating which emits IR radiation and reflects sunlight. This is a standard method used in cryogenic instrument cooling.

Apis embodiments significantly out perform previously proposed architectures for asteroid ISRU by fully exploiting thin-film inflatable structures and non-imaging optics 30 to enable optical mining and high performance, water-based solar thermal propulsion. More importantly, most of the approaches in previous studies, and even some current work, have been motivated by outdated and/or oversimplified models of asteroid physical composition and structure. Many asteroids are not solid, but are more likely to be rubble-piles, loose conglomerations of sand-sized particles, and/or collections of solid objects. It is not practical to "land" on an asteroid. Proximity operations near asteroids are akin to rendezvous and docking. It is preferable to "dock" with an asteroid 40 by enclosing it in a bag 50, as reaction thrusters may disrupt enough dust and regolith to obscure instruments and make operations infeasible. Harpoons or anchors shot into asteroids are more likely to bounce off or break material off the surface than to provide solid attachment points. Augers depend on either high gravity to hold regolith in place or high material binding strength, neither of which are present on asteroids. Methods that involve nets and yo-yos to despin tumbling asteroids are more likely to rip the targets apart and create debris fields than to provide useful control and docking. Recent operational experience with ESA's Philae comet lander illustrate these points.

An Apis embodiment can use optical mining to bring 100 MT of water to lunar orbit based on a single Falcon 9 launch. Total system launch mass for an Apis embodiment with 30% dry mass margin is under 3,000 kg, less than ⅕th that of ARM and well within the throw capacity of a Falcon 9. This is in spite of the fact that the instruments and asteroid capture mechanisms on Apis are nearly twice the mass of those on ARM due to the need to more fully enclose and control the asteroid 40, 500 as needed for optical mining. The primary areas of mass savings for Apis include the 10,000 kg of xenon propellant that Apis does not have to carry due to harvesting propellant from the target, and 800 kg of solar array and power management hardware ARM has to carry for the 40 kWe SEP system. Areas in which mass is higher for an Apis embodiment include inflatable structures and the stinger assembly used in the optical mining operation. A vehicle in accordance with an embodiment is smaller thus making structures, thermal control, and attitude control system mass is less. Shorter return trip time is afforded by obviating the need to bring back the entire asteroid 40 and the 40× higher thrust of a solar thermal rocket 110 in accordance with an embodiment versus SEP.

An optical mining embodiment comprises anidolic (non-imaging) optics 30 with thin-film inflatable reflectors along with light tubes 80 and reflective cones to highly concentrate sunlight and direct it onto the surface of an asteroid 40, 500 enclosed in a bag 50. Highly-concentrated sunlight ablates and devolatilizes the asteroid 40 material. The water vapor is captured as ice in passively-cooled enclosure.

Optical mining in accordance with an embodiment can be implemented by a modest sized robotic spacecraft launched to a low positive C3 to harvest and return up to 100 metric tons of water from a highly accessible CI or CM chondrite Near-Earth Asteroid (NEO)

Optical mining in accordance with an embodiment allows cost effective asteroid mining to obtain propellant and consumables for human exploration of NEOs and cis-lunar space.

A HelioFab method in accordance with an embodiment comprises steps of on-orbit solar thermal distillation of asteroids into feedstocks and fabrication of structures via vapor deposition. Because launch to space is violent and expensive with limited stowage volume, space-based structures are over-designed for orbital stress and expensive. Asteroids are a virtually unlimited resource, but terrestrial material processing and fabrication processes don't work in space. HelioFab embodiments use thin films and foils as solar reflectors, sun shades, radiators, and low-pressure containment for distillation of asteroids into feedstocks and vapor-phase deposition onto thin foils for fabrication.

Figure 31:
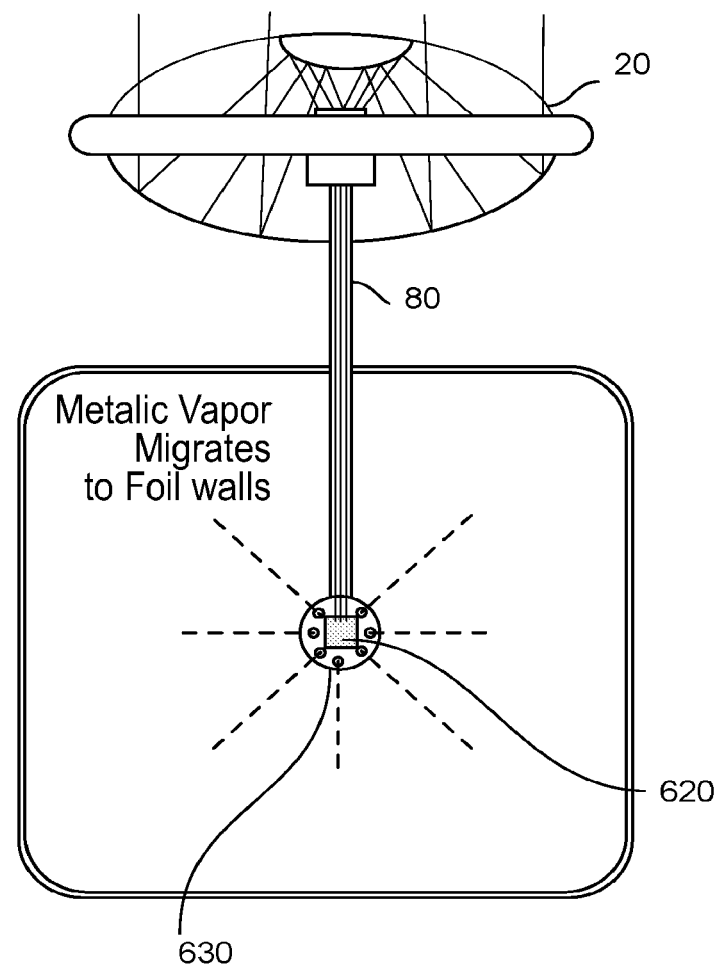
FIG. 31 shows orbital aluminum tank fabrication in accordance with an embodiment.
Figure 32:
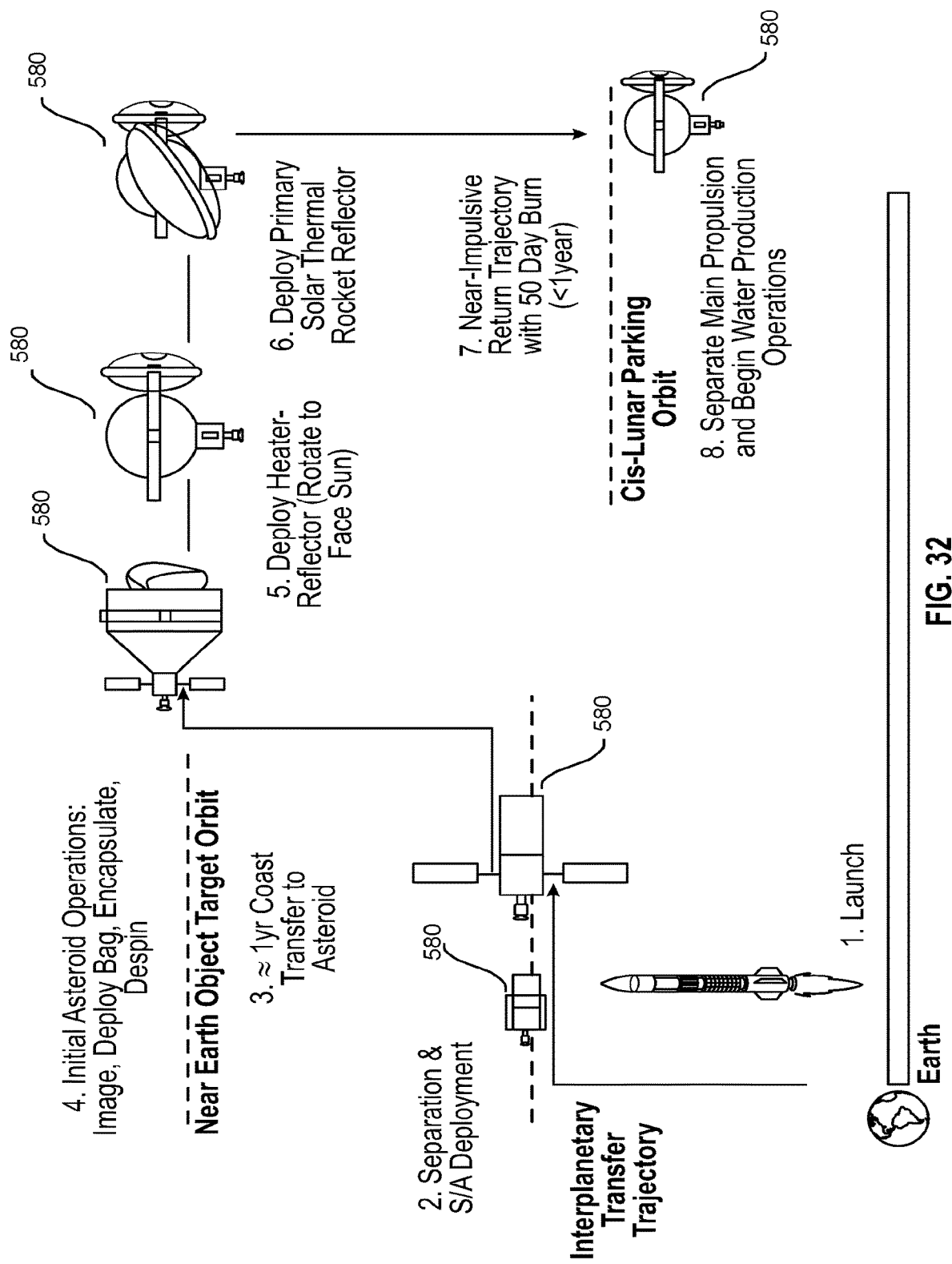
FIG. 32 shows an Apis NEO mission in accordance with an embodiment.
Figure 33:
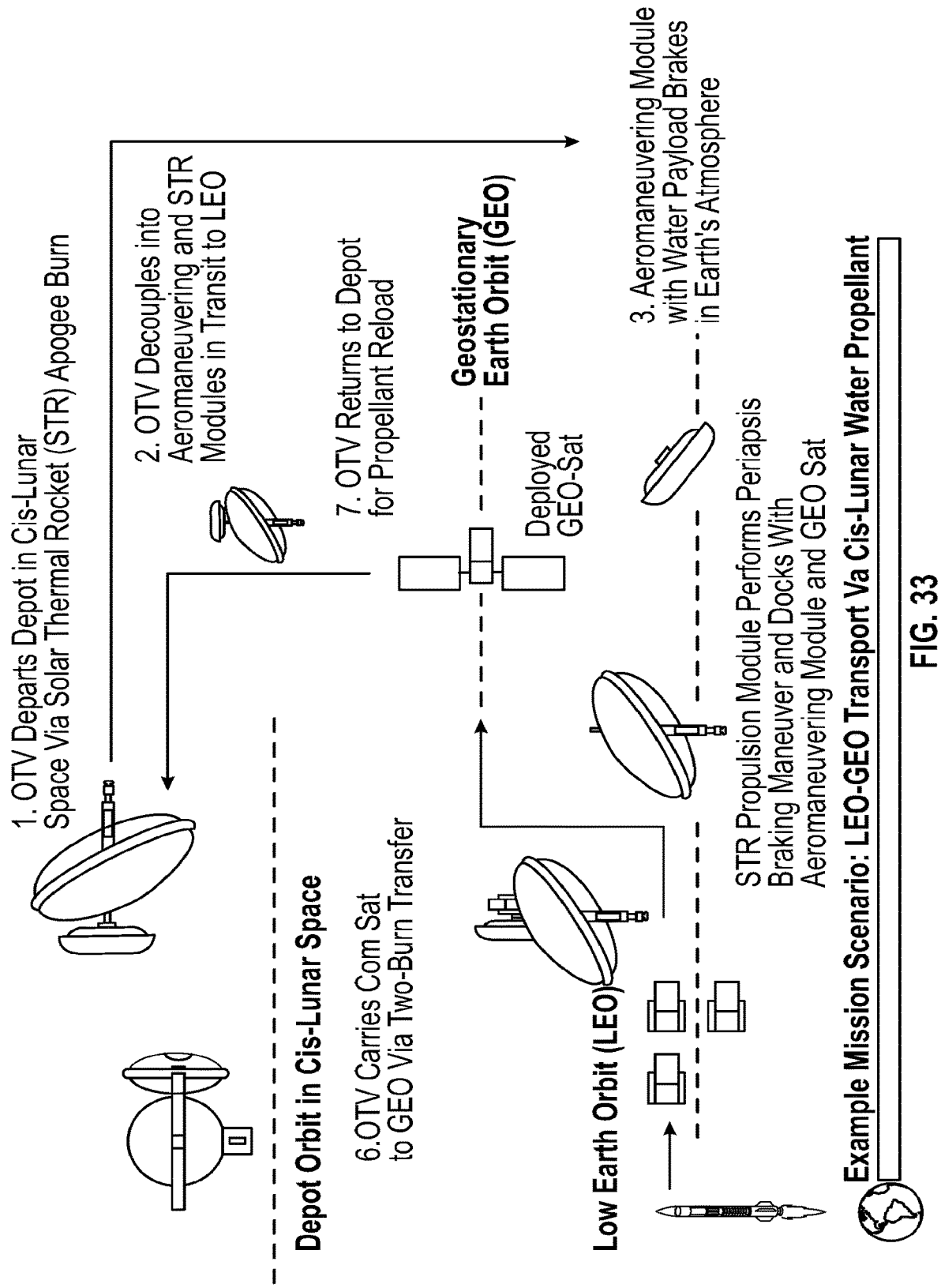
FIG. 33 shows LEO GEO transportation in accordance with an embodiment.
Figure 34:
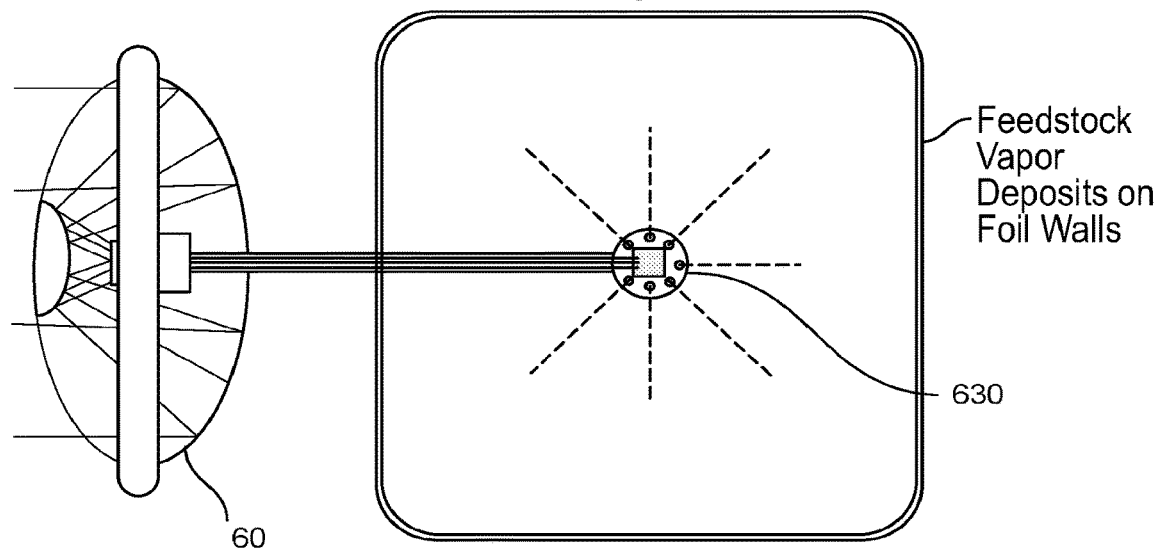
FIG. 34 shows pressure vessel fabrication in accordance with an embodiment.

HelioFab embodiments comprise structures and methods for fabricating spacecraft structures on-orbit out of raw feedstocks. FIG. 31 shows a HelioFab embodiment. A HelioFab embodiment comprises a thin-film inflatable solar concentrator 560, a thin-film or foil inflatable form 660 in the shape of the structure to be fabricated, a light-tube 80 (a hollow tube with a reflective inner surface 460) with a transparent ceramic end window 470, and a crucible 620 to hold an ingot 630 of feedstock. Solar power at high concentration ratio vaporizes the feedstock. Feedstock vapor passes through vias in the crucible and deposits onto the walls of the inflatable form 660. The light-tube comprises a controllable louver to regulate the solar power deposited into the crucible.

HelioFab embodiments enable the low-cost manufacture of large items such as space station habitats, structural elements, and pressure vessels. In a HelioFab method, a packaged assembly containing HelioFab elements is attached to a spacecraft. An example would be to attach HelioFab elements to the robotic arm 440 of a space station 270. Steps in the fabrication process comprise deploying the inflatable structures (the solar concentrator, the light-tube, and the structural form 660) and orienting the solar concentrator toward the Sun. Once the system is oriented, a louver is actuated to begin to allow highly-concentrated sunlight to flow down the light-tube, through a window at the end of the light-tube, and into the crucible where feedstock material is vaporized at a controlled rate. Walls of the form 660 act as passively-cooled cold traps to which the feedstock vapor is deposited, building up a structural layer of material over time. HelioFab feedstocks can be launched from the Earth, or HelioFab can create feedstocks from raw asteroid material 310 through fractional distillation.

HelioFab is an extension of terrestrial Physical Vapor Deposition (PVD) processes. In space it makes far more sense to use light-weight inflatable reflectors as the power source and to extend the process to thick-film deposition of structural elements to eliminate the need for massive or electrical power intensive machine tools. Selection of feedstock material depends on the purpose of the structure being made. Candidate materials for use in space include water, paraffins of different hardnesses and vaporization temperatures, a wide range of polymers, and metals, especially magnesium. Magnesium is good for this application because it is somewhat plentiful in asteroids, has high strength-to-mass ratio, and vaporizes at a modest 1363 K. Ignition issues with magnesium on the ground are not relevant or are easily managed in the space environment.

It is counter-intuitive that a simple solar reflector 20 can achieve the requisite temperatures, but the physical and engineering principles are correct. The theoretical maximum temperature achievable by a solar concentrator is the surface temperature of the Sun, 5,778 K. Practical experiments with inflatable reflectors suggest that they can be made to a surface quality of ±~2 to 3 mm rms using known methods. Ray trace calculations and ground tests with multi-meter diameter test elements show that this will allow the production of peak temperatures of over 2,800 K, hot enough to vaporize aluminum, and easily hot enough to vaporize magnesium and many asteroids constituents. Ground demonstrations using reflectors of lower quality show that concentration ratios of a few thousand to one are high enough to directly ablate rock.

Figure 35:
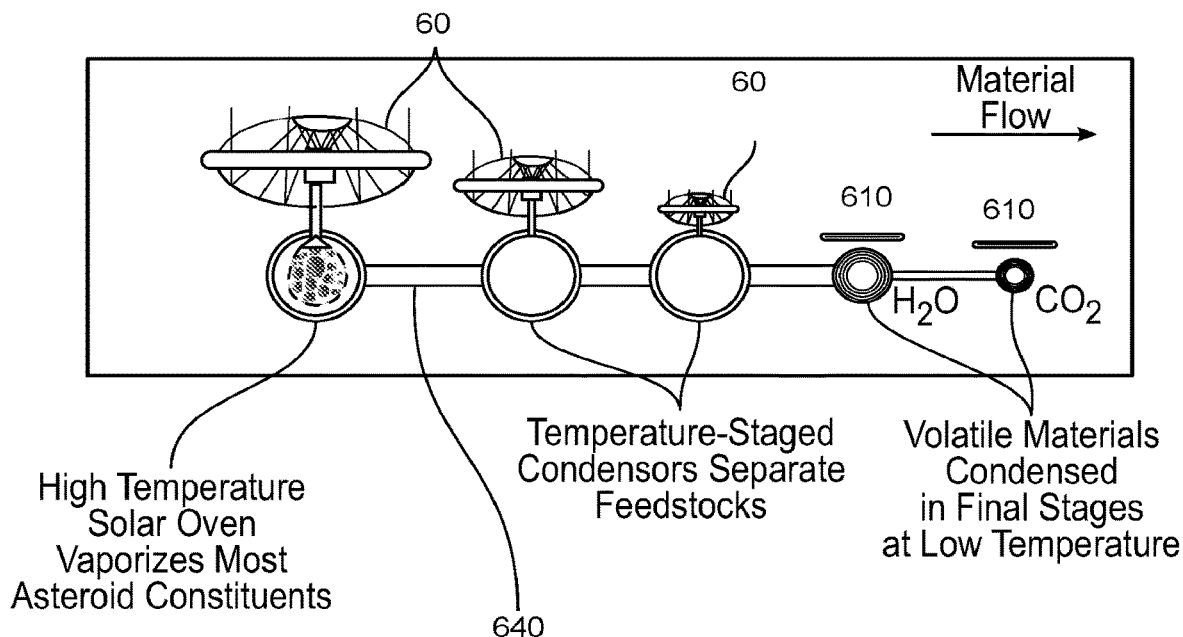
FIG. 35 shows asteroid feedstock distillation in accordance with an embodiment.

FIG. 35 shows how HelioFab embodiment can be used to fractionally distill asteroids into their constituent materials to isolate feedstocks of different types. A series of solar thermal ovens each passively controlled to a different temperature are connected by insulated hollow conduits 640 to form temperature-staged condensers. The first oven is held at the highest-temperature. The hollow structure of this high-temperature oven will have to be light-weight refractory ceramic. The thermodynamics and gas dynamics needed to ensure that selected materials each deposit in a single oven are well understood. In accordance with an embodiment, a high temperature solar oven vaporizes most asteroid constituents, and conduit and insulated conduit 640 allows passive migration of vaporized material to temperature-staged condensers that separate feedstocks. In the temperature-staged condensers condensation surface temperatures can be controlled using passive thermal control methods (e.g. sun shades). Volatile materials are condensed in the final stages. For example, if the inflated form 660 is a second surface mirror (a laminate that is highly reflective to sunlight and highly emissive in the IR) and shielded from heat sources with thin film reflectors, surface temperatures can be passively controlled to well below the sublimation temperature of water in vacuum and water-ice can be used as a structural material, so this general approach can be used to process a huge array of material types. By contrast, if the outer surface material of a conduit or form 660 is made to be highly reflective with low IR emissivity, high temperature can be maintained passively to prevent unwanted material deposition.

Today we design space structures to be fabricated in a 1-gee atmospheric environment and then launched into space in a highly confined fairing in which each structure has to survive pyro shock, large acoustic loads, and hundreds of gees of random vibration By contrast, the environment of space includes microgravity, copious solar thermal energy, unlimited vacuum, and view factors of the cold of deep space. HelioFab embodiments exploits these properties of space to inexpensively fabricate large structures in-situ and circumvents the problems imposed by fabricating on the ground and launching on rockets. Because solar-thermal vapor-phase manufacturing will allow structures to be made in space in free fall, the structures don't have to be over-engineered for terrestrial fabrication and assembly or to survive the rigors of the launch environment.

Additive manufacturing, or 3D printing, is democratizing fabrication on the ground and has been demonstrated for space applications on ISS and for rocket engines by SpaceX. Unfortunately, 3D printers are limited in the size of the parts they can produce and thus are not well-suited for use on large aerospace structures. By circumventing the size limitations of additive manufacturing, HelioFab embodiments allow fabrication of parts and large system elements that could not fit in a launch fairing much faster than any conventional additive manufacturing process or with a fabrication plant order of magnitude lighter and smaller. This is because HelioFab embodiments use direct solar thermal energy which is 10× to 100× lower in mass than electric power such as that used in other process such as SpiderFab. Potential applications include construction of habitats, propellant depots 290, transfer vehicles, and structural elements of large components for cis-lunar stations or piloted Mars missions. HelioFab embodiments will also enable on-orbit recycling and can evolve to support ISRU of orbital debris in Earth orbit and asteroid materials in cis-lunar space. Engineering development and demonstration efforts will be needed to quickly elevate the technical readiness of this approach so NASA can be baselined it in strategic planning for the fabrication of large systems in support of human exploration. Supporting technologies, such as precision thin-film inflatable structures have been in development for decades, and high concentration-ratio, extremely light-weight reflector technology is at TRL 3-4 based on completed flight experiments and extensive ground tests showing the accuracy and weight of the reflectors.

An APIS (Asteroid Provided In-Situ Systems) embodiment uses direct solar thermal power from light-weight, thin-film inflatable reflectors for both solar thermal ovens to extract water from highly accessible asteroids and to heat extracted water in simple solar thermal steam rockets.

Worker bee embodiments comprise thin-film solar thermal technology and Solar Thermal Rockets (STR) that enable water-based cis-lunar transportation. Worker Bee 200 embodiments use asteroid-derived water delivered to the top of the Earth-Moon system gravity well by an APIS embodiment or other system to inexpensively transport payloads throughout cis-lunar space and resupply cis-lunar space stations and human exploration missions to highly accessible asteroids. Worker Bee 200 embodiments can provide the infrastructure to enable human exploration of Mars and industrialization of cis-lunar space.

Figure 42:
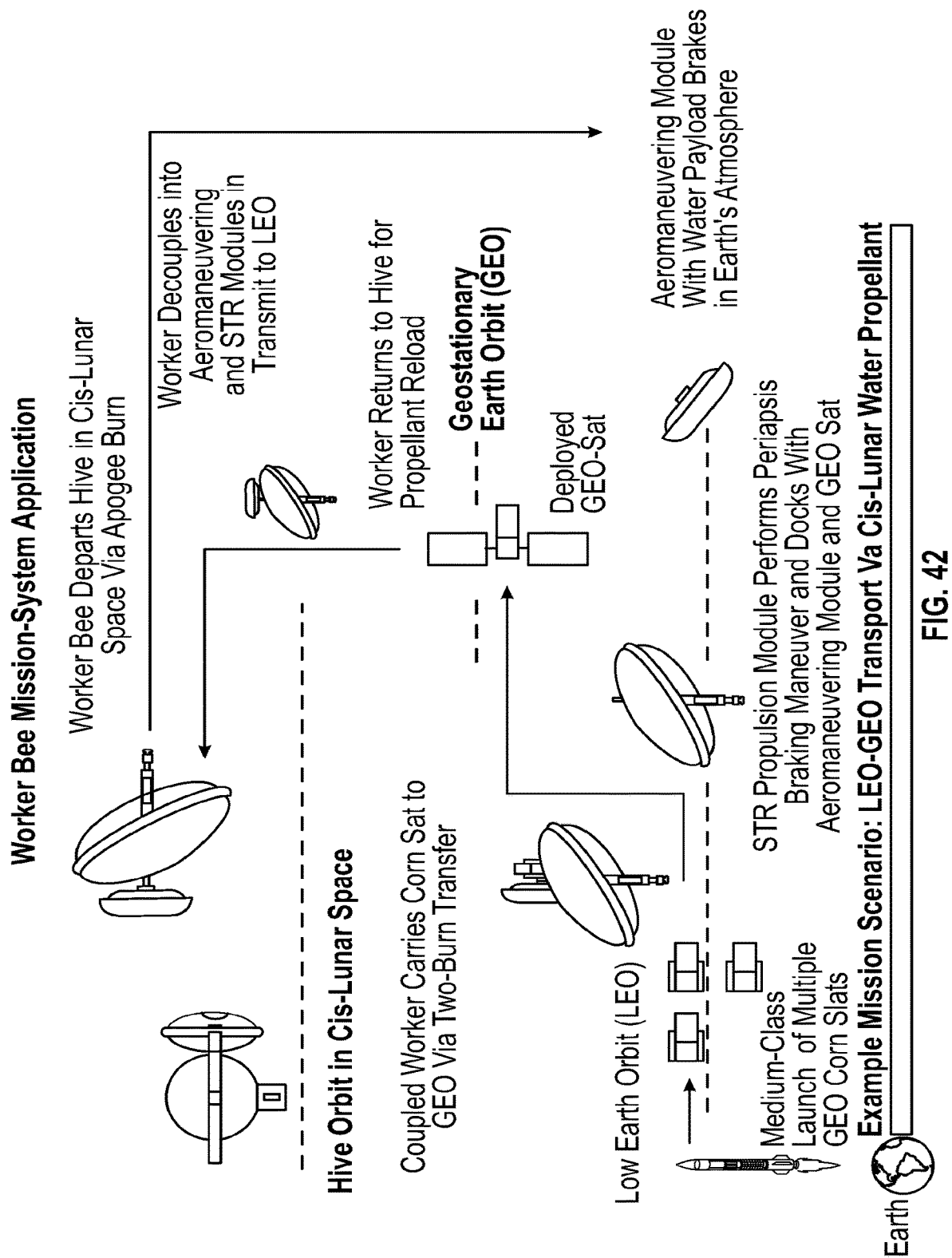
FIG. 42 shows a worker bee mission in accordance with an embodiment.
Figure 43:
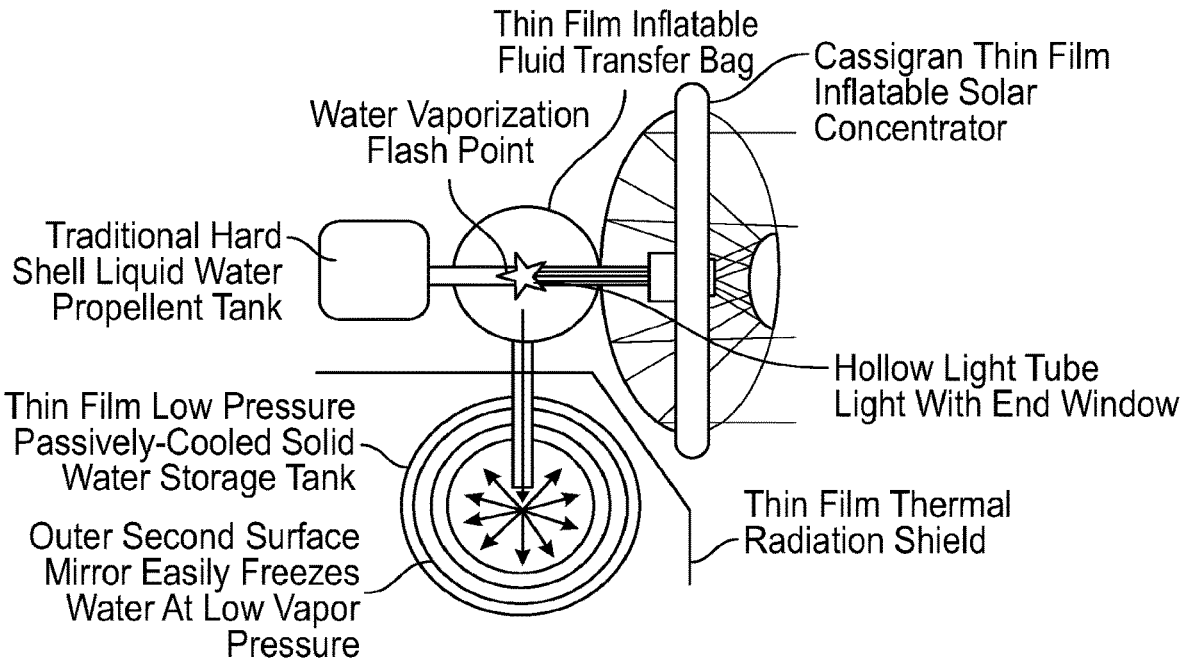
FIG. 43 shows Apis propellant transfer and storage in accordance with an embodiment.
Figure 44:
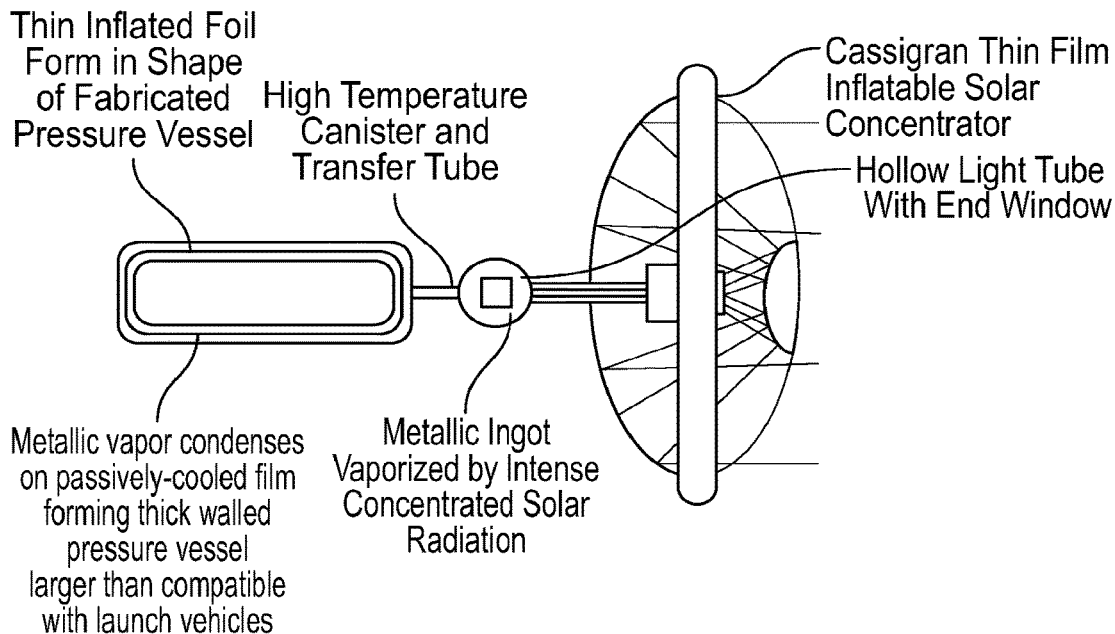
FIG. 44 shows Apis fabrication of large engineering structures in accordance with an embodiment.
Figure 45:
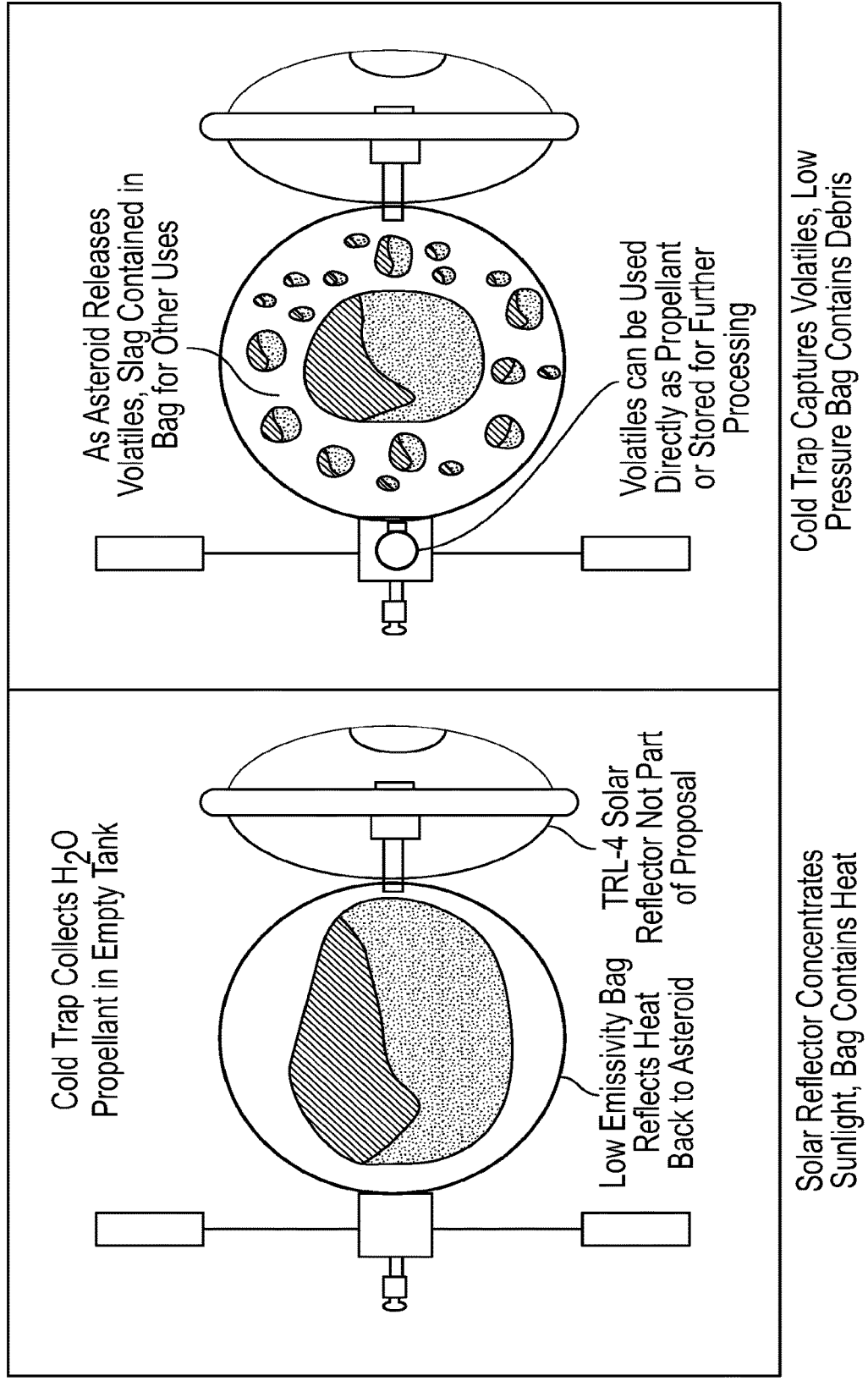
FIG. 45 shows a solar thermal oven for asteroid waste extraction in accordance with an embodiment.
Figure 46:
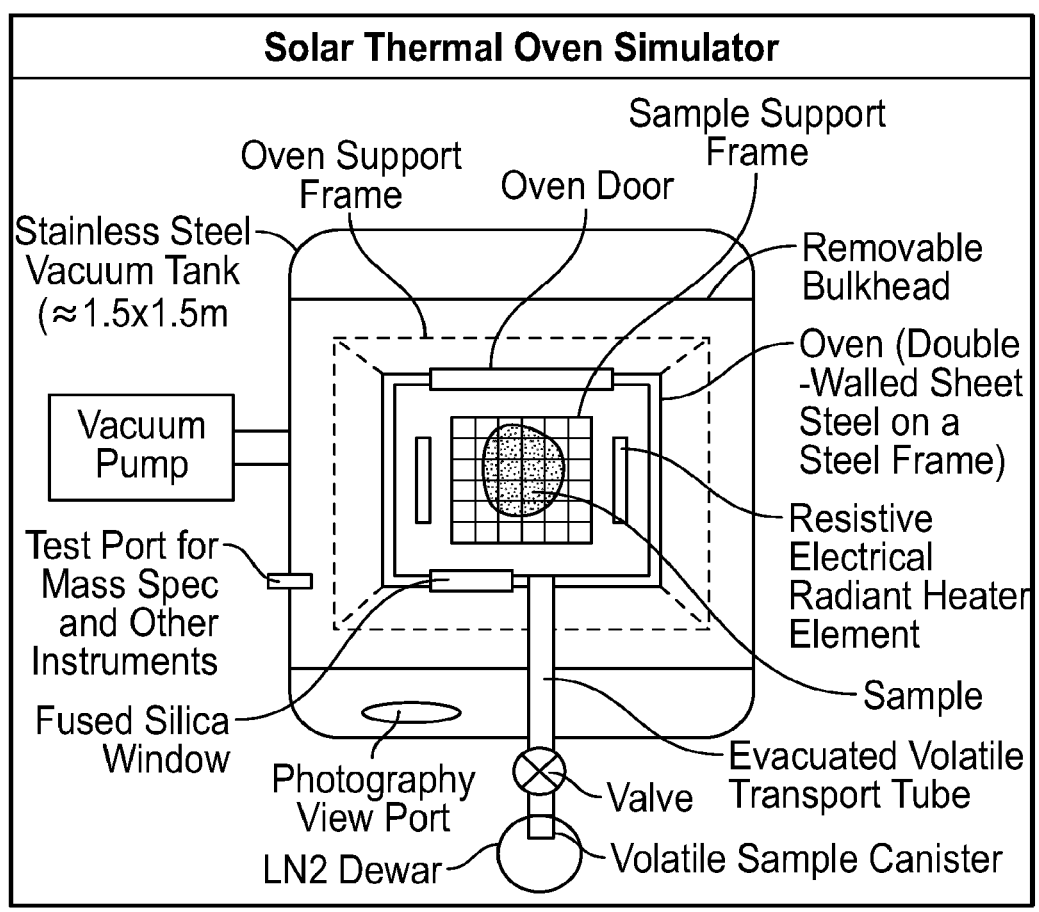
FIG. 46 shows a solar thermal oven simulator in accordance with an embodiment.
Figure 47:
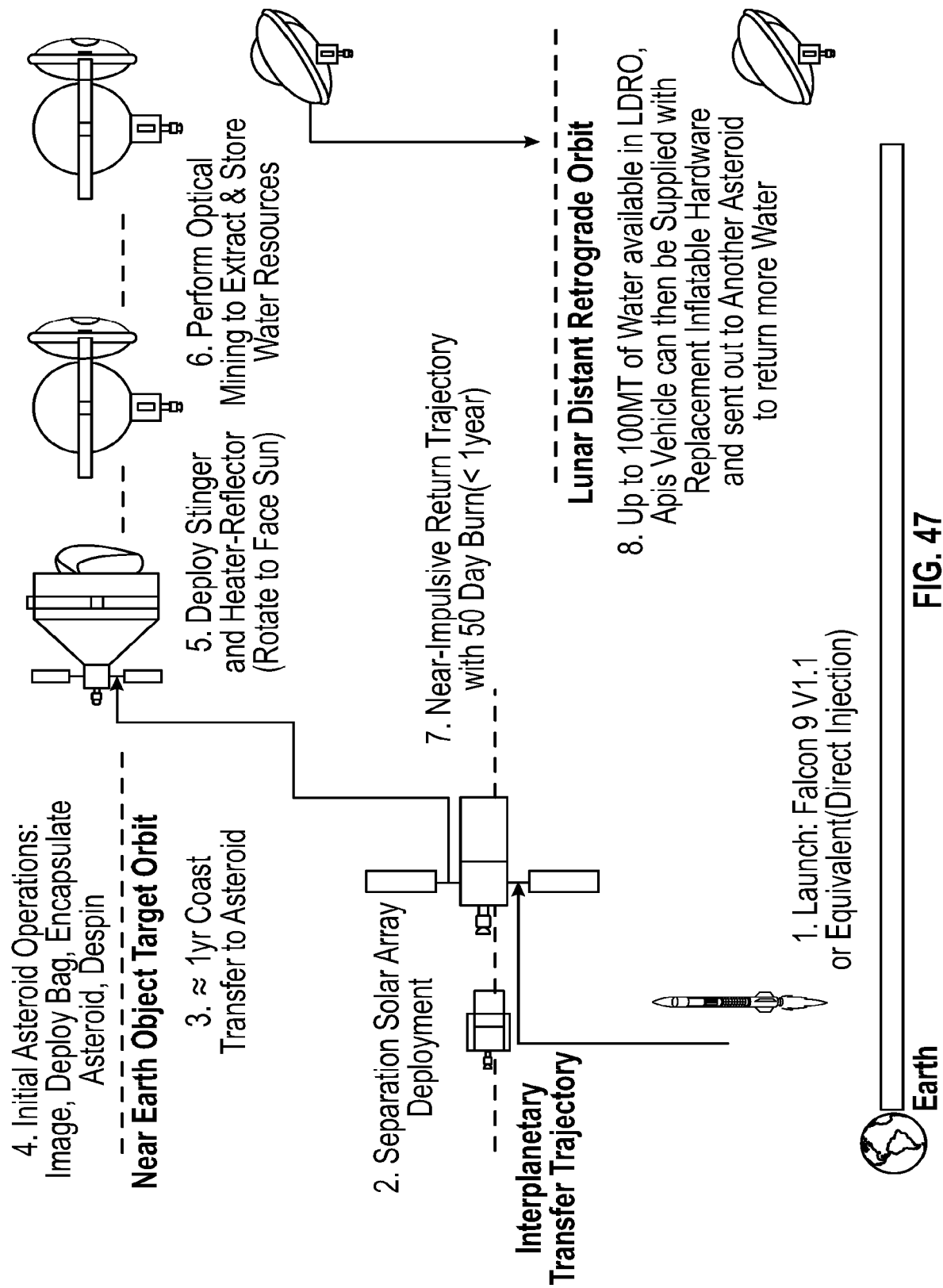
FIG. 47 shows an Apis NEO mission in accordance with an embodiment.
Figure 48:
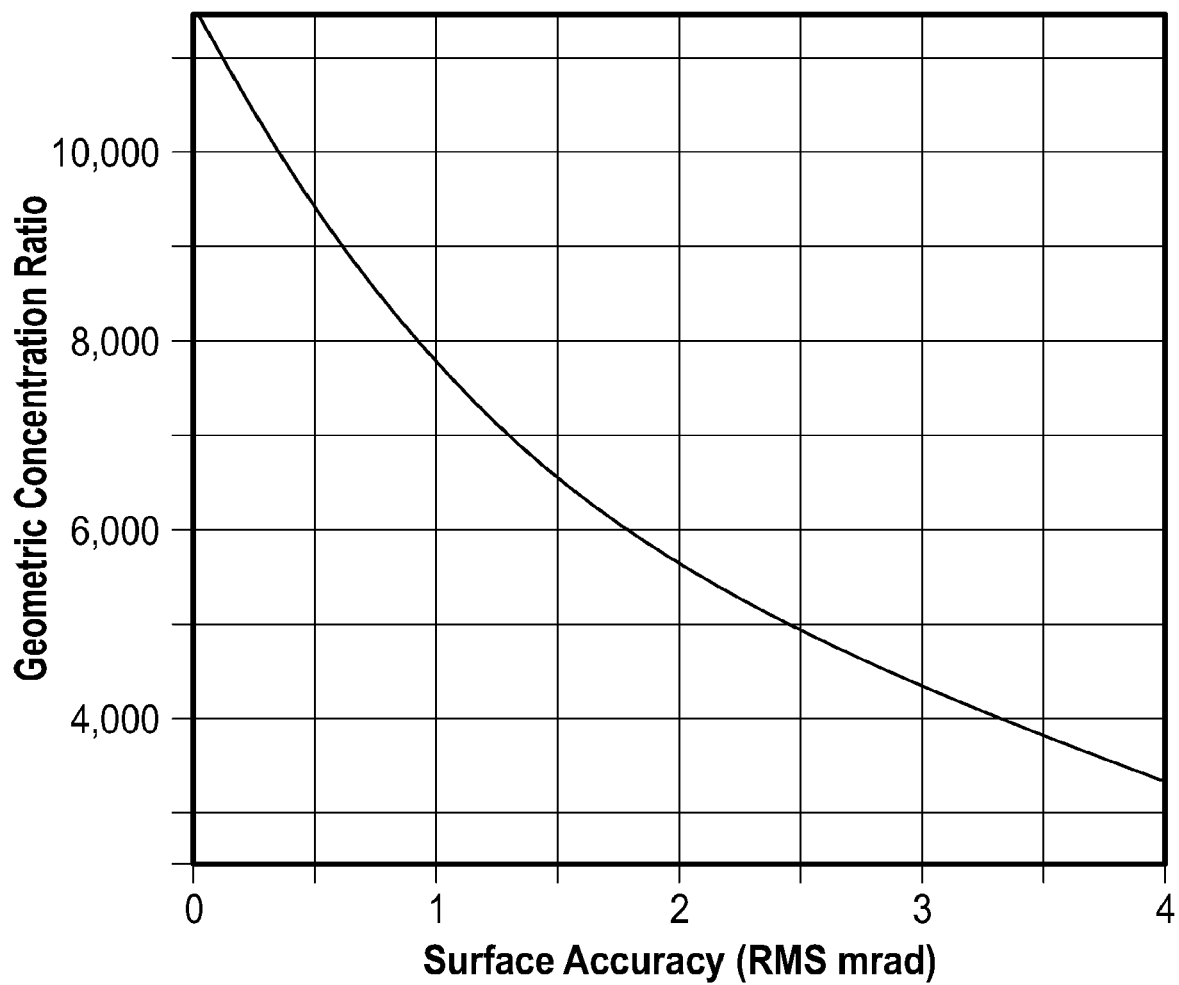
FIG. 48 shows ideal performance of a two reflector anidolic optics apparatus in accordance with an embodiment.

Worker Bee 200 embodiments may provide LEO-GEO transport of communications satellites 300. To show the Worker Bees system architecture FIG. 42 provides a simplified illustration of the Worker Bees' nominal route between a water depot in cis-lunar space, LEO, and GEO. An example embodiment Worker Bee 200 vehicle comprises two flight-separable modules, the STR Propulsion Module, and the Aeromaneuvering Tanker Module (ATM). This architecture enables a single medium-class launcher such as the Falcon 9 V1.1 to deliver two to three of the largest size (5000 kg) GEO comsats to orbit in a single launch. This effectively quadruples launch vehicle throw capacity and gives the Falcon 9 approximately the capacity of a HLLV. With conservative design margins, total wet mass of the Worker Bee 200 stack is about 70 MT including 60 MT of water and 10 MT of hardware. The majority of the hardware mass is the aeromaneuvering tanker with its reusable heat-shield and water storage tank. All consumable fluids on this combined vehicle are water for direct solar thermal propulsion or for warm-steam thrusters. High-temperature phase change materials, nominally salts, store additional heat energy from the heat shield 610 or the main reflector 20 and are used to energize warm steam rockets for ACS and small Delta-V functions. When a vehicle 200 in accordance with an embodiment is docked, all water is drawn from the primary tank 590 to minimize the size of tanks on the STR propulsion module.

At the top of FIG. 42 you see a Worker Bee 200 vehicle in accordance with and embodiment departing the depot 290 in cis-lunar space in the docked configuration with the aero-maneuvering tanker module on the left and the STR propulsion module on the right. The stack separates in event number 2 in the figure prior to reaching LEO. At LEO, the STR Propulsion Module performs the periapsis burn propulsively because the inflatable reflector cannot survive aerobraking. Given the propulsion module's dry mass of about 1500 kg, only about 1200 kg of water is required for this burn. The tanker, by contrast, aerobrakes the combined 55 tons of vehicle and payload. After the two systems perform their periapsis maneuvers, they re-dock as shown in event 4. The Worker Bee 200 spacecraft then picks up a GEO-Sat of up to 5,000 kg and carries it to GEO using a multi-burn transfer with a total delta-V of ~4.2 km/s. The Worker Bee 200 spacecraft leaves the GEO Sat in its orbital slot, and then returns to the depot 290, where it docks and refills for another mission. The FAA projects' that in the next ten years 212 GEO commercial communication satellites 300 will be launched by private companies with an average mass of about 5000 kg. Depending on the price point in the launch vehicle market, which is difficult to predict, the difference in cost between launching these satellites 300 to GEO versus launching them only to LEO represents a revenue potential of at least $20 billion and possibly as much as $45 billion, based on the difference between heavy and medium class launch prices. This commercial potential will make Worker Bee 200 embodiments a natural system for NASA to develop in collaboration with private industry as a public-private venture.

Worker Bee 200 embodiments comprise a network of solar thermal orbit transfer vehicles using ISRU provided water as propellant staged from DRLO. Worker Bee 200 embodiments use lightweight inflatable solar concentrators 560 for direct solar thermal power and propulsion, near order of magnitude launch cost savings are possible relative chemical approaches with trip times less than 1/10 that of solar electric propulsion. In accordance with an embodiment, propellant is staged at nodes such as DLRO for use throughout cis-lunar space by reusable, solar thermal orbit transfer vehicle. Reusable Worker Bee 200 embodiments supplied with propellant staged from DRLO on a Circulating route to LEO can pick up payloads in LEO and deliver them to destinations such as DRLO or near-Earth asteroids in their natural orbits. Worker Bees eliminate the need for high energy upper stages and multiply rocket throw capacity by more than twice that which is possible with such stages but also carry payloads on return trips for greater than five times total launch cost reduction.

The Worker Bees transportation embodiments provide cost savings for all missions of the Evolvable Mars Campaign including human exploration of Distant Lunar Retrograde Orbit (DRLO), asteroids in their native orbits, the surface of the Moon, and Mars. Worker Bee 200 embodiments also support commercial missions such as LEO-GEO transport while providing a market for commercial asteroid-mining.

A Worker Bee 200 embodiment comprises a transportation network architecture that employs reusable OTVs in a distributed system to efficiently utilize available materials and carry payloads from LEO throughout cis-lunar space. The system comprises transportation means to and from Geostationary Earth Orbit (GEO), Near Earth Asteroids (NEOs) in their native orbits, LDRO, the Moon, and trans-Mars injection.

Recirculating routes are possible with the Worker Bees embodiments for supporting both NASA human exploration missions and the commercial communications satellite industry. Replacing launch vehicle upper stage functions with high-performance vehicles utilizing propellants derived from space resources provide large mission benefit. Even without the use of aerobraking to save ISRU propellant on recurring routes, this more than doubles launch vehicle performance through a combination of two factors:

1) Worker Bee 200 embodiments eliminate the need for launch vehicles to lift the mass of upper stages, allowing that mass to be replaced by additional payload.

2) Worker Bees pick up their payloads in LEO where launch vehicles have greater payload capacity, rather than GEO Transfer Orbit (GTO) or some other high energy orbit to which the launch vehicles have reduced payload lift capacity.

The impact of Worker Bee 200 embodiments on total system launch cost will be much greater than a factor of two. This is because even downstream of the high-energy upper stage, most of the mass that launch vehicles must deliver in conventional exploration architectures is propellant and other consumables for use by explorers after initial launch injection. For example, the Apollo Command and Service Module (CSM) had a total injected mass of 28,800 kg, of which 18.410 kg or 64% was propellant for the main propulsion system. Likewise, the Lunar Module mass was over 70% propellant. The only deep space exploration vehicle that does not follow this trend is the NASA Orion system currently under development. Published accounts of the Orion design quote a total mass of 21,000 kg, only 7,900 kg of which is propellant. For this reason, Orion has a total post-injection delta V capability of just 1.3 kmls, explaining why the only exploration destination Orion can reach is LDRO. By contrast the Apollo Command and Service Module (CSM) had a total delta V capability of 2.8 km/s, giving it the ability to travel all the way to Low Lunar Orbit (LLO) and back without support while carrying the LM. The nature of deep space exploration is to travel great distances and this requires large quantities of propellant and large propulsion systems. The role of Worker Bee 200 embodiments is to provide a reusable deep space transportation network that utilizes water from ISRU-derived resources to eliminate the need to launch propellant, transportation stages, and spacecraft main propulsion systems from Earth. The cumulative effect of eliminating 60% to 80% of the mass required to be launched from Earth coupled with more than doubling the effective capacity of launch vehicles through replacement of high energy upper stages, means that Worker Bee 200 embodiments will decrease launch cost by more than a factor of five for human exploration. The use of aerobraking technology on the Worker Bee OTVs drops total launch cost for supporting human exploration by as much as ten times.

In an embodiment's Worker Bees hardware architecture a reusable multifunctional OTV 200 provides the primary propulsion capability for human exploration throughout cis-lunar space using a high-performance Solar Thermal Propulsion (STP) and ISRU derived water. LOX-LH2 or LOX-LM (Liquid Methane) propellant production for reusable landers and other elements of the transportation network that require higher thrust-la-weight capability than STP systems can deliver, is another element of the architecture to be phased in over time. We have designed the Worker Bees concept in enough detail to show basic technical feasibility. System masses have been estimated using empirical factors based on experience. Key technology elements of the system include: i) precision, lightweight inflatable solar concentrators 560 using anidolic optics, ii) solar thermal rockets running on water propellant. iii) heat shields 610 that are reusable in-space for aeromaneuvering (aerobraking and aerocapture) vehicles, iv) a modular vehicle architecture for in-space reusability, and v) teleoperated docking and water transfer at cis-lunar distances.

While an embodiment's system elements may have been independently studied previously, their combination in systematic architecture is novel and the proposed system has not been studied before, particularly the use of anidolic optical design in a solar thermal transportation architecture.

Figure 53:
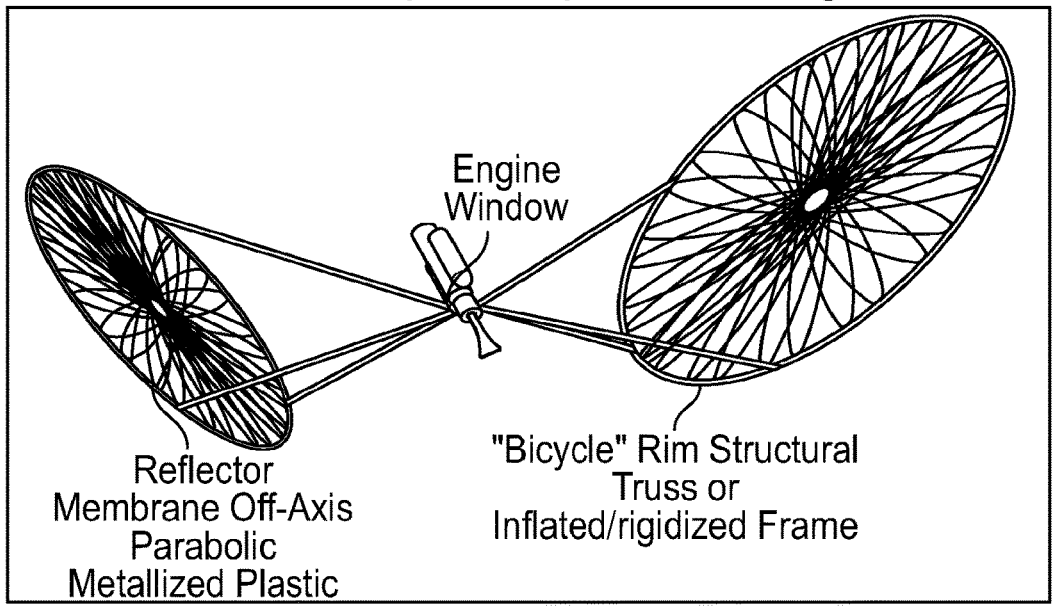
FIG. 53 shows a solar thermal propulsion spacecraft in accordance with an embodiment.
Figure 54:
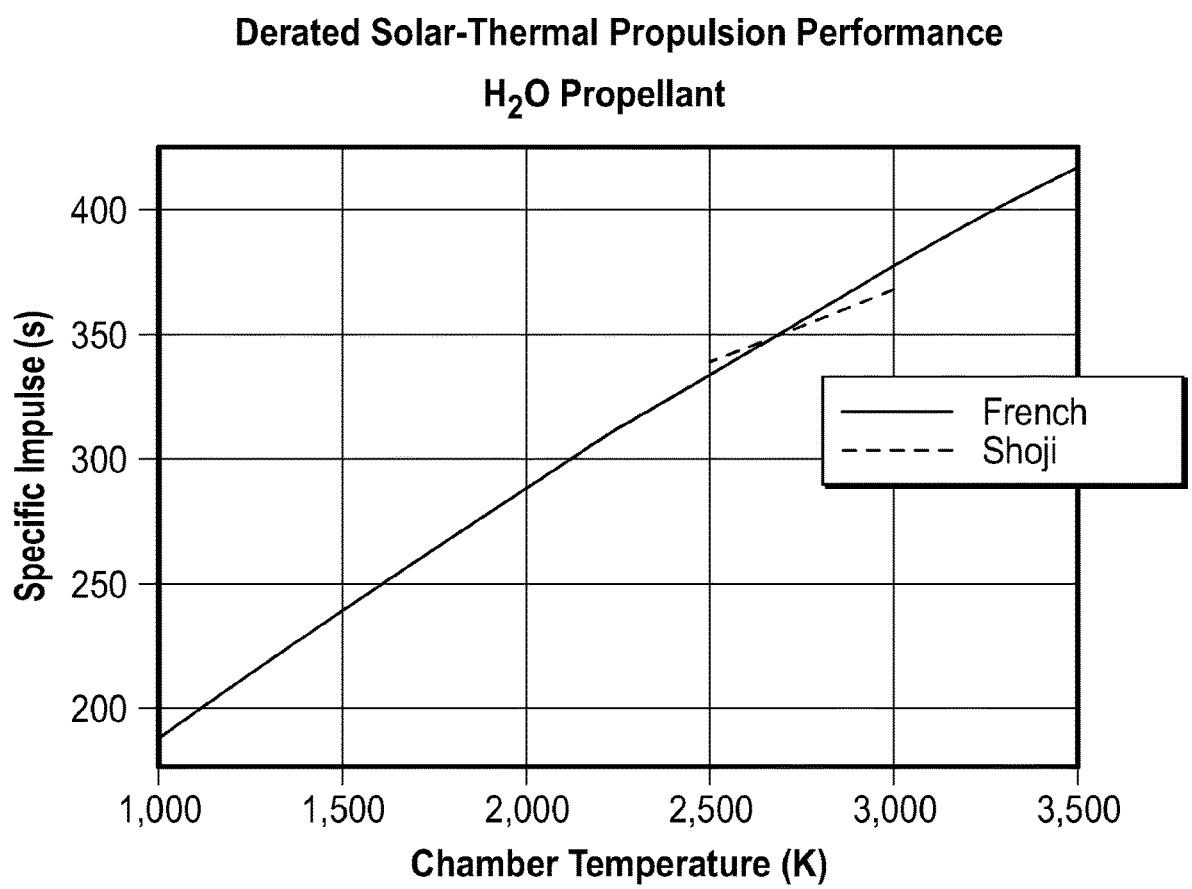
FIG. 54 shows solar thermal propulsion performance in accordance with an embodiment.
Figure 55:
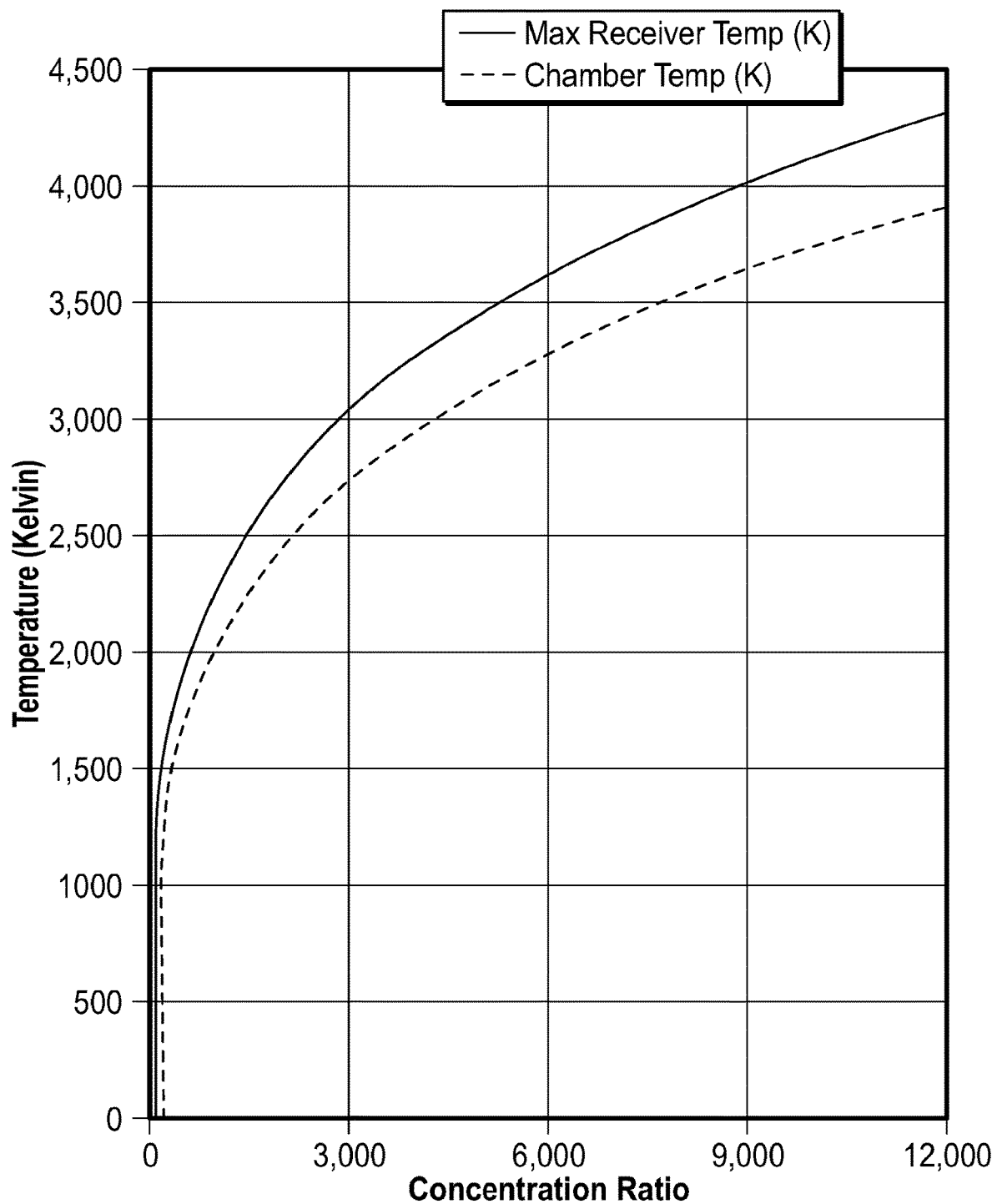
FIG. 55 shows temperature versus concentration ratio in accordance with an embodiment.

Embodiments comprise practical high performance $H_2O$ Solar-Thermal Propulsion (STP) based on anidolic optics 30. In STP, concentrated solar radiation 520 heats a working fluid that is expelled through a converging-diverging nozzle 530 to produce thrust. Primary elements of the system are the solar concentrators 560 required to produce high thrust at high specific impulse and solar thermal rocket engines that use the concentrated solar radiation 520 to heat the propellant. FIG. 53 shows how an STP system 110 can be integrated into a spacecraft configuration design. The solar concentrators in these systems must be configured to rotate around two axes to allow the thrust vector to be capable of pointing, via pointing actuators 570, in any direction relative to the Sun. FIG. 58 is schematic of a windowless heat exchanger thruster configuration. FIG. 54 is a plot of realistically achievable specific impulse as a function of chamber temperature for a water-based STR thruster. Note that to achieve specific impulse in the 300s to 350s range, the chamber temperature must approach 2,600K. There is a critical relationship between optical system architecture and STR engine performance because the optical system architecture limits the realistically achievable solar Concentration Ratio (CR) while the CR limits the maximum achievable chamber temperature. FIG. 55 shows the effect of CR on achievable chamber temperature based on heat transfer analysis. To achieve the desired 2,600K temperature, CRs approaching 3000 Suns must be achieved.

Past attempts at STP designs have failed to fully apply the benefits of modern anidolic optics and have therefore suffered from either unrealistic performance expectations (which cannot be achieved without sophisticated optical design), excessively demanding surface accuracy and painting requirements, poor system performance, or a combination of all these effects. Worker Bee STP 110 embodiments achieve realistic high performance through the use of anidolic optical elements 30 in an aplanatic design that provides 4× to 8× higher CRs than traditional parabolic imaging reflectors with more relaxed surface figure and pointing accuracy requirements.

Figure 56:
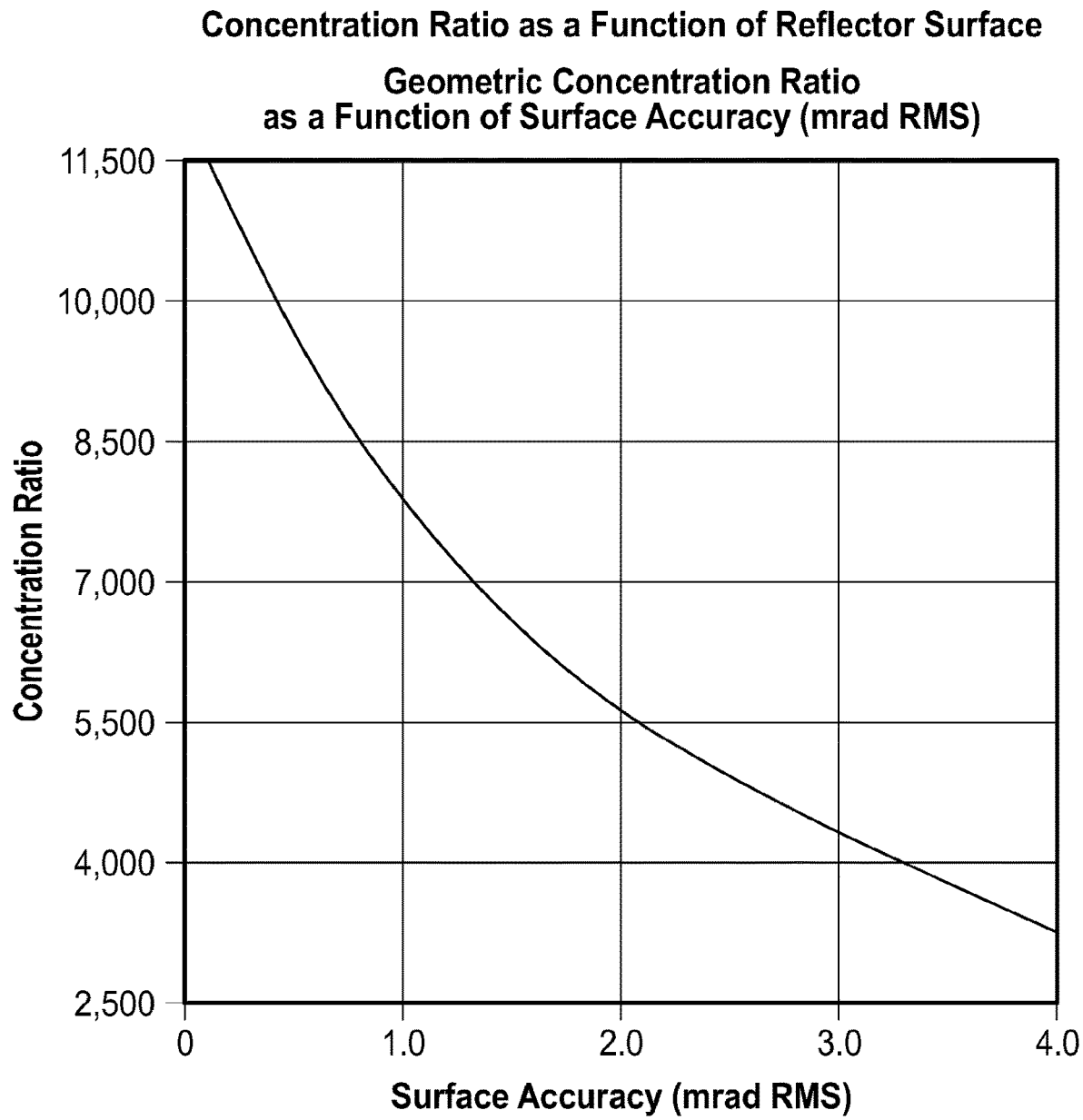
FIG. 56 shows concentration ratio as a function of reflector surface in accordance with an embodiment.

FIG. 56 shows the result of a calculation using the theory of anidolic optics applied in a two-reflector (primary 20 and cone concentrator 70,130) optical configuration consistent with each of the off-axis reflectors of FIG. 53. FIG. 56 shows that geometric CRs in excess of 3,000:1 can be achieved with surface accuracy of a few mrad RMS. Experimental work with large membranes suggest that actual surface figures can be within 1 mrad of design, allowing geometric solar CRs of over 7,000:1.

FIG. 57 is a schematic diagram of some of the key components in an anidolic, aplanatic optical design. The incoming sunlight is reflected off of a nearly parabolic but numerically-optimized primary reflector 120 onto a Winston Cone sub-reflector 70, 130 through an entrance pupil. Maximum CR is through this pupil, which could be the entrance to the heat exchanger in a thruster, or the entrance to a light tube 80 as shown for geometric delivery of the solar power. A light tube adaptor cone can be used as shown to reduce the solar intensity in the light tube 80 and reduce tube losses by minimizing the total number of internal reflections.

FIG. 58 provides an accounting of several additional factors that must be considered in determining overall concentrator performance. These factors include various optical reflection and transmission losses, and pointing error losses. Note that the use of a Winston Cone sub-reflector 70, 130 relaxes the pointing requirement.

Worker Bee 200 embodiments eliminate the need for high energy upper stages and multiply rocket throw capacity by <2× that which is possible with such stages, cutting resupply launch cost by a factor of 4. Aerobraking and use of Worker Bee 200 embodiments for other elements of the transportation network are expected to bring a net 10× launch vehicle cost reduction.

Figure 59:
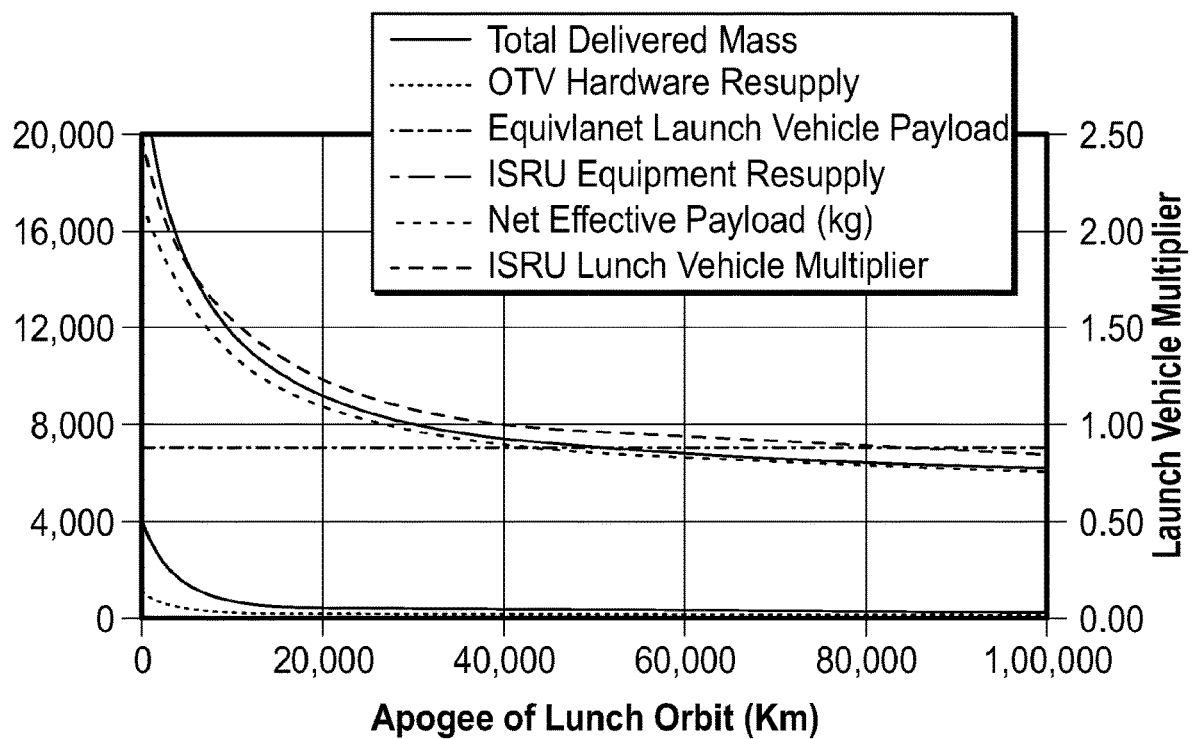
FIG. 59 shows worker bee LDRO cargo transport performance in accordance with an embodiment.

FIG. 59 provides a parametric analysis of the effect of Worker Bee embodiment OTVs 200 for cargo transfer between the injection orbit of a launch vehicle and LDRO. The OTVs 200 are assumed to rendezvous with the launch vehicle payload and take it the rest of the way to LDRO. The apogee of the launch orbit is varied between 400 km (circular LEO) and 100,000 km to determine the optimum rendezvous altitude for payload transfer. Each Worker Bee vehicle 200 is assumed to be able to complete the round trip 10 times prior to hardware retirement. The ISRU mission equipment mass payback ratio is assumed to be equivalent to the performance of the Apis embodiment.

Propellant for an embodiment's Worker Bee vehicles 200 is supplied from a water depot in LDRO. The launch vehicle is modeled as a medium-heavy system based on LOX-RP1 with a LEO payload capability of 20,000 kg. For the comparison case without Worker Bee vehicles, the launch vehicle is assumed to use a LOX-LH2 high energy 3rd stage for direct delivery of cargo to LDRO. The Worker Bee embodiment is fully penalized for ISRU equipment resupply and OTV equipment resupply in the line labeled "Net Effective Payload". The launch vehicle multiplier (read on the right-hand axis) is the ratio of the net effective payload with Work Bee embodiment to the payload of the launch vehicle with the expendable high energy upper stage. No aerobraking is assumed. The results show that: i) the optimum altitude for Worker Bees to pick up payload for delivery to LDRO is LEO, and ii) even without aerobraking, the net effective launch vehicle payload is more than doubled by the use of Worker Bee embodiment supplied from LDRO in place of rocket $3^{rd}$ stages.

Figure 60:
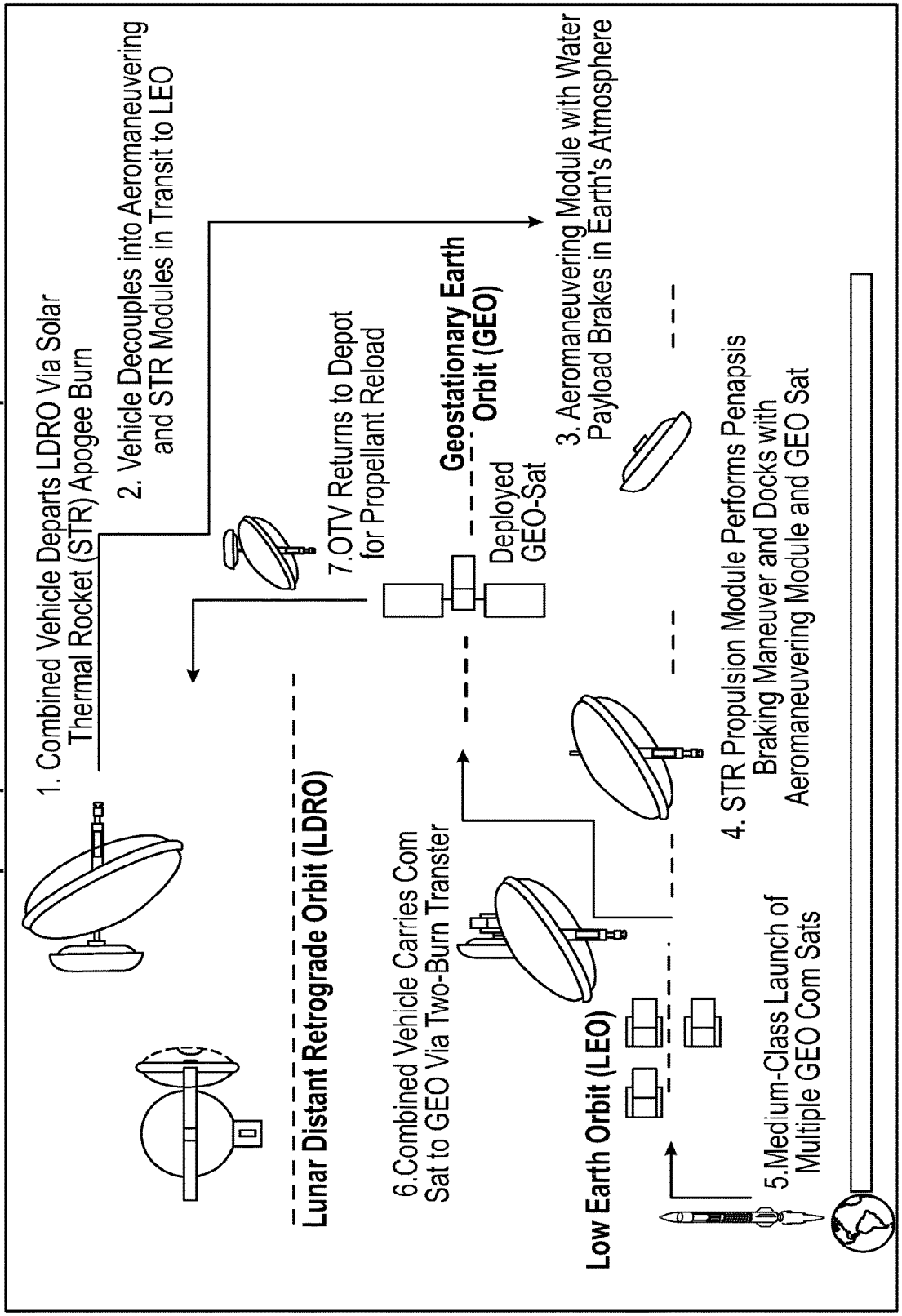
FIG. 60 shows GEO satellite transport in accordance with an embodiment.

Aerobraking-based analysis for LEO-GEO transport in which Worker Bee embodiments are built in two modules, one of which aerobrakes as shown in FIG. 60. On recirculating routes, aerobraking more than doubles the mass benefit.

Optical mining in accordance with an embodiment is a new approach to extracting and using materials found in asteroids. Highly concentrated sunlight 210 is focused onto a small area of the asteroid to produce a localized area of extreme high temperature. This causes the surface material to spall, ablate, or vaporize which excavates the surface without the need for mechanical digging or excavation equipment. In the case of asteroid materials which contain water or other volatile materials either molecularly or physically bonded, the high temperature causes the embedded material to vaporize and expand to many times its prior volume. This vaporization process, or other processes that lead to expanding gasses may cause spalling or ablation of the surface while the expanding gases entrain the removed particulate matter and carry it away thereby exposing new, fresh material and excavating the surface without mechanical digging apparatus. The entire asteroid 40 or part of the asteroid can be enclosed in a container or bag 50 which captures the outgassed material which can then be collected through a pumping mechanism, typically a thin film self-radiating cold trap which doubles as a low temperature storage mechanism 170 for the collected materials.

In accordance with an embodiment, a solar concentrator 560 that provides focusing for optical mining can also be used as a multipurpose power source on board a spacecraft for other purposes such as the powering a solar thermal rocket 110. Virtually any volatile material extracted from an asteroid 40, 500 through optical mining can be used as a propellant in a solar thermal rocket 110. Such embodiments effectively make asteroids into floating propellant resupply stations for spacecraft in deep space.

In accordance with an embodiment optical mining can accomplish optical-thermal vapor phase fractional distillation and 3D printing of large (and small) structures in space. By operating the solar concentrator 560 at very high temperatures, any known material can be vaporized. By attaching the primary bag 50 or enclosure to a series of other bags or enclosures 50 through open pipes or ports, material constituents of the asteroid 500 or any source material can be separated out according to condensation temperature. Once isolated or combined in controlled ways, ingots 630 of different materials can be vaporized and condensed onto the inner surfaces of forms 660, molds or inflatable structures to form large, thick walled structures such as pressure vessels or spacecraft.

An embodiment comprises light weight solar reflectors 20 and means for controlling the delivery of concentrated power onto the surface of a target. Such means could comprise either non-imaging or imaging optical elements such as parabolic reflectors 60, cones 70, or tubes 80. An embodiment can comprise temperature controlled gas enclosures.

Embodiments allow vast reduction in launched mass, volume, and cost of machinery needed to excavate asteroids and extract useful materials and allow elimination of moving and wearable mechanical components and parts.

Structural elements can be thin film, inflatable, rigid or flexible.

An embodiment's passive thermal control can comprise thermal coatings. An embodiment's active thermal control can comprise refrigeration.

An example method comprises using nonimaging optics 30 to bring light into an enclosure containing a target and moving a movable sleeve to control and move the placement of an intense focus on different areas of the target.

Optical mining in accordance with an embodiment is a new approach to extracting and harnessing materials found in asteroids. Highly concentrated sunlight 210 is focused onto a small area of the asteroid 40, 500 to produce a localized area of extreme high temperature. This causes the surface material to spall, ablate, or vaporize which excavates the surface without the need for mechanical digging or excavation equipment. In the case of asteroid materials which contain water or other volatile materials either molecularly or physically bonded, the high temperature causes the embedded material to vaporize and expand to many times its prior volume. This vaporization process, or other processes that lead to expanding gasses may cause spalling or ablation of the surface while the expanding gases entrain the removed particulate matter and carry it away thereby exposing new, fresh material and excavating the surface without mechanical digging apparatus. The entire asteroid 40, 500 or part of the asteroid 40, 500 can be enclosed in a container or bag 50 which captures the outgassed material 100 which can then be collected through a pumping mechanism, typically a thin film self-radiating cold trap which doubles as a low temperature storage mechanism for the collected materials. The same solar concentrator 560 which provides the focusing for the optical mining can be used as a multipurpose power source on board the spacecraft for other purposes such as the power source for a solar thermal rocket 110. Virtually any volatile material extracted from an asteroid 40 through optical mining can be used as a propellant in the solar thermal rocket 110. Together these inventions effectively make asteroids into floating propellant resupply stations for spacecraft in deep space. Optical mining can in principle be extended to optical-thermal vapor phase fractional distillation and 3D printing of large (and small) structures in space. By operating the solar concentrator 560 at very high temperatures, any known material can be vaporized. By tying the primary bag or enclosure to a series of other bags or enclosures through open pipes or ports, material constituents of the asteroid 40, 500 or any source material can be separated out by condensation temperature. Once isolated or combined in controlled ways, ingots 630 of any material can then be vaporized and condensed onto the inner surfaces of forms, molds or inflatable structures 660 to form large, thick walled structures such as pressure vessels or spacecraft.

An embodiment comprises: a light weight solar reflector 20; optics 30 for controlling the delivery of concentrated power onto the surface of a target; and temperature controlled gas enclosure that contains the target; wherein said solar reflector 20 is oriented to reflect sun light onto said optics. Such optics 30 could comprise either non-imaging or imaging optical elements such as parabolic reflectors 60, cones 70, or tubes.

Vast reduction in launched mass, volume, and cost of machinery needed to excavate asteroids and extract useful materials. Elimination of moving and wear prone mechanical components and parts.

Structural elements can be thin film, inflatable, rigid or flexible.

Thermal control can be provided passively with thermal coatings or actively with refrigeration.

Structures and methods in accordance with an embodiment can be used for extraction and collection of any material from a wide range of objects floating in space and might also be useful on the surfaces of planets.

An embodiment uses nonimaging optics 30 and/or light pipes to bring the light into an enclosure with a movable sleeve to control and move the placement of an intense focus inside the enclosing container.

An embodiment controls highly focused solar energy to target an asteroid inside a bag.

The embodiments illustrated and discussed in this specification are intended only to teach those skilled in the art how to make and use the invention. Nothing in this specification should be considered as limiting the scope of the present invention. All examples presented are representative and non-limiting. The above-described embodiments may be modified or varied, without departing from the invention's scope, as appreciated by those skilled in the art in light of the above teachings. It is therefore to be understood that, within the scope of the claims and their equivalents, the embodiments may be practiced otherwise than as specifically described.

The invention claimed is:

1. A method for mining of a target located in space to extract volatiles as gases comprising the steps of:
   providing a system for mining the target, the system comprising:
      a thin-film inflatable bag configured to contain the target;
      a set of optical elements configured to: (i) collect or focus solar power and direct the solar power toward the target, and (ii) direct thermal energy derived from the solar power on the surface of the target; and
      a container for storing volatile gases at low pressure;
   positioning the mining system in heliocentric, geocentric, lunar or planetary orbit;
   restraining a target within the system;
   impinging the surface of the target with directed power through the set of optical elements;
   concentrating the directed power onto a portion of the surface of the target with a focused power density sufficient to spall or ablate the surface;
   excavating the surface of the target by spalling or ablation while also liberating water vapor and/or other volatile gases;
   restraining excavated debris in the thin-film inflatable bag;
   capturing outgassed volatile gases and containing the gases;
   transferring the evolved gases;
   removing excavated debris from the target to expose fresh target surface to optical thermal energy; and
   excavating another thin layer of the target to continue mining the target and repeating these steps until the target is exhausted of volatiles.

2. The method of claim 1 wherein the target comprises near-earth objects (NEO) or other planetary bodies or moons in microgravity or the surface of a planet or planetoid.

3. The method of claim 1 wherein the volatile gases produced by the method may be used for at least one of propellants, consumable feedstock, breathable air, water, radiation shielding or ingredients in structures or chemical processes.

4. The method of claim 1 wherein the set of optical elements comprise at least one of a light pipe, nonimaging optics, a thin film or inflatable solar concentrator, an inflatable reflector, parabolic reflector, or a Winston horn.

5. The method of claim 1 where in the step of restraining the target comprises restraining the target in the thin-film inflatable bag attached the mining system.

6. The method of claim 5 wherein the thin-film inflatable bag comprises an inner mesh for capturing excavated debris from the target.

7. The method of claim 1 wherein volatile gases comprise water vapor and other volatile materials such as $CO_2$, $SO_2$, methane or carbon dioxide.

8. The method of claim 1 wherein excavating the surface of the target comprises fracturing the surface and causing it to spall and shed small pieces or chips.

9. The method of claim 1 further comprising the step of telescoping the set of optical elements toward the target as excavation continues.

10. The method of claim 1 wherein the set of optical elements comprise a lightweight inflatable solar reflector comprises a non-imaging light collector in the shape of an off-axis parabola of revolution with a reflective inner surface.

11. The method of claim 1 wherein the set of optical element comprise multifunctional optics configured to both propel the system for mining the target and direct the thermal energy derived from the solar power on the surface of the target for optical mining.

12. The method of claim 1 wherein the system for mining the target further comprises a secondary bag having an outer mirror coating and configured to emit infrared radiation and reflect sunlight.

* * * * *